United States Patent
Hahn et al.

(10) Patent No.: US 10,555,229 B2
(45) Date of Patent: Feb. 4, 2020

(54) METHOD OF TRANSMITTING AND RECEIVING DATA IN WIRELESS COMMUNICATION SYSTEM AND APPARATUS THEREFOR

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/765,195

(22) PCT Filed: Oct. 6, 2015

(86) PCT No.: PCT/KR2015/010565
§ 371 (c)(1),
(2) Date: Mar. 30, 2018

(87) PCT Pub. No.: WO2017/061642
PCT Pub. Date: Apr. 13, 2017

(65) Prior Publication Data
US 2019/0059031 A1  Feb. 21, 2019

(51) Int. Cl.
*H04W 36/08* (2009.01)
*H04W 36/30* (2009.01)
(Continued)

(52) U.S. Cl.
CPC .......... *H04W 36/08* (2013.01); *H04B 17/309* (2015.01); *H04W 36/30* (2013.01); *H04W 76/15* (2018.02)

(58) Field of Classification Search
CPC . H04B 7/18541; H04B 17/309; H04L 1/0002; H04L 1/20; H04L 12/64; H04L 12/6418; H04L 12/66; H04L 47/767; H04W 4/02; H04W 4/024; H04W 4/029; H04W 36/00; H04W 36/0005; H04W 36/0007;
(Continued)

(56) References Cited

U.S. PATENT DOCUMENTS

2010/0091739 A1* 4/2010 Dayal ................... H04L 1/0026
370/332
2011/0124336 A1  5/2011 Ishii
2014/0057631 A1  2/2014 Zhang et al.

FOREIGN PATENT DOCUMENTS

KR  10-2009-0030907 A  3/2009
KR  10-2010-0049483 A  5/2010
WO  2013/051858 A2     4/2013

* cited by examiner

*Primary Examiner* — Dady Chery
(74) *Attorney, Agent, or Firm* — Dentons US LLP

(57) ABSTRACT

A method for transmitting and receiving data performed by an user equipment (UE) in a wireless communication system according to the present disclosure includes receiving a first message for informing that a radio link quality value of a first base station (BS) for a specific Mission Critical Service (MCS) is changed from the first BS; receiving a second message including second radio link quality information associated with a radio link quality value of a second BS from the at least one second BS; and maintaining the first BS or switching to one of the at least one second BS based on the received first radio link quality information and the second radio link quality information.

19 Claims, 27 Drawing Sheets

(51) Int. Cl.
*H04B 17/309* (2015.01)
*H04W 76/15* (2018.01)

(58) Field of Classification Search
CPC ......... H04W 36/0009; H04W 36/0016; H04W 36/0083; H04W 36/00835; H04W 36/00837; H04W 36/0085; H04W 36/0088; H04W 36/0094; H04W 36/03; H04W 40/26; H04W 76/10; H04W 88/02; H04W 88/06; H04W 92/02; H04W 36/08; H04W 76/15; H04W 36/30
See application file for complete search history.

【Figure 1】
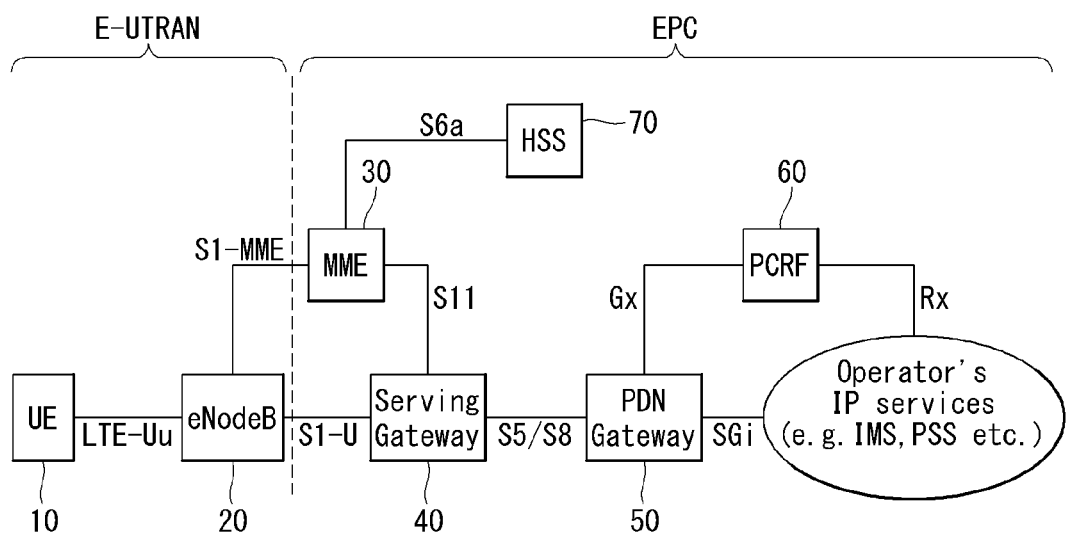

[Figure 2]
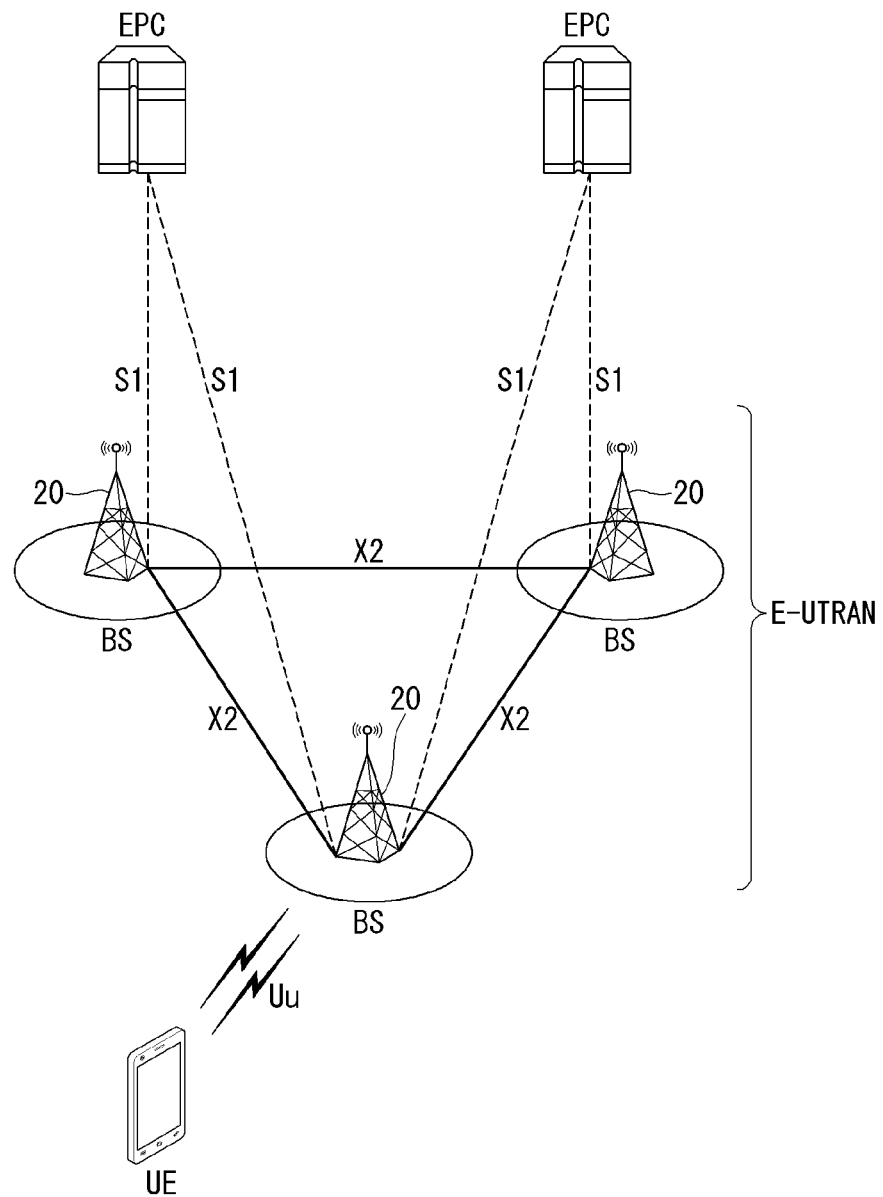

[Figure 3]
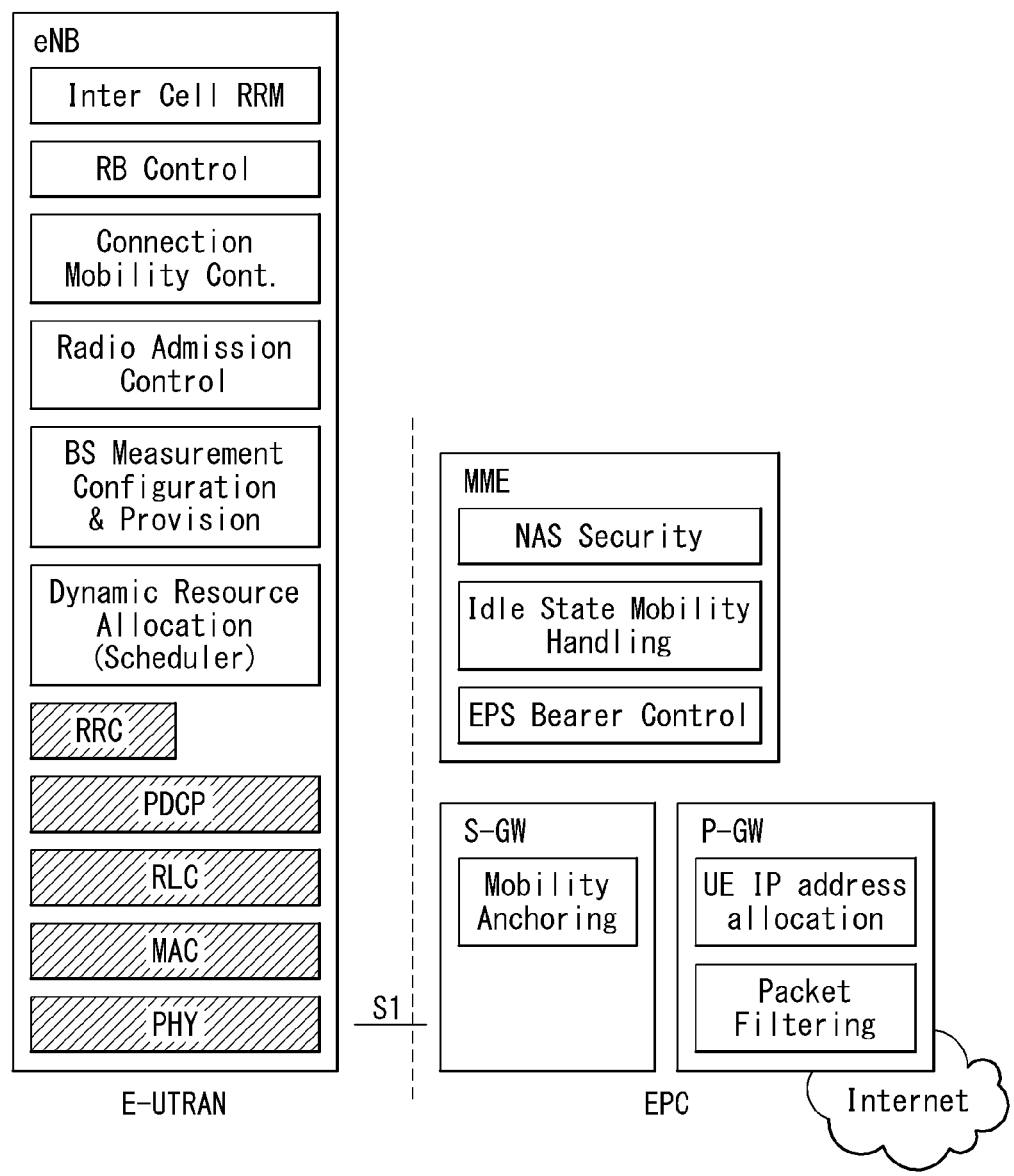

[Figure 4]
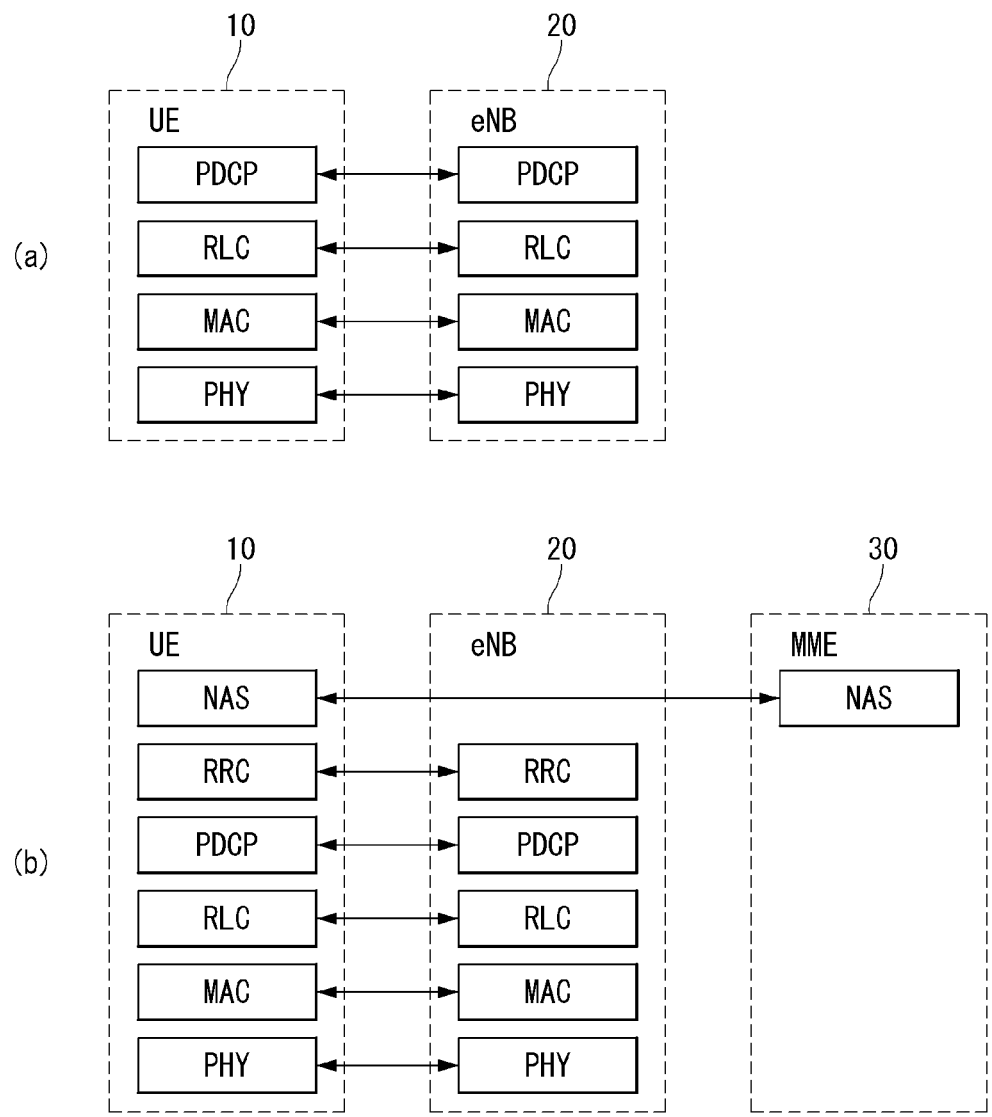

[Figure 5]
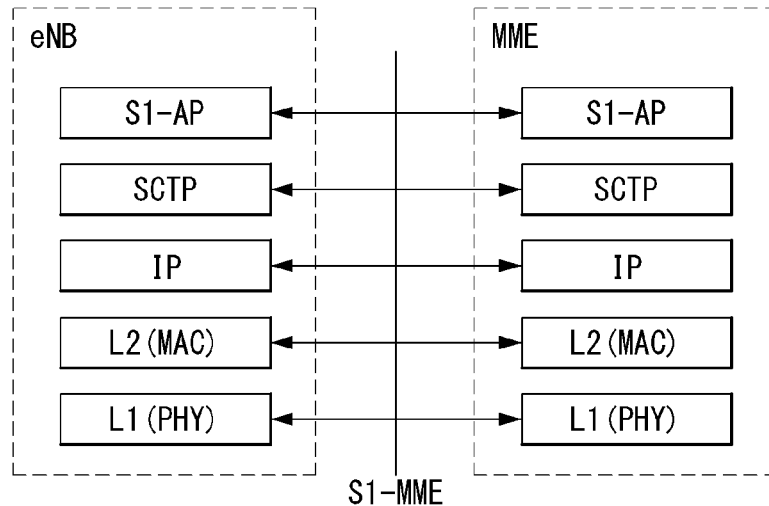
(a) control-plane protocol stack
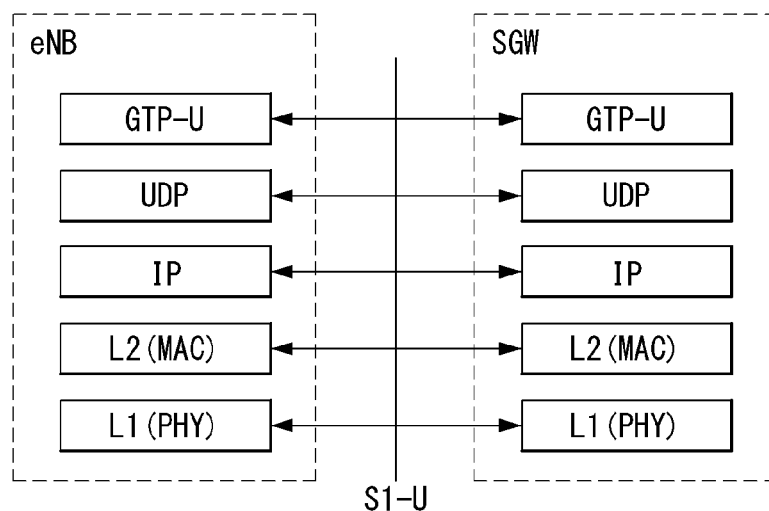
(b) user-plane protocol stack

[Figure 6]
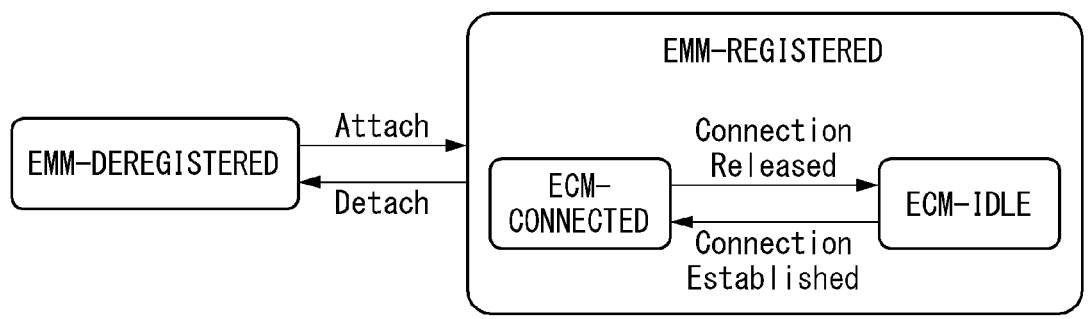

[Figure 7]
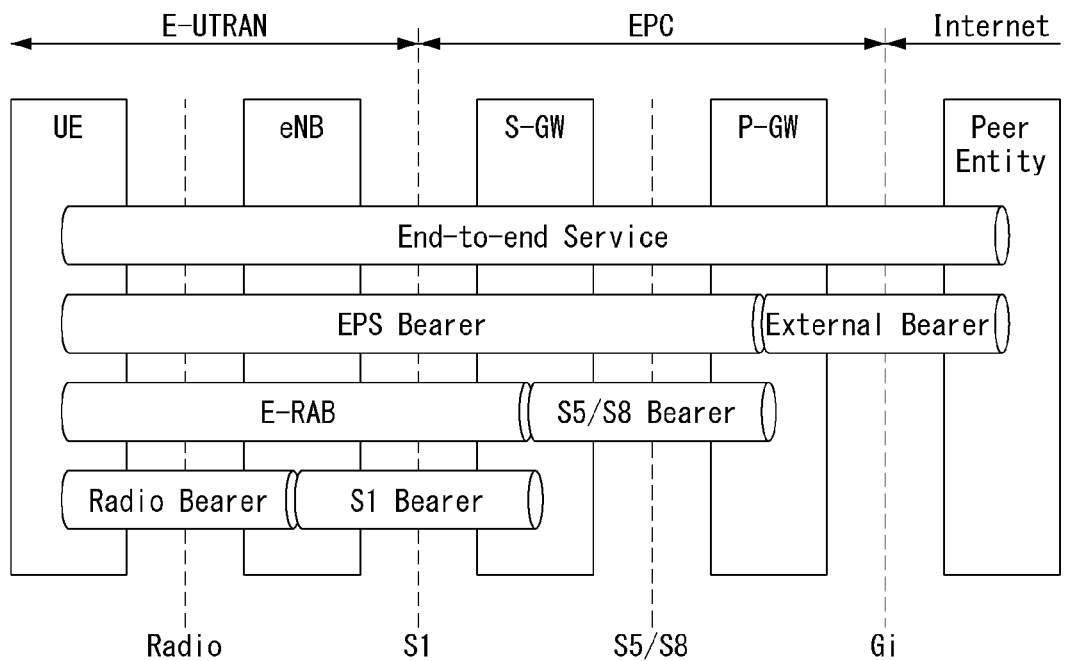

[Figure 8]
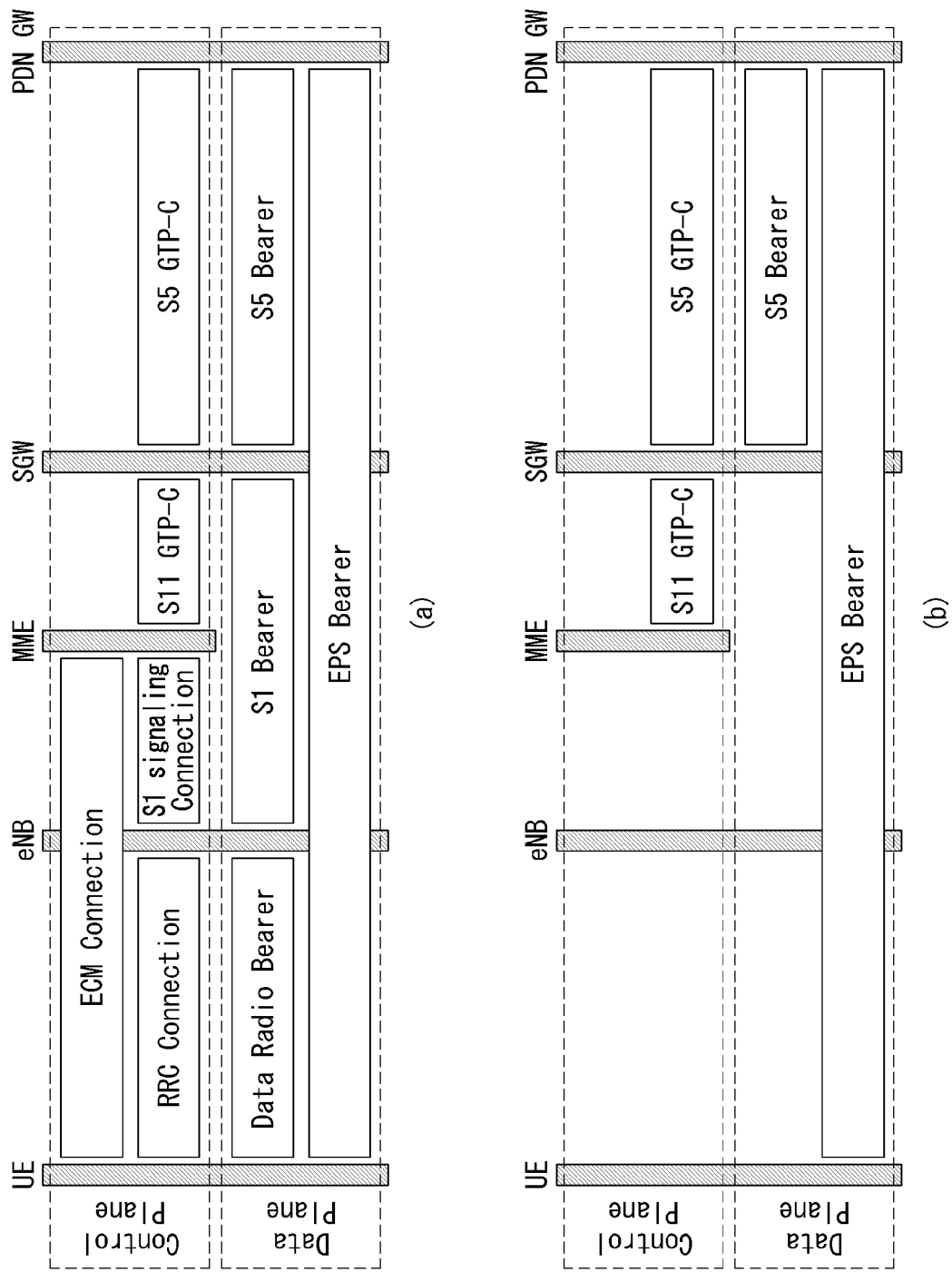

[Figure 9]
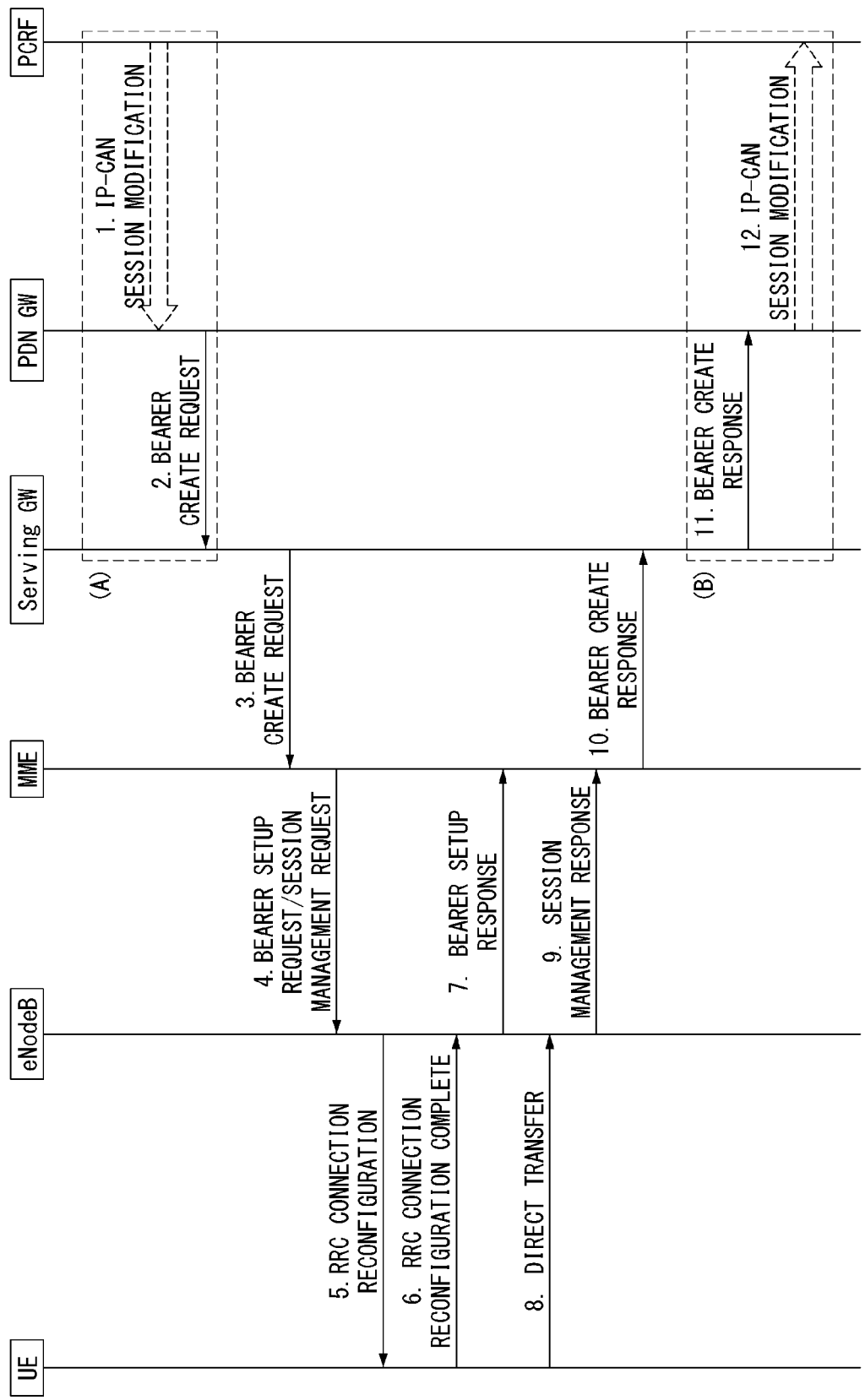

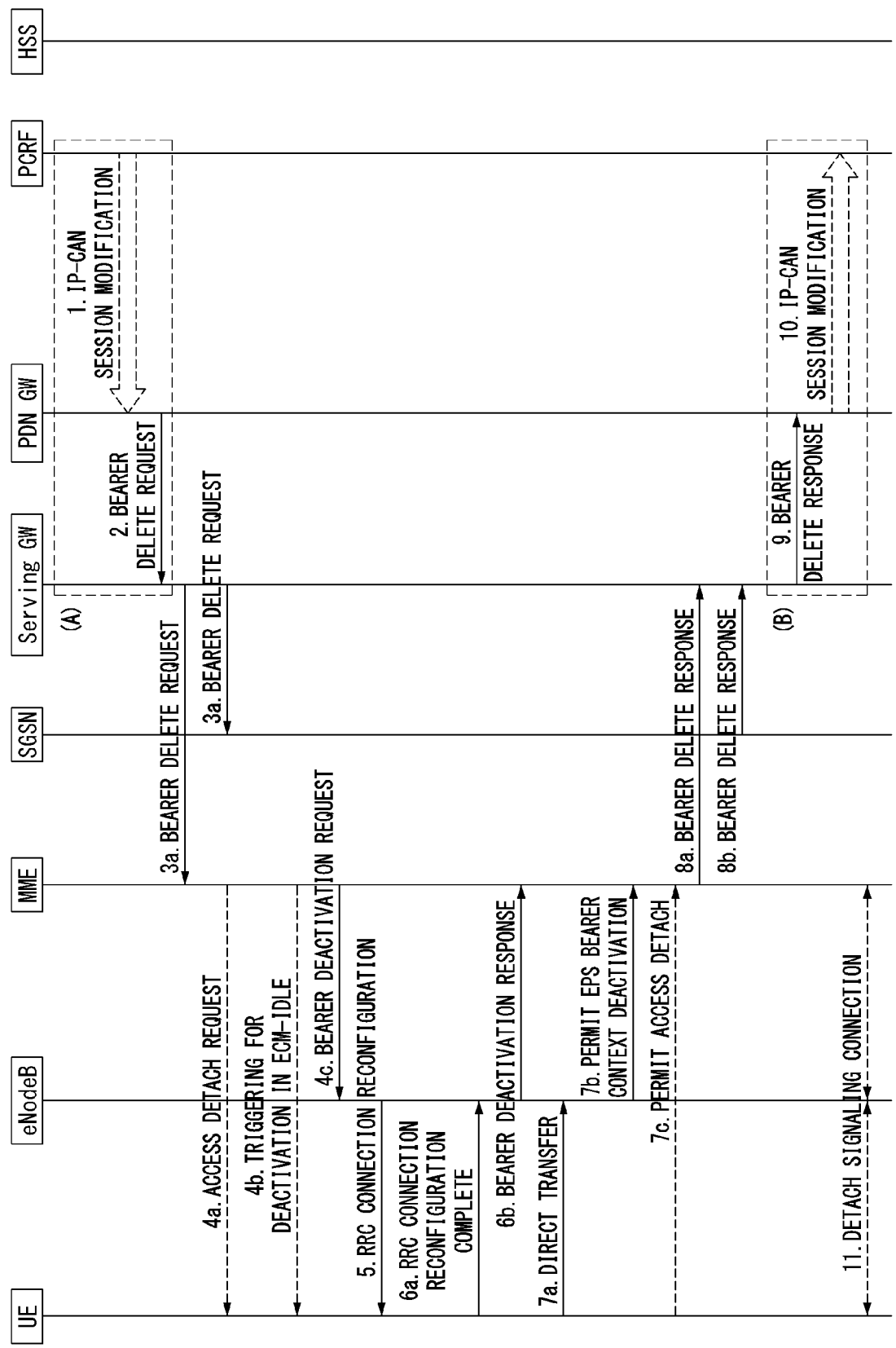
[Figure 10]

[Figure 11]
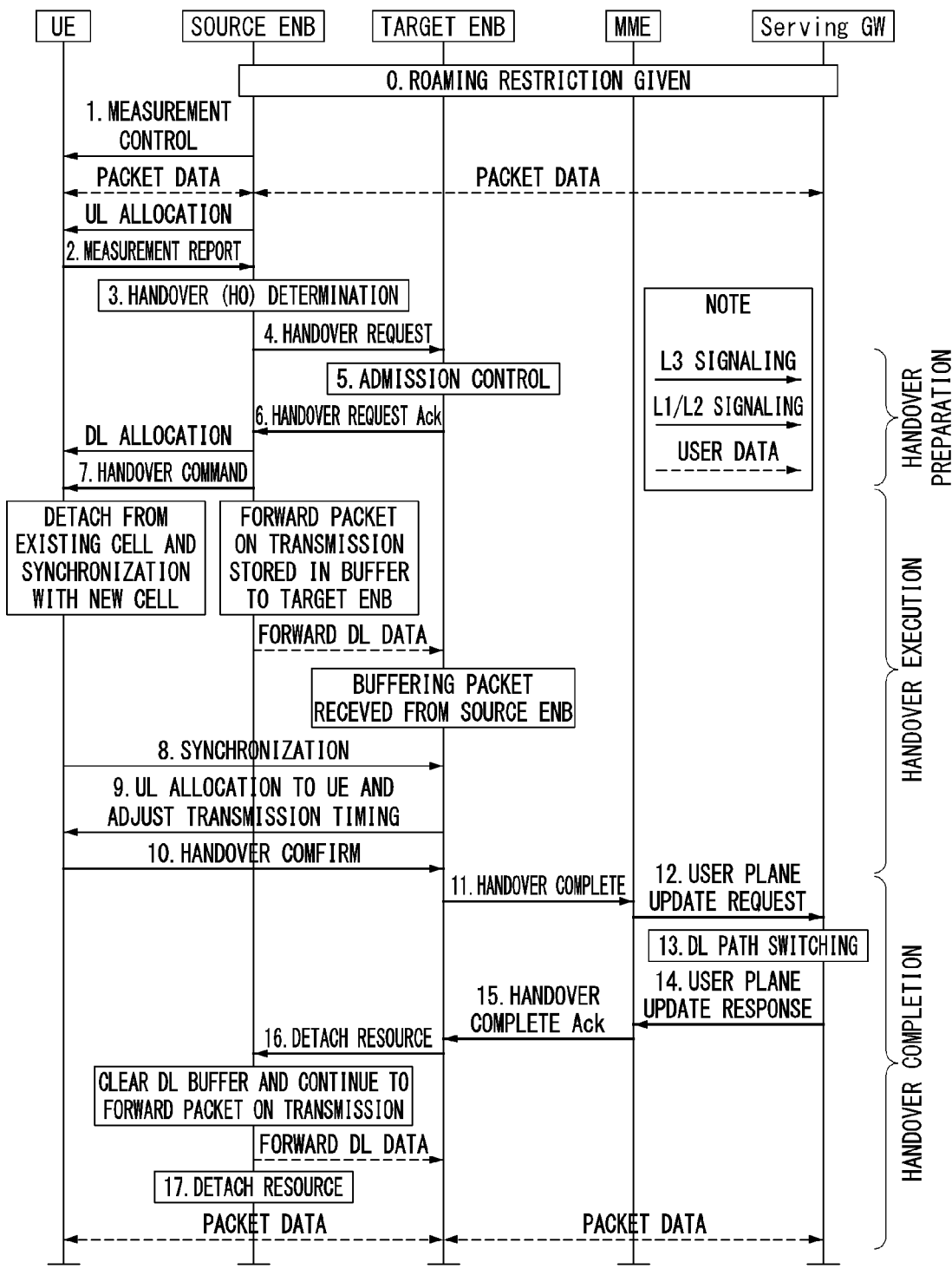

[Figure 12]
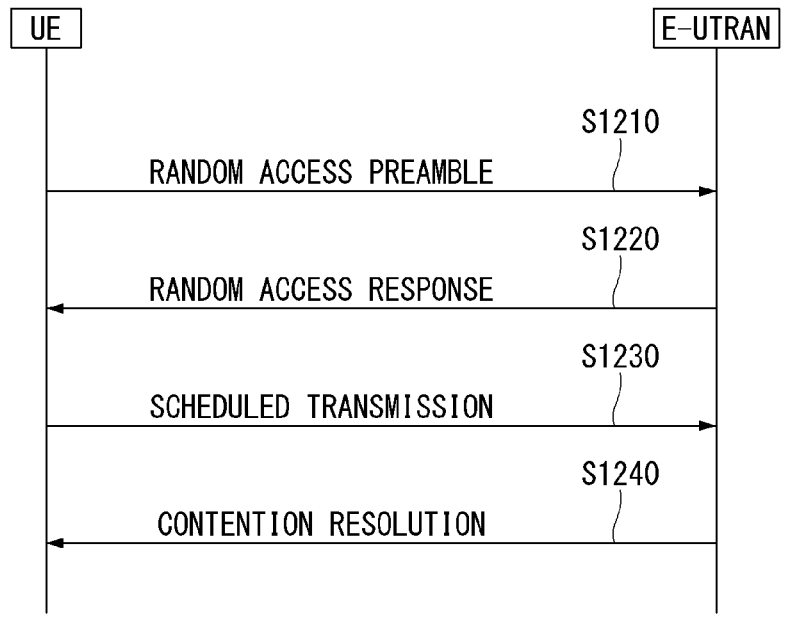
[Figure 13]
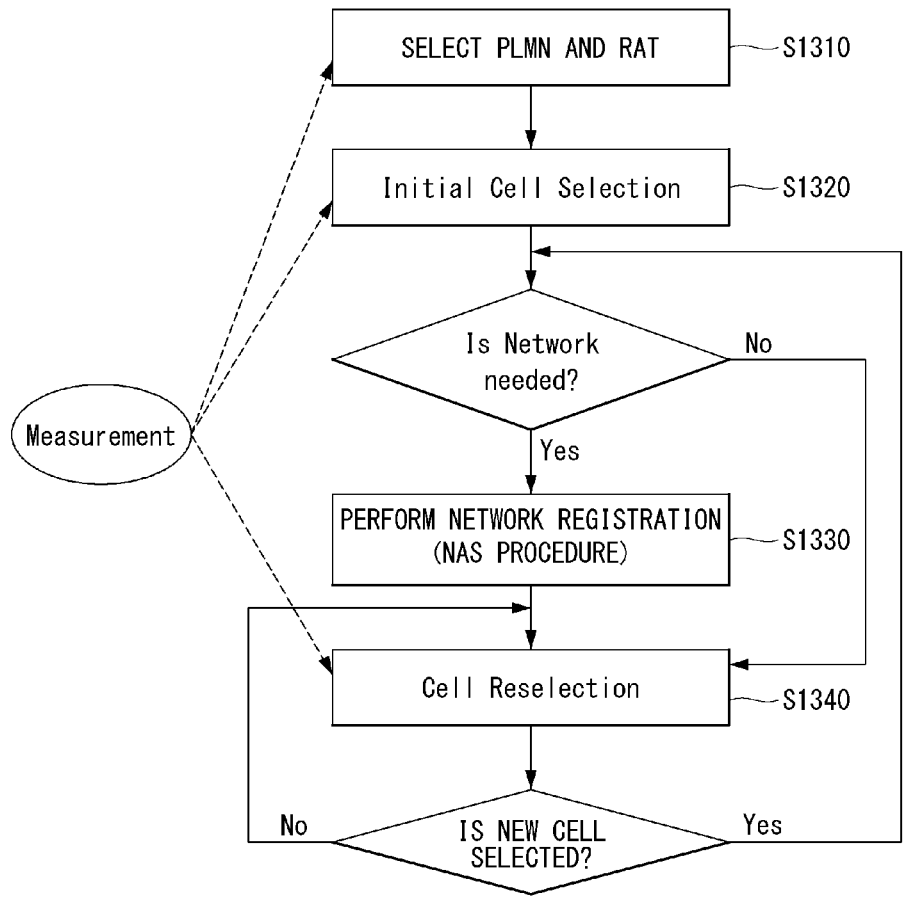

[Figure 14]
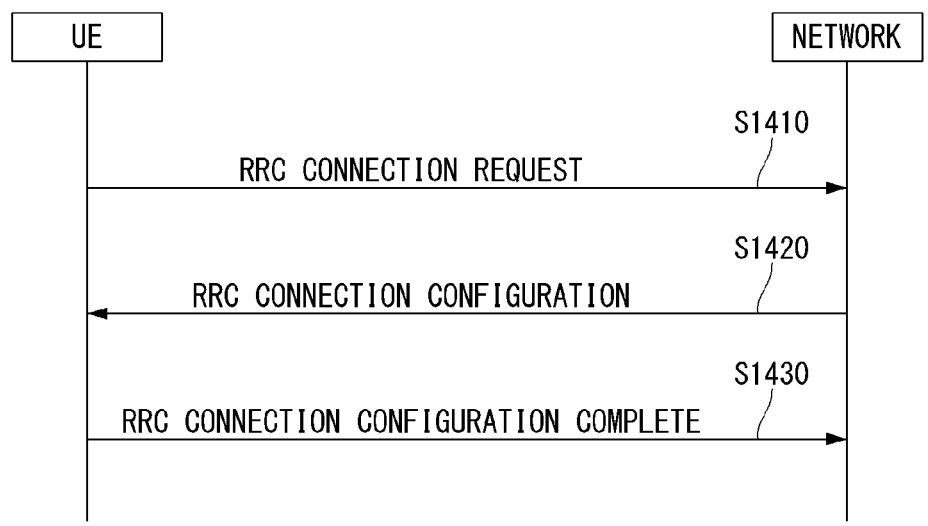
[Figure 15]
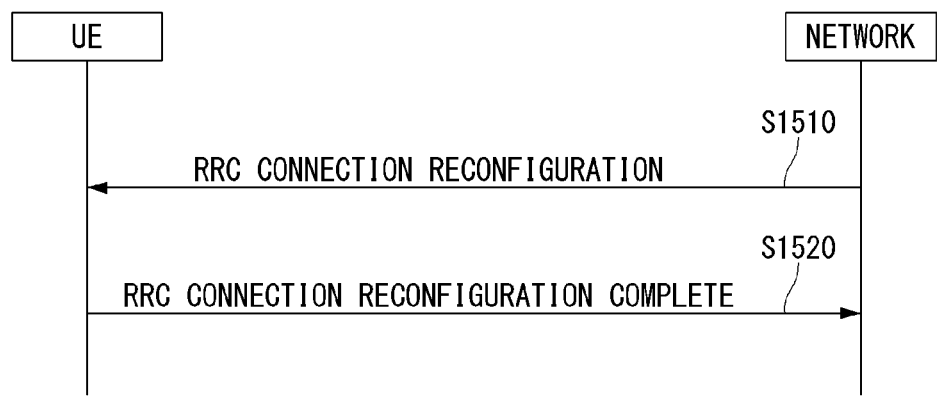

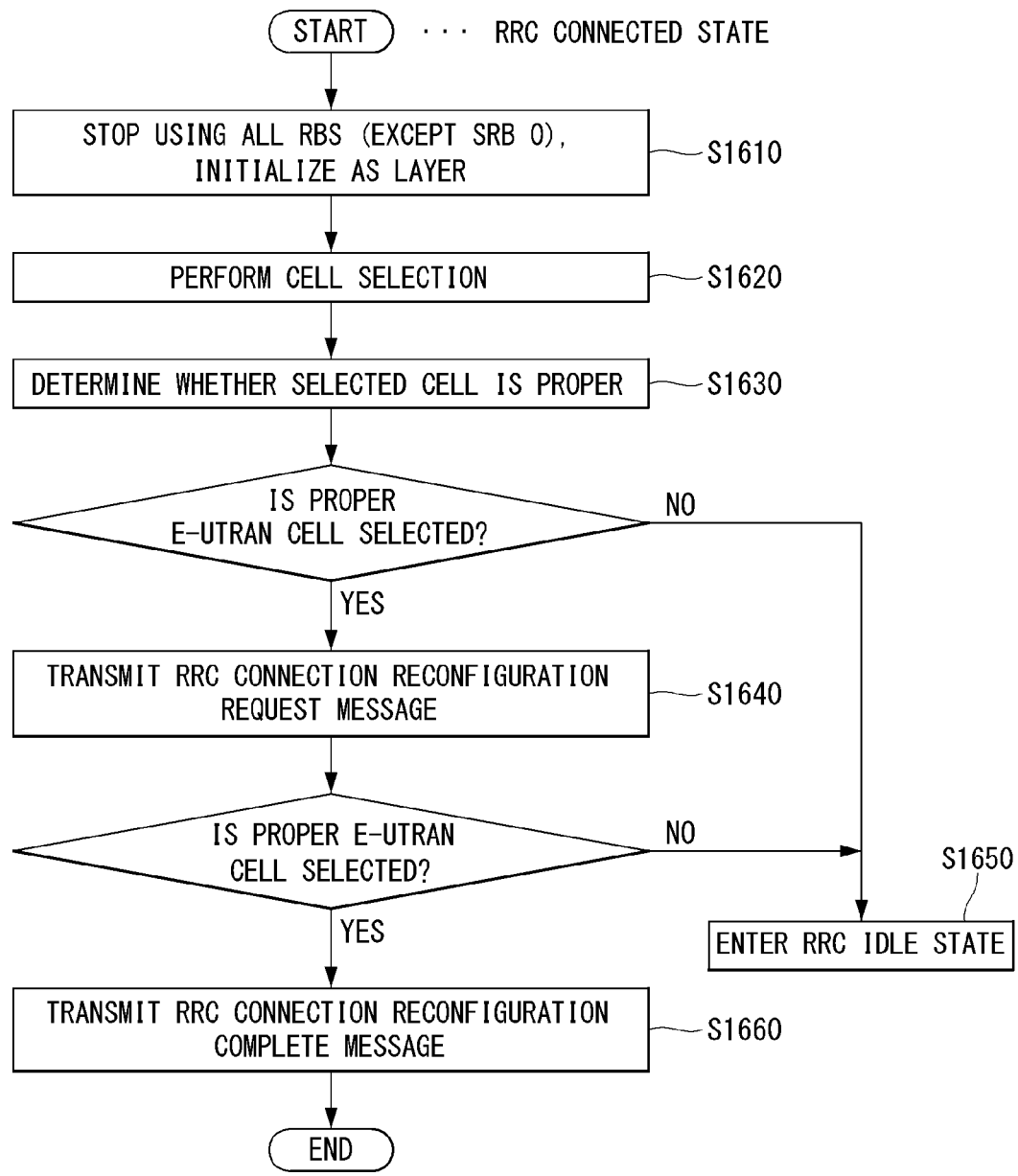

【Figure 17】
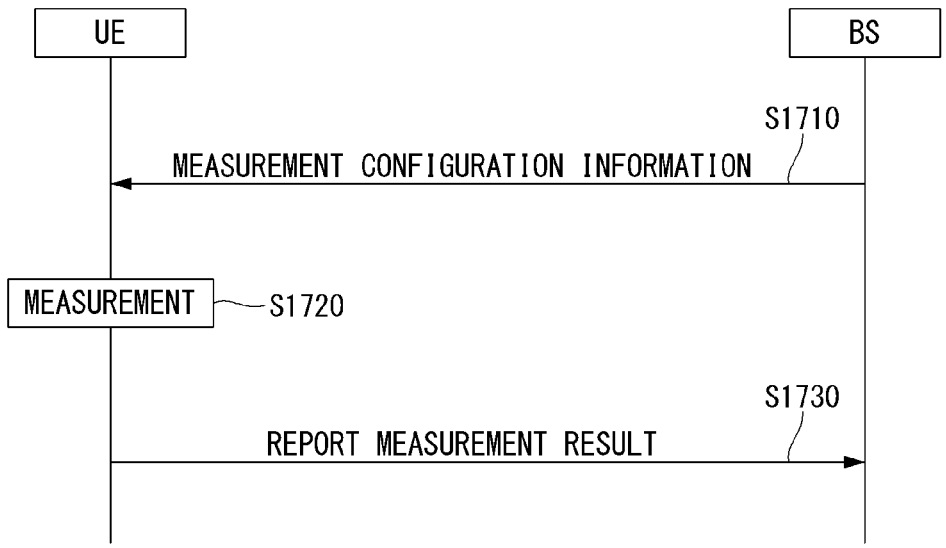
【Figure 18】
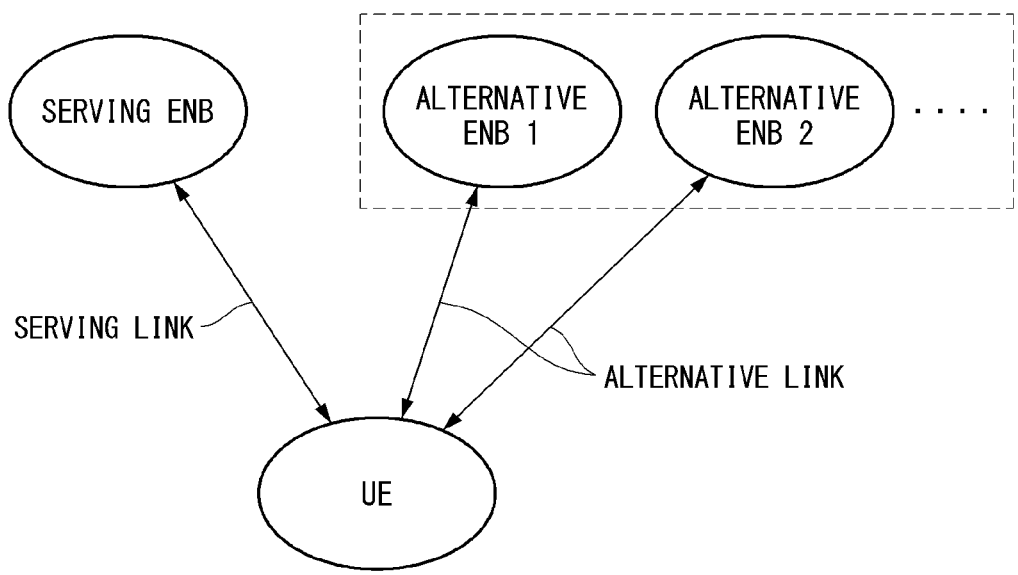

【Figure 19a】
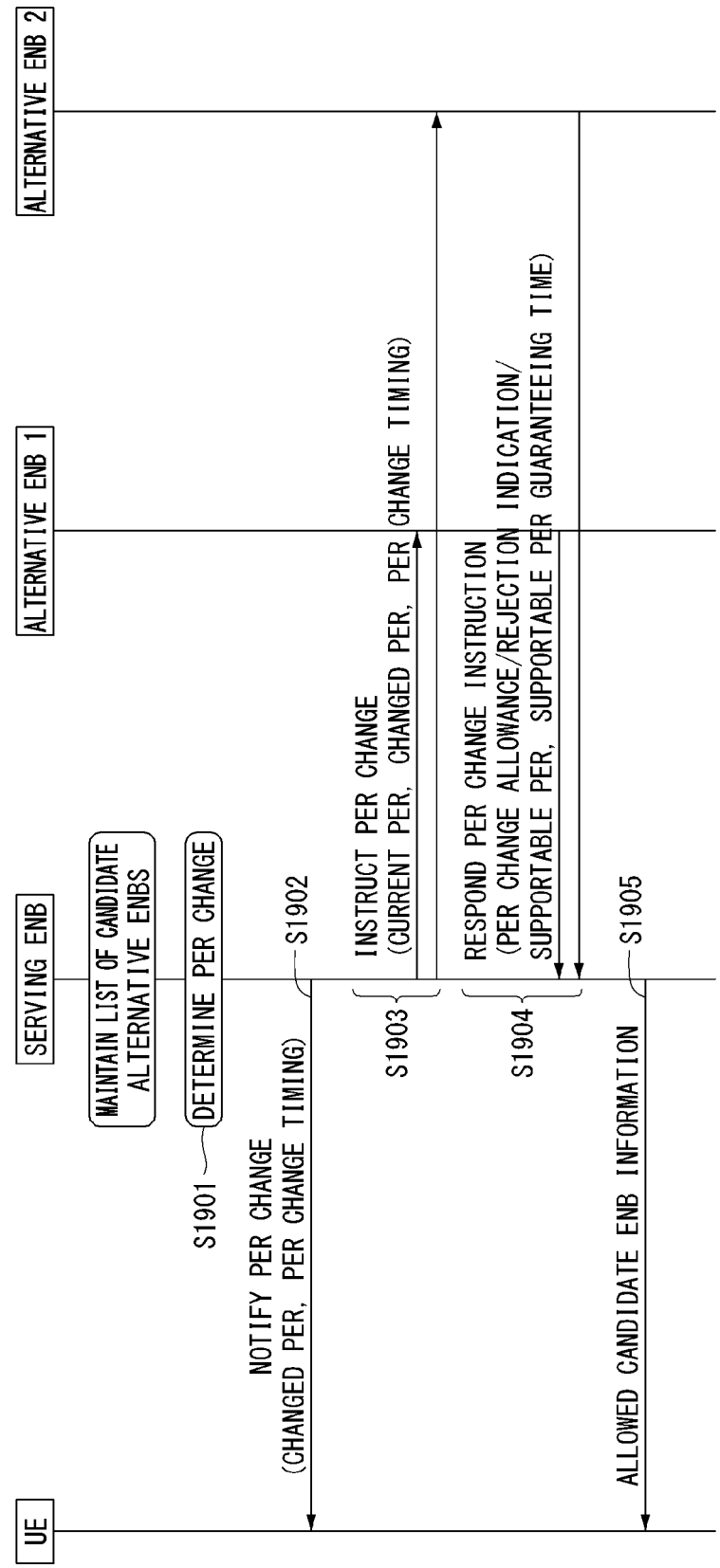

[Figure 19b]
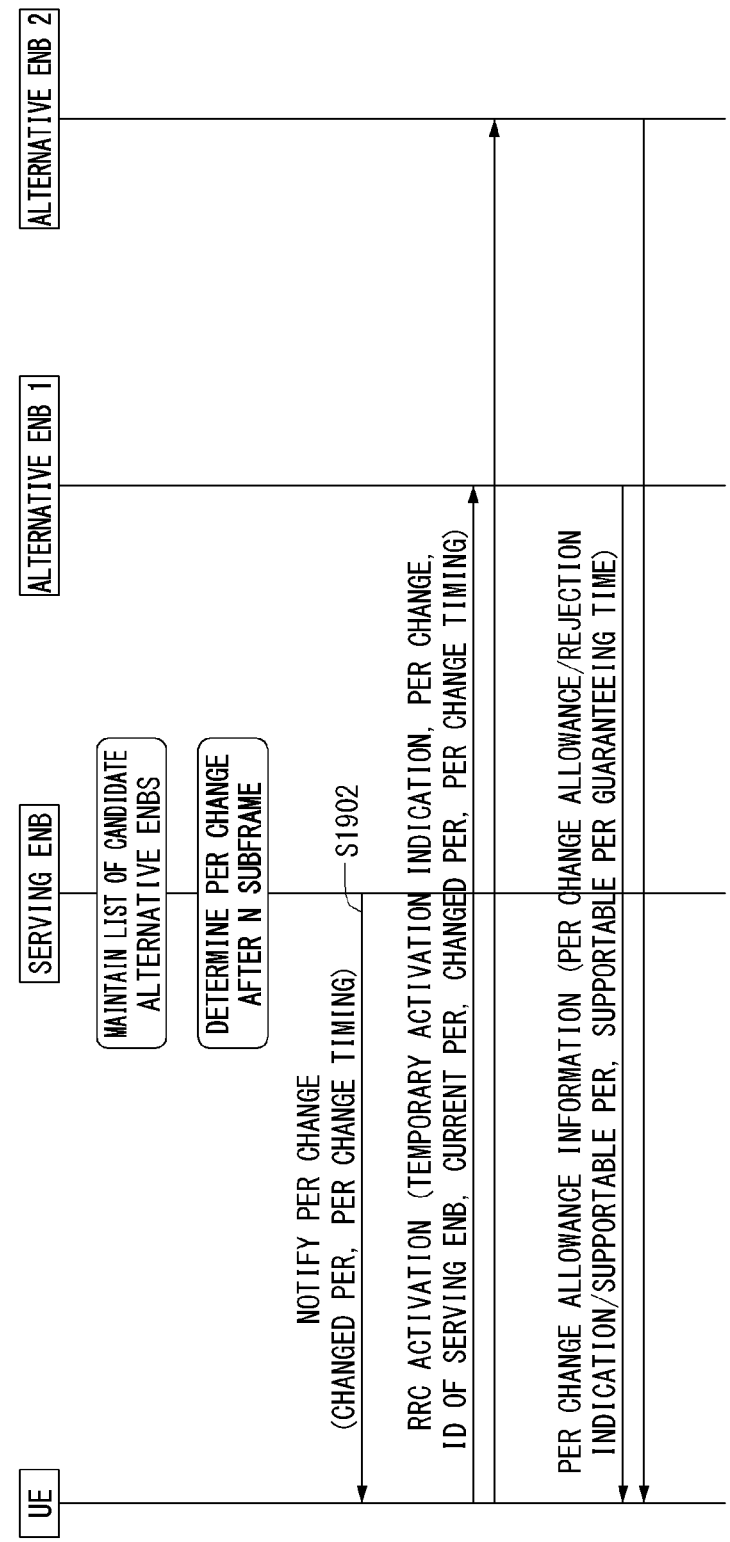

[Figure 20]
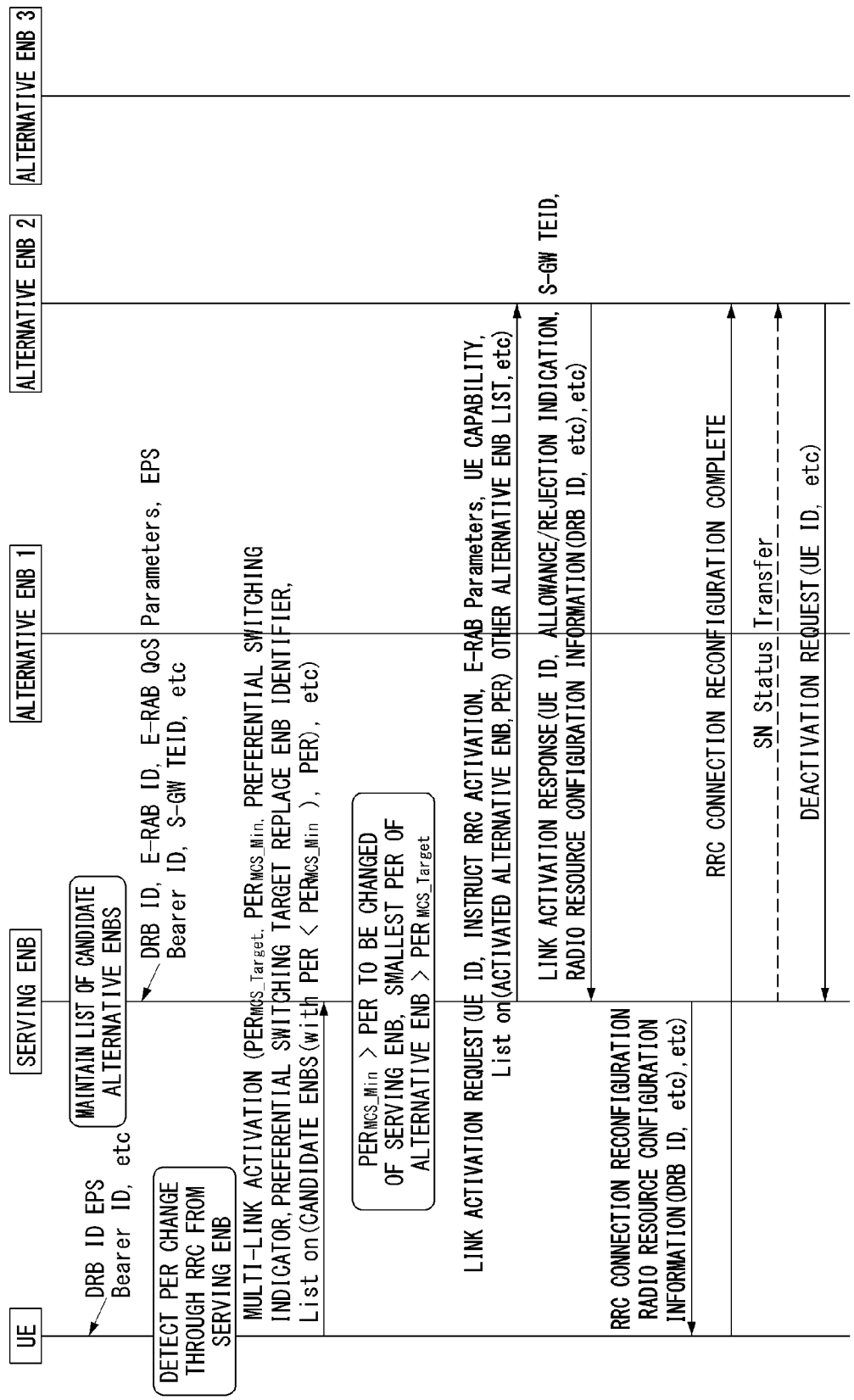

[Figure 21]
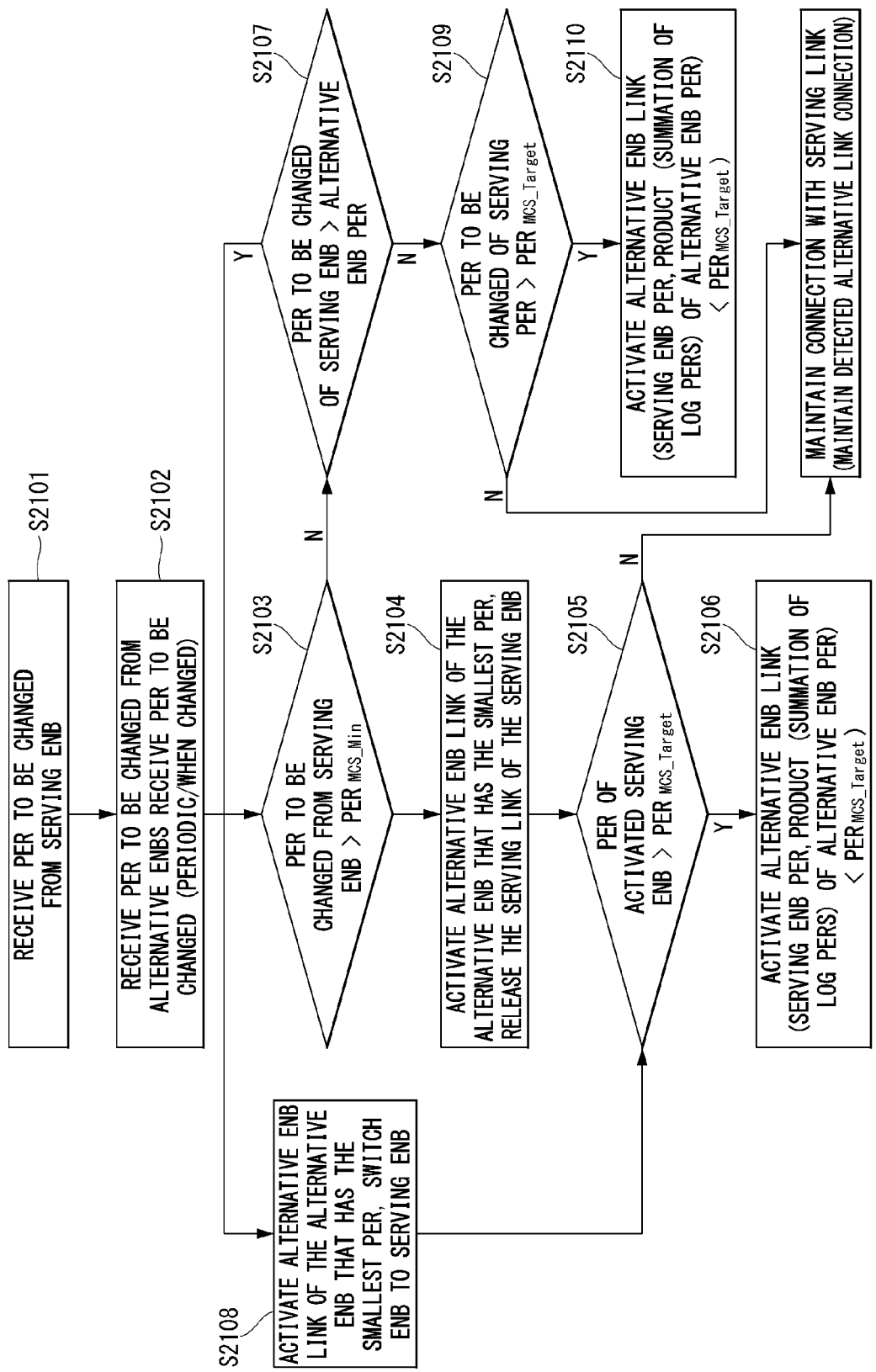

[Figure 22]
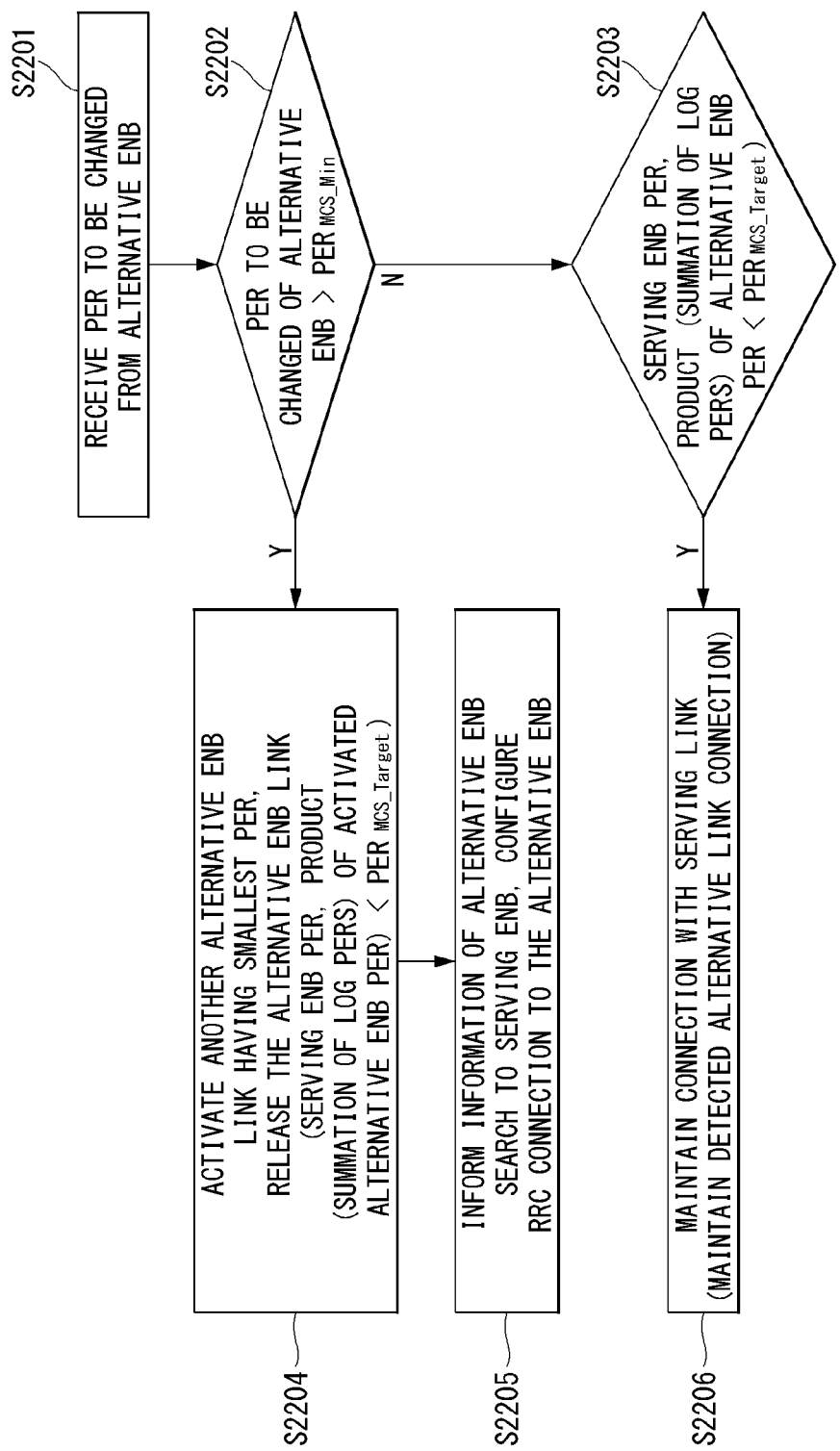

[Figure 23]
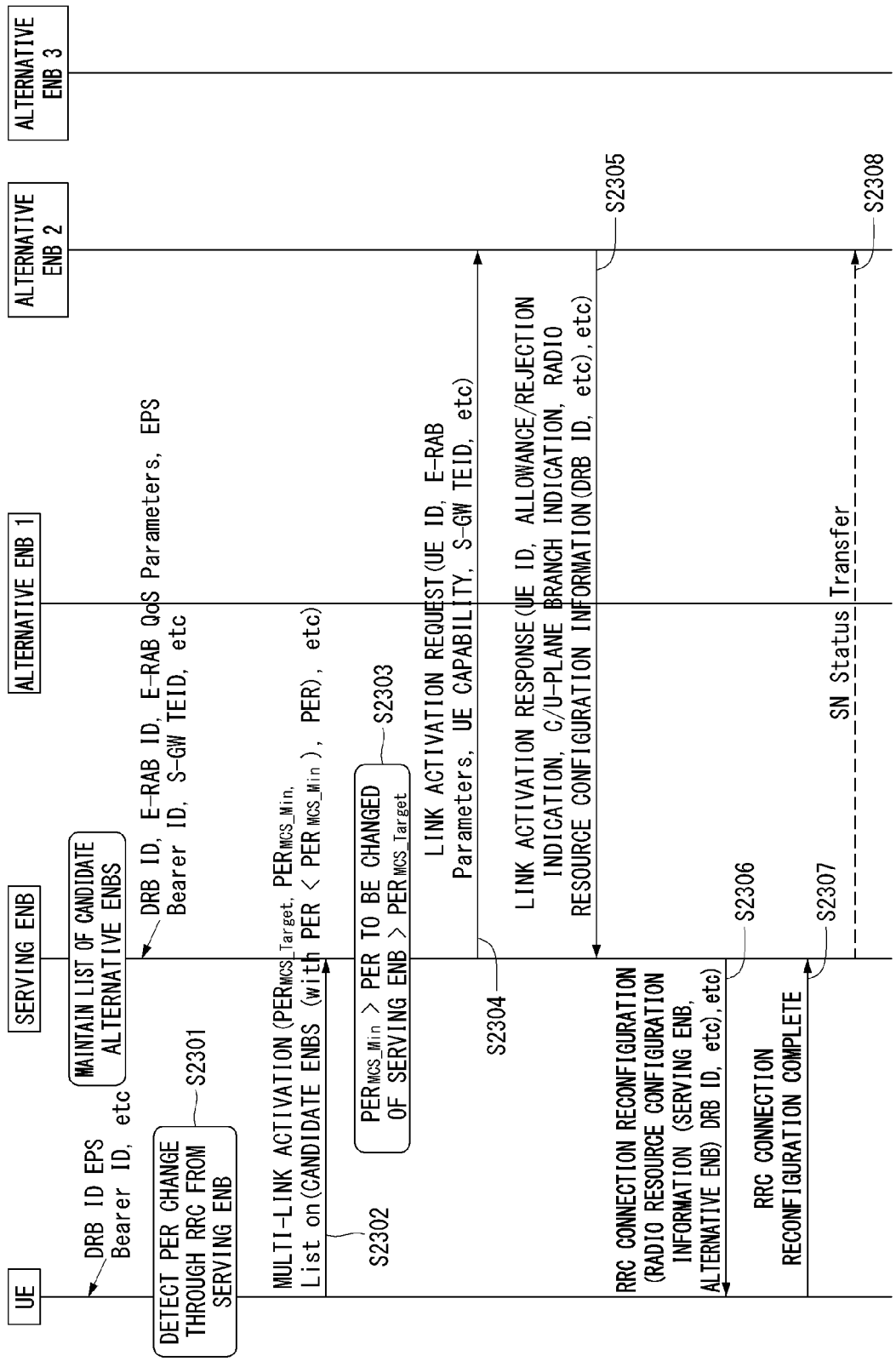

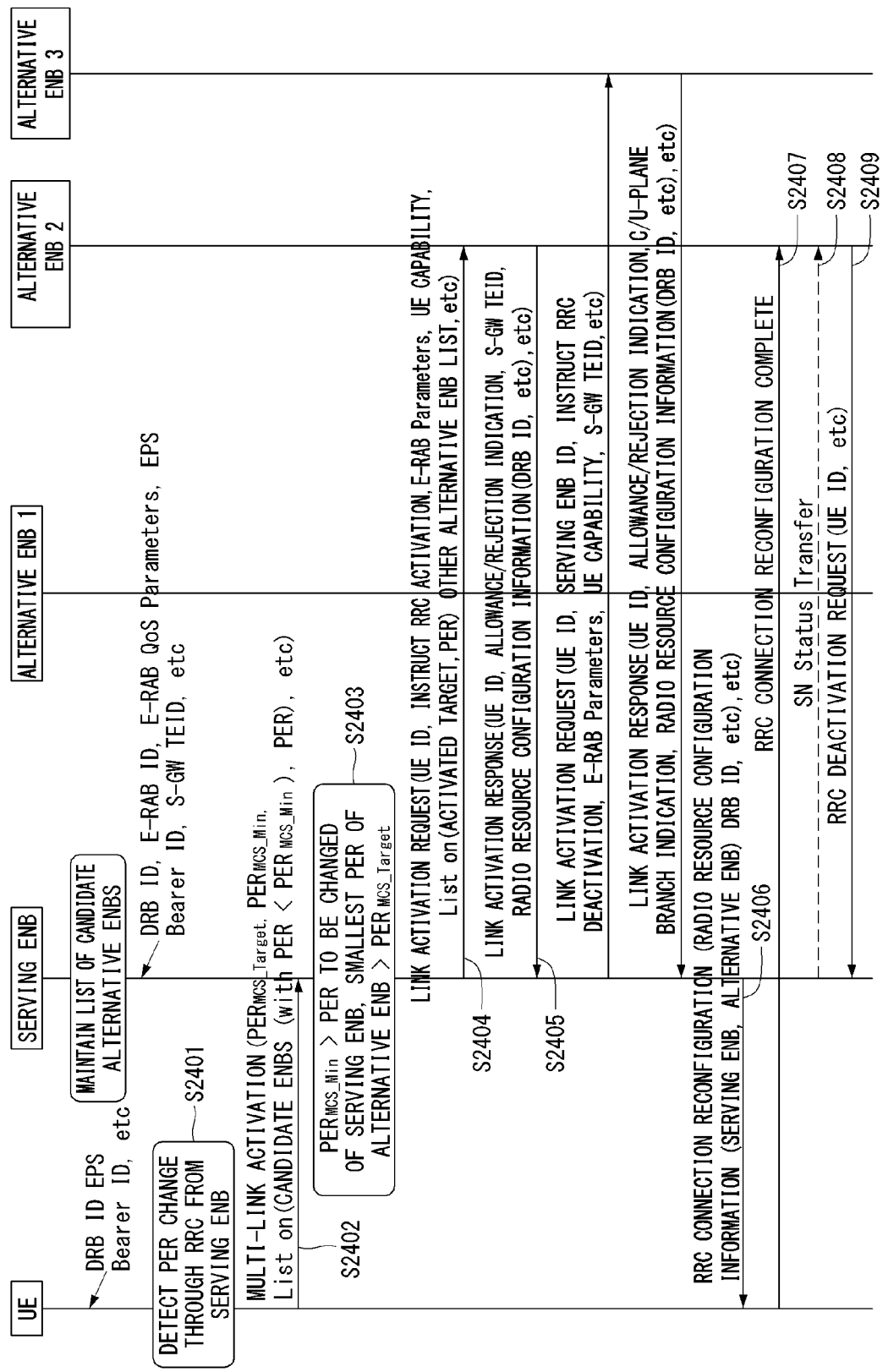
[Figure 24]

[Figure 25]
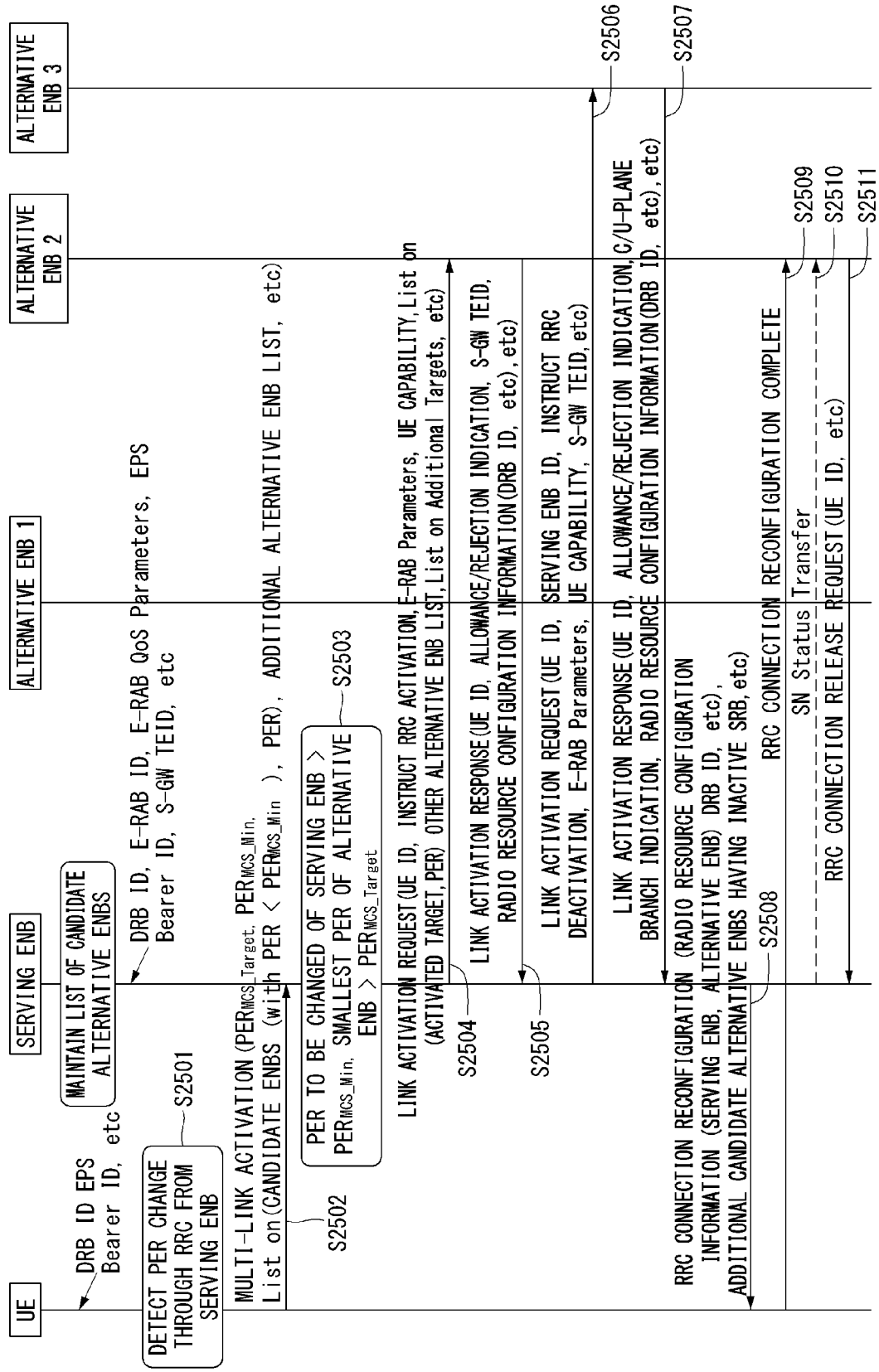

【Figure 26a】
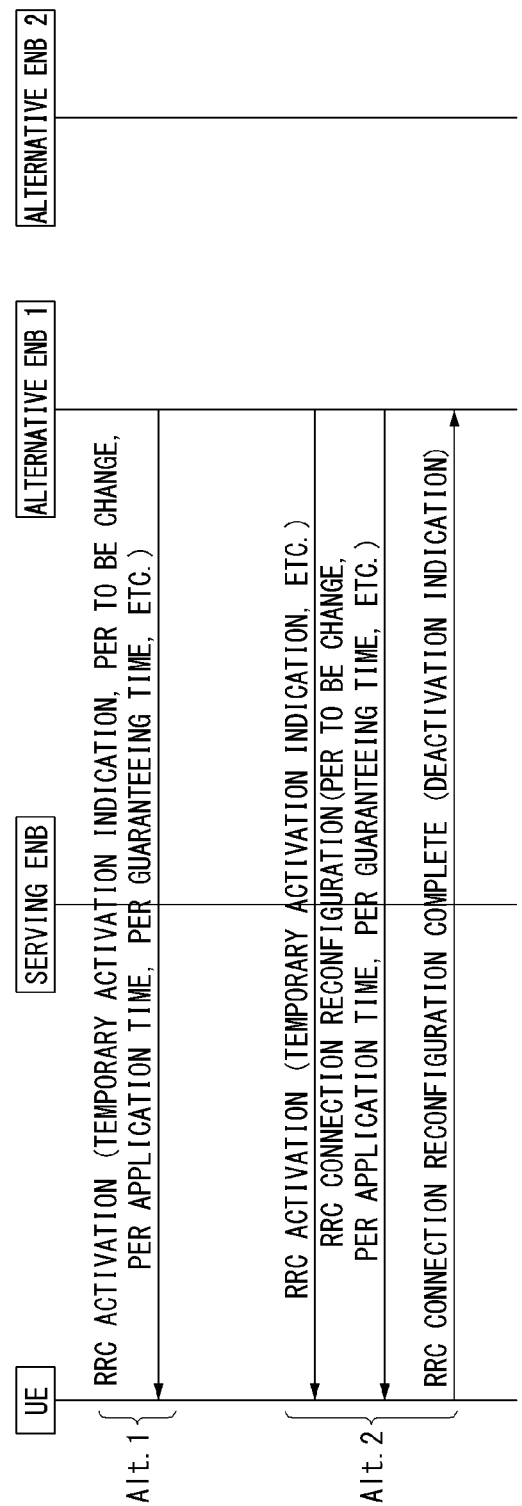

[Figure 26b]
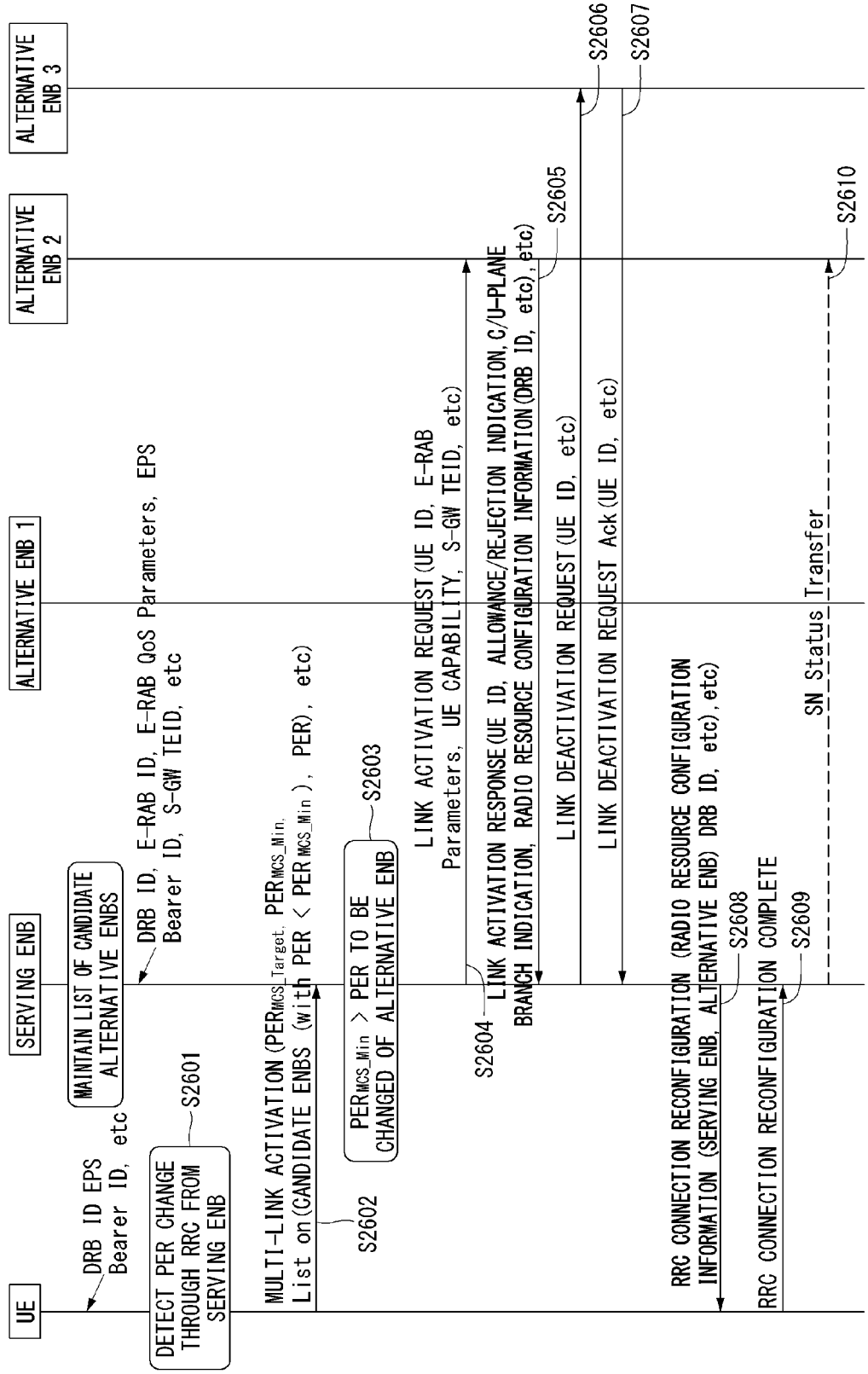

【Figure 27】
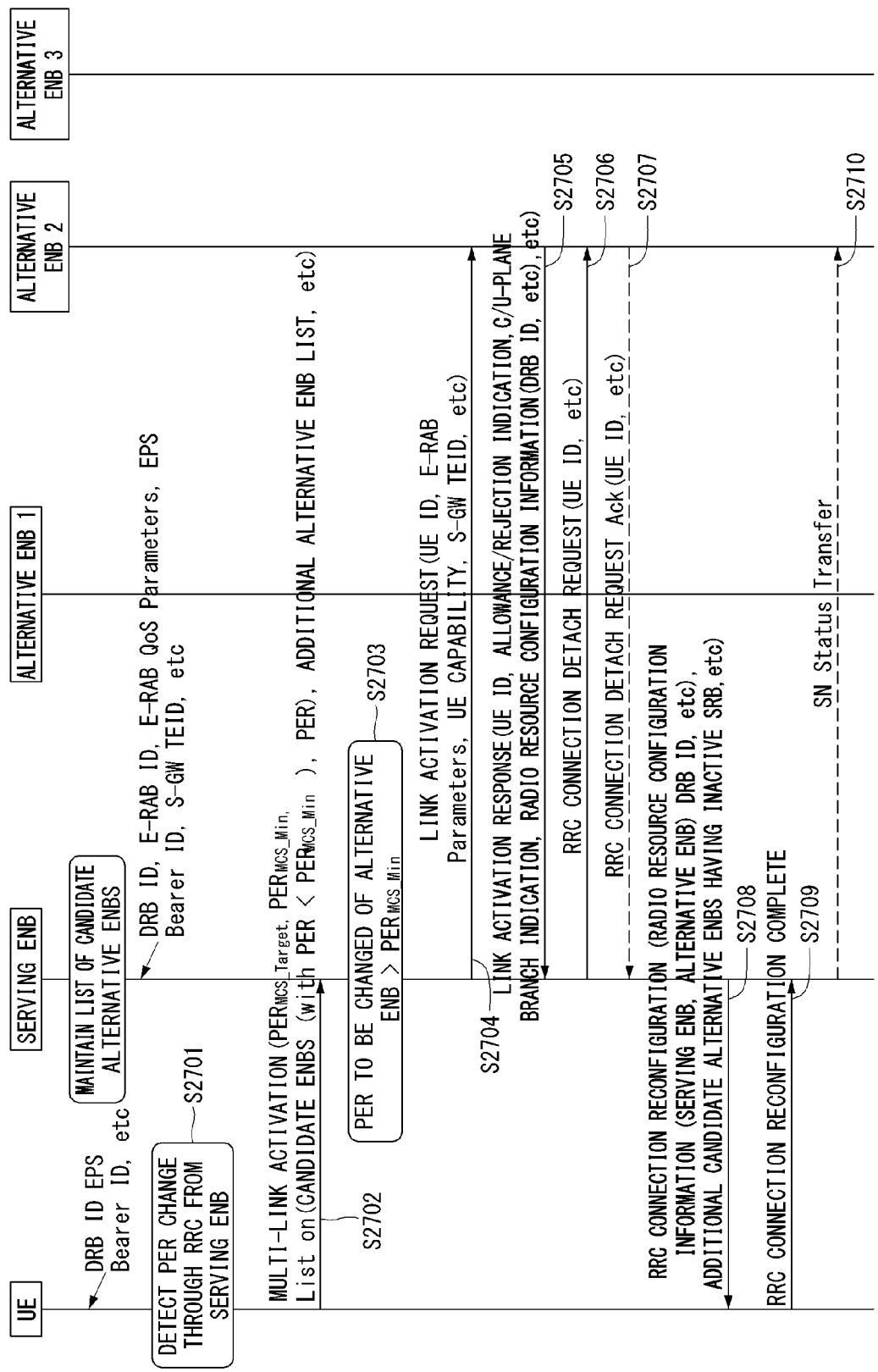

[Figure 28]
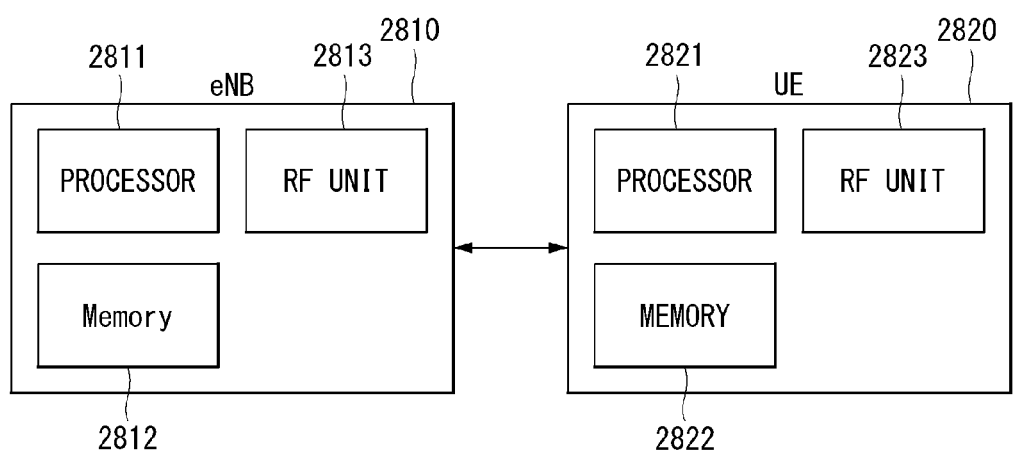

METHOD OF TRANSMITTING AND RECEIVING DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/010565, filed on Oct. 6, 2015, the contents of which are all hereby incorporated by reference herein in their entirety.

TECHNICAL FIELD

The present invention relates to wireless communication systems, and more particularly, to a method for transmitting and receiving data and an apparatus for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

The radio link availability of the current LTE/LTE-A system entirely depends on network coverage provision probability, which reaches to 95%.

In addition, it is assumed that the radio reliability of the LTE/LTE-A system may provide sufficient reliability with H-ARQ retransmission in the case of Unicast data through a PDSCH, without distinction of a control plane (C-plane) and a user plane (U-plane), to which Block Error Rate (BER) of $10^{-3}$ is applied.

Currently, although the LTE/LTE-A system is greatly invigorated and has been providing various services, it is unable to provide a connectivity that guarantees the reliability for satisfying Mission Critical Services (MCSs) always for all time durations.

This is because the LTE/LTE-A system itself is designed to provide relatively good connectivity with respect to most of times, and accordingly, the LTE/LTE-A system provides data rate close to '0' in a particular Poor Coverage in which severe interference is undergone or network resources are in overload state.

In the future, it is expected that new MCSs largely depending on availability/reliability of radio link are advent for satisfying a high level of communication quality, and an evolution of wireless technology is required, which may accommodate such new MCSs.

DISCLOSURE

Technical Problem

An object of the present disclosure is to provide a method for realizing 'Truly Reliable Communication' of 5G, going away from 'Best Effort Mobile Broadband' of the current LTE/LTE-A system.

In addition, an object of the present disclosure is to provide a method for switching a serving base station by activating an RRC connection to any one alternative base station among the base stations which are already secured, when a radio link quality value of the serving base station or the alternative base station of a user equipment is changed.

In addition, an object of the present disclosure is to provide a method for configuring a bearer quickly through an alternative base station in which an RRC connection is activated.

In addition, an object of the present disclosure is to provide a method for configuring a bearer additionally through another alternative base station, in the case that link quality of a serving base station (or product of link quality of the serving base station and link quality of the alternative base station) is unable to satisfy target link quality of a specific MCS.

In addition, an object of the present disclosure is to provide a method for switching a serving base station to another alternative base station while maintaining a bearer configured with alternative base stations, when link quality of the serving base station of an user equipment holding a multi-connection base station is degraded.

The technical objects to attain in the present disclosure are not limited to the above-described technical objects and other technical objects which are not described herein will become apparent to those skilled in the art from the following description.

Technical Solution

A method for transmitting and receiving data performed by a user equipment (UE) in a wireless communication system according to the present disclosure includes receiving a first message for informing that a radio link quality value of a first base station (BS) for a specific Mission Critical Service (MCS) is changed from the first BS, and the first message includes first radio link quality information; receiving a second message including second radio link quality information associated with a radio link quality value of a second BS from the at least one second BS; and maintaining the first BS or switching to one of the at least one second BS based on the received first radio link quality information and the second radio link quality information, and the second radio link quality information includes at least one of a supportable radio link quality value for the MCS or a radio link quality value guaranteeing time indicating a time when the supportable radio link quality value is guaranteed.

In addition, the present disclosure further includes receiving a third message including information associated with a candidate second BS available to replace the first BS from the first BS.

In addition, in the present disclosure, an alternative link in Signaling Radio Bearer (SRB) inactive state is configured to the UE and the at least one second BS.

In addition, the present disclosure further includes instructing to switch a state of the alternative link of the at least one second BS from SRB inactive to SRB active.

In addition, in the present disclosure, the second message is received from the at least one second BS through the alternative link in SRB active state.

In addition, in the present disclosure, the first radio link quality information includes at least one of a current radio link quality value, a radio link quality value to be changed or timing information indicating a timing when the radio link quality value to be changed is applied.

In addition, the present disclosure further includes receiving control information indicating a transmission time of the first radio link quality information from the first BS.

In addition, in the present disclosure, the second radio link quality information is received from the at least one second BS within a predetermined time from the transmission time.

In addition, the present disclosure further includes comparing the radio link quality value to be changed, of the first BS with a minimum radio link quality value ($PER_{MCS\_Min}$) and/or a target radio link quality value ($PER_{MCS\_Target}$) for the specific MCS, and the first BS is maintained or switched to one second BS among the at least one second BS according to a result of the comparison.

In addition, in the present disclosure, the first BS is switched to the second BS, when the radio link quality value to be changed, of the first BS, is greater than the minimum radio link quality value for the specific MCS, or when the radio link quality value to be changed, of the first BS, is smaller than the minimum radio link quality value for the specific MCS, greater than the target radio link quality value for the specific MCS, and the radio link quality value of the second BS is smaller than the radio link quality value to be changed, of the first BS.

In addition, in the present disclosure, the first BS is maintained, when the radio link quality value to be changed, of the first BS, is smaller than the minimum radio link quality value for the specific MCS.

In addition, the present disclosure further includes configuring Data Radio Bearer with one second BS among the at least one second BS.

In addition, in the present disclosure, when the radio link quality value of the at least one second BS is smaller than the target radio link quality value for the specific MCS, the specific MCS is provided only by the one second BS.

In addition, in the present disclosure, when the radio link quality value of the at least one second BS is greater than the target radio link quality value for the specific MCS, the specific MCS is provided through the first BS and the one second BS.

In addition, in the present disclosure, the one second BS is the second BS in which a product of the radio link quality value of the one second BS and the radio link quality value to be changed, of the first BS, is a smallest and has a value smaller than the target radio link quality value for the specific MCS.

In addition, in the present disclosure, the one second BS is the second BS in which a product of the radio link quality value of the one second BS and the radio link quality value to be changed, of the first BS, is smaller than the target radio link quality value for the specific MCS, and has a longest value of the radio link quality value guaranteeing time.

In addition, in the present disclosure, the radio link quality value is a Packet Error Rate (PER) or a number of resources allocated to the UE.

In addition, in the present disclosure, the first BS is a serving BS, and the second BS is an alternative BS.

In addition, a user equipment (UE) for transmitting and receiving data in a wireless communication system according to the present disclosure includes a communication unit for transmitting and receiving a radio signal with exterior; and a processor functionally connected to the communication unit, the processor is configured to perform: receiving a first message for informing that a radio link quality value of a first base station (BS) for a specific Mission Critical Service (MCS) is changed from the first BS; receiving a second message including second radio link quality information associated with a radio link quality value of a second BS from the at least one second BS; and maintaining the first BS or switching to one of the at least one second BS based on the received first radio link quality information and the second radio link quality information, and the first message includes first radio link quality information, and the second radio link quality information includes at least one of a supportable radio link quality value for the MCS or a radio link quality value guaranteeing time indicating a time when the supportable radio link quality value is guaranteed.

Technical Effects

According to the present disclosure, an optimal alternative base station is determined among the alternative base stations that are already secured when radio link quality value of a serving base station and an alternative base station is changed, and accordingly, there is an effect of activating an RRC connection to the corresponding alternative base station link, and configuring a bearer quickly through the corresponding alternative base station.

In addition, according to the present disclosure, a user equipment leads a connection configuration and a renewal for neighboring alternative base stations, and accordingly, there is an effect that sufficient service availability is secured for being provided with MCSs.

That is, when a user equipment detects neighboring channel situation changes and performs Reliable Communication that satisfies low latency and high reliability at the same time by determining or deciding an optimal alternative base station, there is an effect of realizing whenever and wherever it is usable.

In addition, according to the present disclosure, an adjacent alternative base station is secured always to avoid Link Outage, and accordingly, there is an effect of handling Link Failure and Connection Failure quickly, realizing high reliable Cloud Connectivity, and improving data rate for being provided with MCSs.

The technical effects obtained in the present invention are not limited to the technical effects described above, and other technical effects not mentioned herein may be understood to those skilled in the art from the description below.

DESCRIPTION OF DRAWINGS

FIG. 1 is a view illustrating an Evolved Packet System which is associated with the Long Term Evolution (LTE) system to which the present invention can be applied.

FIG. 2 illustrates a wireless communication system to which the present invention is applied.

FIG. 3 illustrates an example of a functional split of an E-UTRAN and an EPC to which the present invention can be applied.

FIG. 4A is a diagram illustrating an example of a radio protocol architecture for a user plane to which the technical feature of the present disclosure may be applied.

FIG. 4B is a diagram illustrating an example of a radio protocol architecture for a control plane to which the technical feature of the present disclosure may be applied.

FIG. 5 illustrates an S1 interface protocol structure in a wireless communication system to which the present invention can be applied.

FIG. 6 is a diagram illustrating EMM and ECM states in a wireless communication system to which the present invention may be applied.

FIG. 7 illustrates a bearer structure in a wireless communication system to which the present invention may be applied.

FIG. 8 is a diagram illustrating transmission paths of a control plane and a user plane in an EMM registration state in a wireless communication system to which the present invention may be applied.

FIG. 9 is a diagram illustrating an example of a dedicated bearer activation procedure.

FIG. 10 is a diagram illustrating an example of a dedicated bearer deactivation procedure.

FIG. 11 illustrates a handover process defined in the LTE(-A).

FIG. 12 is a diagram for describing an operation process between a UE and an eNB in a contention-based random access procedure.

FIG. 13 is a flowchart illustrating an operation of a UE in RRC idle state to which the present invention may be applied.

FIG. 14 is a flowchart showing an RRC connection establishment procedure to which the present invention can be applied.

FIG. 15 is a flowchart showing an RRC connection reconfiguration procedure to which the present invention may be applied.

FIG. 16 is a view illustrating an example RRC connection reestablishment procedure to which the present invention can be applied.

FIG. 17 is a flowchart showing a method of performing measurement to which the present invention can be applied.

FIG. 18 is a conceptual diagram illustrating an alternative link to which the methods proposed in the present disclosure may be applied.

FIG. 19 is a flowchart illustrating an example of a method for determining whether to perform a switching of a serving eNB or a simultaneous transmission proposed in the present disclosure.

FIG. 20 is a flowchart illustrating an example of a preferential switching method proposed in the present disclosure.

FIG. 21 illustrates an overall flowchart of a connection activation method between a UE and an alternative eNB according to a PER change of a serving eNB proposed in the present disclosure.

FIG. 22 is a diagram illustrating an overall flowchart of a connection activation method between a UE and another alternative eNB according to a PER change of an alternative eNB proposed in the present disclosure.

FIGS. 23 to 25 are flowcharts illustrating an example of a method for switching a serving eNB and for updating an alternative eNB proposed in the present disclosure.

FIGS. 26 and 27 are flowcharts illustrating an example of an updating method of an alternative eNB according to a PER change of an alternative eNB proposed in the present disclosure.

FIG. 28 is a block diagram illustrating a wireless device in which methods as proposed in the present disclosure may be implemented.

BEST MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS)', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

FIG. 1 is a view illustrating an Evolved Packet System which is associated with the Long Term Evolution (LTE) system to which the present invention can be applied. The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention can be applied.

Referring to the FIG. 3, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as mentioned above, the gateway may perform functions of paging origination, LTE_IDLE state management, ciphering of the user plane, System Architecture Evolution (SAE) bearer control, and ciphering and integrity protection of NAS signaling.

FIG. 4A is a diagram illustrating a radio protocol architecture for a user plane. FIG. 4B is a diagram illustrating a radio protocol architecture for a control plane. The user plane is a protocol stack for user data transmission. The control plane is a protocol stack for control signal transmission.

Referring to FIGS. 4A and 4B, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

Referring to FIG. 5, the S1 control plane interface (S1-MME) is defined between the eNB and the MME. Similar to the user plane, the transport network layer is based on IP transmission. However, in order to ensure a reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only a part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In the case that the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between an eNB and an S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM State

Hereinafter, EPS Mobility Management (EMM) and EPS Connection Management (ECM) states will be described.

FIG. 6 is a diagram illustrating EMM and ECM states in a wireless communication system to which the present invention may be applied.

Referring to FIG. 6, in order to manage mobility of a UE in the NAS layer defined in a control plane of the UE and an MME, EMM-REGISTERED and EMM-DEREGISTERED states may be defined according to the UE is attached to or detached from a network. The EMM-REGISTERED and the EMM-DEREGISTERED states may be applied to the UE and the MME.

Initially, the UE stays in the EMM-DEREGISTERED state as when the UE is first powered on and performs registration to a network through an initial attach procedure to connect to the network. In the case that the connection procedure is performed successfully, the UE and the MME make transition to the EMM-REGISTERED state. In addition, in the case that the UE is powered off or the UE fails to establish a radio link (i.e., a packet error rate for a radio link exceeds a reference value), the UE is detached from the network and makes a transition to the EMM-DEREGISTERED state.

Similarly, in order to manage signaling connection between the UE and the network, ECM-CONNECTED and ECM-IDLE states may be defined. The ECM-CONNECTED and ECM-IDLE states may also be applied to the UE and the MME. ECM connection includes an RRC connection configured between the UE and the eNB and an S1 signaling connection configured between the eNB and the MME. In other words, establishing/releasing an ECM connection indicates that both of the RRC connection and S1 signaling connection have been established or released.

The RRC state indicates whether the RRC layer of the UE is logically connected to the RRC layer of the eNB. In other words, in the case that the RRC layer of the UE is connected to the RRC layer of the eNB, the UE stays in the RRC_CONNECTED state. In the case that the RRC layer of the UE is not connected to the RRC layer of the eNB, the UE stays in the RRC_IDLE state.

The network may identify the UE staying in the ECM-CONNECTED state at the level of cell unit and may control the UE efficiently.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area.

In other words, the UE may receive a broadcast signal of system information and paging information by monitoring a paging signal at a specific paging occasion for each UE-specific paging DRX cycle.

In addition, when the UE is in the ECM-IDLE state, the network does not carry context information of the UE. Accordingly, the UE staying in the ECM-IDLE state may perform a mobility-related procedure based on the UE such as a cell selection or a cell reselection without necessarily following an order of the network. In the case that the position of the UE differs from the position recognized by the network while the UE is in the ECM-IDLE state, the UE may inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network may transmit and/or receiver data to or from the UE, control mobility of the UE such as handover, and perform a cell measurement with respect to neighboring cells.

As described above, the UE has to make a transition to the ECM-CONNECTED state in order to receive a general mobile communication service such as a voice or data communication service. As the case that the UE is initially powered on, the UE in its initial state stays in the ECM-IDLE state as in the EMM state, and in the case that the UE successfully registers to the corresponding network through an initial attach procedure, the UE and the MME make a transition to the ECM connection state. In addition, in the case that the UE has already registered to the network but radio resources are not allocated as traffic is not activated, the UE stays in the ECM-IDLE state, and in the case that new uplink or downlink traffic is generated for the corresponding UE, the UE and the MME make a transition to the ECM-CONNECTED state through a Service Request procedure.

FIG. 7 illustrates a bearer structure in a wireless communication system to which the present invention may be applied.

When a UE is connected to a Packet Data Network (PDN) (which is the peer entity of FIG. 7), a PDN connection is established, which may also be called an EPS session. The PDN provides a service function such as the Internet or IP Multimedia Subsystem (IMS) through an external or internal IP network of a service provider.

An EPS session has one or more EPS bearers. The EPS bearer refers to the transmission path of traffic generated between the UE and a PDN GW for the EPS to deliver user traffic. One or more EPS bearers may be set up for each UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. When an E-RAB is generated, the E-RAB bearer is one-to-one mapped to the EPS bearer. A Data Radio Bearer (DRB) delivers packets of the EPS bearer between the UE and an eNB. When a DRB is generated, it is one-to-one mapped to the EPS bearer/E-RAB. The S1 bearer delivers packets of the EPS bearer between the eNB and an S-GW. The S5/S8 bearer delivers EPS bearer packets between the S-GW and the P-GW.

The UE binds the EPS bearer in the uplink direction with a Service Data Flow (SDF). An SDF is a group of IP flows obtained by classifying (or filtering) user traffic according to individual services. A plurality of SDFs may be multiplexed to the same EPS bearer by including a plurality of uplink packet filters.

The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer in order to bind the DRB and the S1 bearer with each other. The S-GW stores one-to-one mapping information between the S1 bearer and the S5/S8 bearer in order to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called default bearer.

The EPS bearer may be classified on the basis of its identity. The EPS bearer identity is allocated by the UE or the MME. The dedicated bearer(s) is combined with the default bearer by a Linked EPS Bearer Identity (LBI).

When the UE establishes an initial connection to the network through an initial attach procedure, an IP address is allocated to the UE to generate a PDN connection, and a default bearer is generated in the EPS duration. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (i.e., DRB and S1 bearer) is released. In addition, when new traffic is generated in the corresponding PDN, the E-RAB bearer is reconfigured to deliver traffic.

In the case that the UE attempts to use a service of which the Quality of Service (QoS) (e.g., Video on Demand (VoD) service) may not be supported by the default bearer while using a service (e.g., the Internet) through the default bearer, a dedicated bearer is created when the UE demands the high QoS service. In the case that there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (e.g., QoS policy, gate status, and charging method).

The PCC rule is determined in SDF unit. In other words, according to the service that the UE uses, the IP flow may have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

The PCC rule may be classified by dynamic PCC rule and pre-defined PCC rule. The dynamic PCC rule is provided dynamically from the PCRF to the P-GW when the EPS session is established or modified. On the other hand, the pre-defined PCC rule is predefined in the P-GW and activated/deactivated by the PCRF.

The EPS bearer includes a QoS Class Identifier (QCI) and Allocation and Retention Priority (ARP) as basic QoS parameters.

The QCI is a scalar used as a reference for accessing node-specific parameters which control bearer level packet forwarding treatment, where the scalar value is pre-configured by a network operator. For example, the scalar may be pre-configured by one of integer values ranging from 1 to 9.

The main purpose of the ARP is to determine whether a request for establishment or modification of a bearer may be accepted or refused when only limited amount of resources are available. Also, the ARP may be used for an eNB to determine which bearer(s) to drop under the situation of limited resources (e.g., handover, etc.).

The EPS bearer may be classified to Guaranteed Bit Rate (GBR)-type bearers and non-GBR type bearers depending on QCI resource type. A default bearer is always a non-GBR type bearer, but a dedicated bearer may be a GBR or non-GBR type bearer.

The GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, the non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers may be used together.

As described above, when QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

In the case that the UE attempts to use a service of which the QoS may not be supported by the default bearer while using a service through the default bearer, a dedicated bearer is created.

FIG. 8 is a diagram illustrating transmission paths of a control plane and a user plane in an EMM registration state in a wireless communication system to which the present invention may be applied.

FIG. 8(a) illustrates ECM-CONNECTED state, and FIG. 8(b) illustrates ECM-IDLE state.

In the case that the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 8(a), in the ECM-CONNECTED state where user traffic is present, NAS signaling connection, namely, ECM connection (RRC connection and S1 signaling connection) is established. In addition, S11 GTP-C (GPRS Tunneling Protocol Control Plane) connection is established between the MME and the SGW, and S5 GTP-C connection is established between the SGW and the PDN GW.

Further, in the ECM-CONNECTED state, all of the DRB, S1 bearer, and S5 bearer are set up (i.e., radio or network resources are allocated).

As shown in FIG. 8(b), in the ECM-IDLE state where there is no user traffic, the ECM connection (i.e., RRC connection and S1 signaling connection) is released. However, the S11 GTP-C connection between the MME and the SGW; and the S5 GTP-C connection between the SGW and the PDN GW are retained.

In addition, in the ECM-IDLE state, the DRB and the S1 bearer are all released, but the S5 bearer is retained (i.e., radio or network resources are allocated).

FIG. 9 is a diagram illustrating an example of a dedicated bearer activation procedure.

FIG. 9 is a flowchart showing a dedicated bearer activation procedure for S5/S8 based on GPRS Tunneling Protocol (GTP).

First, when a dynamic PCC is disposed, a PCRF transmits a decision provision (QoS policy) message to a PDN GW.

Next, the PDN GW transmits a Create Bearer Request message (IMSI, PTI, EPS Bearer QoS, TFT, S5/S8 TEID, Charging Id, LBI, Protocol Configuration Options) for requesting a bearer generation to a serving GW.

Next, the serving GW transmits the Create Bearer Request (IMSI, PTI, EPS Bearer QoS, TFT, S1-TEID, PDN GW TEID (GTP-based S5/S8), LBI, Protocol Configuration Options) message to an MME.

Next, the MME transmits a Bearer Setup Request (EPS Bearer Identity, EPS Bearer QoS, Session Management Request and S1-TEID) message for requesting a bearer configuration to an eNodeB.

Next, the eNodeB transmits an RRC Connection Reconfiguration (Radio Bearer QoS, Session Management Request, EPS RB Identity) message to a UE.

Next, the UE transmits an RRC Connection Reconfiguration Complete message to the eNodeB in order to inform the radio bearer activation.

Next, the eNodeB transmits a Bearer Setup Response (EPS Bearer Identity, S1-TEID) message to the MME in order to inform the radio bearer activation.

Next, the UE transmits a Direct Transfer (Session Management Response) message to the eNodeB.

Next, the eNodeB transmits an Uplink NAS Transport (Session Management Response) message to the MME.

Next, the MME transmits a Create Bearer Response (EPS Bearer Identity, S1-TEID, User Location Information (ECGI)) message to the serving GW in order to inform the bearer activation.

Next, the serving GW transmits a Create Bearer Response (EPS Bearer Identity, S5/S8-TEID, User Location Information (ECGI)) message to the PDN GW in order to inform the bearer activation.

In the case that a dedicated bearer activation procedure is triggered by a PCC Decision Provision message from the PCRF, the PDN GW indicates whether the requested PCC decision (QoS policy) is performed to the PCRF.

FIG. 10 is a diagram illustrating an example of a dedicated bearer deactivation procedure.

FIG. 10 is a flowchart showing a dedicated bearer deactivation procedure for S5/S8 based on GPRS Tunneling Protocol (GTP).

The procedure shown in FIG. 10 may be used for deactivating a dedicated bearer or deactivating all bearers belonged to a PDN address.

In the case that a default bearer belonged to a PDN connection is deactivated, a PDN GW deactivates all bearers belonged to the PDN connection. The detailed procedure refers to FIG. 10.

FIG. 11 illustrates a handover process defined in the LTE.

FIG. 11 shows a case in which an MME and a serving gateway are not changed.

The detailed handover process is described below with reference to 3GPP TS (Technical Specification) 36.300.

Step 0: UE context in a source eNB includes information of a connection configuration or roaming restriction given in the event of latest TA update.

Step 1: The source eNB configures a UE measurement process based on area restriction information. The measurement provided by the source eNB assist control of a connection mobility of a UE.

Step 2: The UE is triggered to transmit a measurement report according to a rule set by system information, and the like.

Step 3: The source eNB determines whether to handover the UE on the basis of the measurement report and RRM (Radio Resource Management) information.

Step 4: The source eNB transmits information for a handover to a target eNB through a handover request message. The information required for the handover includes UE X2 signaling context reference, UE S1 EPC signaling context reference, target cell ID, RRC context including UE identifier (e.g., Cell Radio Network Temporary Identifier; C-RMTI) in the source eNB, and the like.

Step 6: The target eNB prepares L1/L2 and handover (HO) and transmits a handover request acknowledge (ACK) message to the source eNB. The handover request ACK message includes a transparent container (RRC message) transmitted to the UE to perform the handover. The container includes new C-RNTI and a security algorithm identifier of the target eNB. In addition, the container may further include an access parameter and an additional parameter such as SIB, and the like.

Furthermore, the target eNB may divide RA signatures into a non-contention based RA signature set (referred to as group 1 hereinafter) and a contention based RA signature set (referred to as group 2 hereinafter), and may select one of signatures of group 1 and inform the UE of the selected signature.

That is, the container may further include information of a dedicated RA signature. Moreover, the container may also include information of an RACH slot duration for which the dedicated RA signature is going to be used.

Step 7: The source eNB generates an RRC message (e.g., RRC Connection Reconfiguration message) having mobility control information on the UE and transmits the RRC message to the UE in order to perform the handover.

The RRC connection reconfiguration message includes parameters required for the handover (e.g., new C-RNTI and the security algorithm identifier of the target base station, and information on the dedicated RACH signature and target base station SIB which are optional) and instructs the handover (HO) to be performed.

Step 8: The source eNB transmits an SN (serial number) status transfer message to the target eNB so as to transfer uplink PDCP SN reception status and transfer downlink PDCP SN transmission status.

Step 9: The UE attempts to access a target cell using a RACH process after receiving the RRC connection reconfiguration message. RACH is performed on a non-contention basis when a dedicated RACH preamble is allocated and carried out on a contention basis, otherwise.

Step 10: The network performs uplink allocation and timing adjustment.

Step 11: When the UE successfully accesses the target cell, the UE transmits RRC Connection Reconfiguration Complete message (C-RNTI) to confirm the handover and transmits an uplink buffer status report to thereby inform the target eNB that the handover process is completed. The target eNB confirms C-RNTI received through a handover confirmation message and starts to transmit data to the UE.

Step 12: The target eNB transmits a path switch message to the MME so as to inform that the UE has changed the cell.

Step 13: The MME transmits a user plane update request message to a serving gateway.

Step 14: The serving gateway switches a downlink data path to the target.

The serving gateway transmits an end marker packet to the source eNB through the existing path, and then cancels user plane/TNL resources for the source eNB.

Step 15: The serving gateway transmits a user plane update response message to the MME.

Step 16: The MME responds to the path switch message using a path switch ACK message.

Step 17: The target eNB transmits a UE context release message to inform the source eNB that the handover (HO) has been successfully completed and triggers resource release.

Step 18: Upon reception of the UE context release message, the source eNB releases user plane related resources which are associated with UE context.

FIG. 12 is a diagram for describing an operation process between a UE and an eNB in a contention-based random access procedure.

(1) First Message Transmission

First of all, a UE randomly selects one random access preamble from a set of random access preambles indicated by system information or a handover command. The UE may select a PRACH (physical RACH) resource capable of carrying the random access preamble and then, may transmit the corresponding random access preamble (step, S1201).

(2) Second Message Reception

A method of receiving random access response is similar to the non-contention-based random access procedure described above. That is, after the UE has transmitted the random access preamble, as shown in step S1201, the UE attempts a reception of its random access response on PDCCH within a random access response receiving window instructed by the system information or the handover command of the eNB. The UE then receives a PDSCH through corresponding RA-RNTI information (step, S1202). Through the received PDSCH, the UE may receive an uplink grant (UL grant), temporary cell identifier (temporary C-RNTI), time synchronization correction value (timing advance command: TAC) and the like.

(3) Third Message Transmission

In the case that the UE receives a random access response valid to the UE itself, the UE processes the types of information contained in the random access response. That is, the UE applies the TAC and stores the temporary C-RNTI. In addition, the UE transmits data (i.e., a third message) to the eNB using the UL grant (step, S1203). In this case, it is needed that the third message contains an identifier of the UE. Since the eNB is unable to determine which UE performs the random access procedure in the contention-based random access procedure when the third message does not contains the identifier of the UE, it is needed to identify UEs for a future contention resolution.

Two methods have been discussed as a method of including a UE identifier. In a first method, in the case that a UE has a valid cell identifier assigned in a corresponding cell prior to the random access procedure, the UE transmits its own cell identifier through an uplink transmission signal corresponding to the UL grant. In the case that the valid cell identifier is not assigned prior to the random access procedure, the UE transmits its unique identifier (e.g., S-TMSI or random ID). The unique identifier is generally longer than the cell identifier. In the case that the UE transmits data corresponding to the UL grant, the UE starts a timer for collision solution (contention resolution timer).

(4) Fourth Message Reception

After the UE has transmitted the data containing its own identifier using the UL grant contained in the random access response, the UE waits for an instruction of the eNB for the contention resolution. That is, the UE attempts a reception of a PDCCH to receive a specific message (step, S1204). Two types of methods also have been discussed as a method of receiving a PDCCH. As mentioned in the foregoing description, in the case that the third message transmitted corresponding to the UL grant is transmitted using its own cell identifier; the UE attempts the reception of the PDCCH using its own cell identifier. In the case that the identifier is a unique identifier, the UE may attempt a reception of the PDCCH using the temporary C-RNTI contained in the random access response. Thereafter, in the former case, in the case that the UE receives the PDCCH through its own cell identifier before the contention resolution timer expires, the UE determines that the random access procedure is successfully performed, and terminates the random access procedure. In the latter case, in the case that the UE receives the PDCCH via the temporary C-RNTI before the contention resolution timer expires, the UE checks the data carried on the PDSCH indicated by the PDCCH. In the case that the unique identifier of the UE is included in the content of the data, the UE determines that the random access procedure is successfully performed, and terminates the random access procedure.

Hereinafter, an RRC state of a UE and an RRC connection method will be disclosed.

The RRC state means whether an RRC layer of a UE is logically connected to an RRC layer of an E-UTRAN. In the case that the RRC layer of the UE and the RRC layer of the E-UTRAN are connected to each other, it is called an RRC connected state, and in the case that the RRC layer of the UE and the RRC layer of the E-UTRAN are not connected to each other, it is called an RRC idle state. In the RRC connected state, a UE has an RRC connection and thus the E-UTRAN may identify a presence of the UE in a cell unit. Accordingly, the UE may be effectively controlled.

On the other hand, in the RRC idle state, the UE may not be identified by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is required.

When a user initially powers on a UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. There are several cases that the UE in the RRC idle state is required to establish the RRC connection, such as a case that uplink data transmission is necessary due to telephony attempt of the user or the like or a case that a response message is transmitted in response to a paging message received from the E-UTRAN.

A non-access stratum (NAS) layer located higher to the RRC layer performs session management, mobility management, or the like.

In order to manage mobility of a UE in the NAS layer, two states are defined including an EPS mobility management-REGISTERED (EMM-REGISTERED) state and an EMM-DEREGISTERED state. These two states apply to a UE and an MME. Initially, the UE is in the EMM-DEREGISTERED state, and in order to access a network, the UE performs a procedure of registering to the network through an initial attach procedure. In the case that the attach procedure is successfully completed, the UE and the MME enter the EMM-REGISTERED state.

In order to manage a signaling connection between a UE and an EPC, two states are defined including an EPS connection management (ECM)-IDLE state and an ECM-CONNECTED state. These two states apply to a UE and an MME. When the UE in the ECM-IDLE state establishes an RRC connection with the E-UTRAN, the UE enters the ECM-CONNECTED state.

When an MME in the ECM-IDLE state establishes an S1 connection with the E-UTRAN, the MME enters the ECM-CONNECTED state. When a UE is in the ECM-IDLE state, the E-UTRAN does not have context information of the UE. Therefore, the UE in the ECM-IDLE state performs a UE-based mobility related procedure such as cell selection or reselection without having to receive a command of a network. On the other hand, when the UE is in the ECM-CONNECTED state, mobility of the UE is managed by the command of the network. In the case that a location of the UE in the ECM-IDLE state becomes different from a location known to the network, the UE informs the location of the UE to the network through a tracking area update procedure.

Next, system information will be disclosed.

The system information includes essential information that needs to be known to a UE to access an eNB. Thus, the UE has to receive all system information before accessing the eNB. Further, the UE always has to have the latest system information. Since the system information is information that must be known to all UEs in a cell, the eNB periodically transmits the system information.

According to section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration, for example a bandwidth of a corresponding cell. The SB informs transmission information, for example, a transmission period and the like of SIBs. The SIB is a group of a plurality of pieces of system information related to each other. For example, an SIB includes only information of a neighboring cell, and another SIB includes only information of an uplink radio channel used by the UE.

In general, a service provided by a network to the UE may be classified into three types as described below. Further, according to a service that may be provided, the UE recognizes a cell type differently. A service type will be first described below, and then the cell type will be described.

1) Limited service: This service provides an emergency call and a disaster warning system (earthquake and Tsunami warning system; ETWS), and may be provided in an acceptable cell.

2) Normal service: This service denotes a public use service for general use, and may be provided in a suitable or normal cell.

3) Operator service: This service denotes a service for a network service provider, and a cell may be used only by the network service provider and cannot be used by a normal user.

A service type provided by a cell may be identified as follows.

1) Acceptable cell: A cell in which a UE may receive a limited service. This cell is not barred from the aspect of the corresponding UE, and satisfies a cell selection criterion of the UE.

2) Suitable cell: A cell in which a UE may receive a regular service. This cell satisfies a condition of an acceptable cell, and also satisfies additional conditions. Regarding the additional conditions, this cell has to belong to a Public Land Mobile Network (PLMN) to which the UE may access, and a tracking area update procedure of the UE should not be barred in this cell. In the case that the corresponding cell is a CSG cell, this cell should be accessible by the UE as a CSG member.

3) Barred cell: This is a cell that broadcasts Information indicating that a cell is a barred cell by using system information.

4) Reserved cell: This is a cell that broadcasts Information indicating that a cell is a reserved cell by using system information.

FIG. 13 is a flowchart illustrating an operation of a UE in RRC idle state to which the present invention may be applied.

FIG. 13 shows a procedure for a UE that is initially turned on to register in a network and to perform a cell reselection if it is required.

Referring the FIG. 13, a UE selects a radio access technology (RAT) for communicating with a Public Land Mobile Network (PLMN) which is a network that the UE intends to be served (step, S1310). Information about the PLMN and the RAT may be selected by a user of the UE. Otherwise, the user may use the information stored in a Universal Subscriber Identity Module (USIM).

Among a measured eNB and cells of which signal strength or quality is higher quality than a predetermined value, the UE selects a cell of which signal strength or quality is highest (cell selection) (step, S1320). This is a procedure that the UE which is turned on performs the cell selection, and may be referred as an initial cell reselection. The cell selection procedure will be described below. After the cell selection, the UE periodically receives system information from the eNB. The predetermined value is referred to as a value defined in a system for ensuring a physical signal quality in data transmission/reception. Therefore, the predetermined value may vary according to a RAT to which the each predetermined value is applied.

The UE performs a network registration if it is required to register a network (step, S1330). The UE registers its own information (i.e. IMSI) for being served by the network (i.e. paging). The UE does not register whenever the UE selects a cell, but registers to the network in the case that the information (e.g., Tracking Area Identity; TAI) received from the system information is different from information about the network that the UE knows.

The UE performs the cell reselection based on a service environment or the UE's environment provided from the cell (step, S1340). In the case that the strength or quality value of a signal measured in the eNB from which the UE is serviced is lower that a value measured in the eNB of a neighboring cell, the UE selects one of other cells that provide a better signal property than the eNB to which the UE accesses. This process is referred to as cell re-selection as distinguished from the initial cell selection of the process of item 2. At this time, a temporal restricting condition is assigned to prevent cells from being frequently reselected as the signal properties vary. The cell reselection procedure will be described below in detail.

FIG. 14 is a flowchart showing an RRC connection establishment procedure to which the present invention can be applied.

A UE sends to a network an RRC connection request message for requesting an RRC connection (step S1410). The network sends an RRC connection setup message in response to the RRC connection request (step S1420). After receiving the RRC connection setup message, the UE enters an RRC connection mode.

The UE sends to the network an RRC connection setup complete message used to confirm successful completion of the RRC connection establishment (step S1430).

FIG. 15 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S1510). In response to the RRC connection reconfiguration, the UE sends to the network an RRC connection reconfiguration complete message used to confirm successful completion of the RRC connection reconfiguration (step S1520).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) 'User Equipment (UE) procedures in idle mode (Release 8)', a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.)

Intra-frequency cell reselection: A reselected cell is a cell having the same center-frequency and the same RAT as those used in a cell on which the UE is currently being camped.)

Inter-frequency cell reselection: A reselected cell is a cell having the same RAT and a different center-frequency with respect to those used in the cell on which the UE is currently being camped.)

Inter-RAT cell reselection: A reselected cell is a cell using a different RAT from a RAT used in the cell on which the UE is currently being camped.

The principles of the cell reselection process are as follows.

First, a UE measures quality of a serving cell and a neighboring cell for a cell reselection.

Second, the cell reselection is performed based on cell reselection criteria. The cell reselection criteria have the following properties with regard to the measurement of the serving cell and the neighboring cell.

An intra-frequency cell reselection is basically based on ranking. The ranking is an operation for defining a criterion value for evaluating the cell reselection and for ordering cells according to a magnitude of the criterion value by using the criterion value. A cell having the highest criterion is referred to as a best ranked cell. The cell criterion value is a value to which a frequency offset or a cell offset is optionally applied on the basis of a value measured by the UE for a corresponding cell.

An inter-frequency cell reselection is based on a frequency priority provided by a network. The UE attempts to camp on at a frequency having a top priority. The network may provide the frequency priority to be commonly applied to UEs in a cell by using broadcast signaling or may provide a priority for each frequency to each UE by using dedicated signaling for each UE. The cell reselection priority provided by the broadcast signaling may be referred to as a common priority and the cell reselection priority configured by the network for each UE may be referred to as a dedicated priority. When the UE receives the dedicated priority, the UE may receive a valid time associated with the dedicated priority. When the UE receives the dedicated priority, the UE initiates a validity timer set to the validity time which is received together. The UE applies the dedicated priority in the RRC IDLE mode while the validity timer operates. When the validity timer expires, the UE discards the dedicated priority and applies the common priority again.

For the inter-frequency cell reselection, the network may provide parameters (e.g., frequency-specific offsets) used for the cell reselection to the UE for each frequency.

For the intra-frequency cell reselection or the inter-frequency cell reselection, the network may provide a neighboring cell list (NCL) used in the cell reselection to the UE. The NCL includes cell-specific parameters (e.g. cell-specific offsets) used in the cell reselection.

For the intra-frequency or inter-frequency cell reselection, the network may provide a cell reselection prohibition list (black list) used in the cell reselection to the UE. The UE does not perform the cell reselection on cells included in the black list.

Hereinafter, Radio Link Monitoring (RLM) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level where stable reception through a downlink radio link is impossible, and this corresponds to a 10% block error rate of hypothetical PDCCH transmission considering PDFICH errors. The threshold Qin is defined as a downlink radio link quality level at which more stable reception may be made than at the threshold Qout, and this corresponds to 2% block error rate of hypothetical PDCCH transmission considering PCFICH errors.

Hereinafter, a radio link failure (RLF) is described.

A UE continues to perform measurement persistently in order to maintain the quality a radio link with a serving cell that receives a service. The UE determines whether communication is impossible under current the current circumstance due to quality deterioration of the radio link with the serving cell.

In the case that the quality of the serving cell is too low and thus communication is nearly impossible, the UE determines the current circumstance as the radio link failure.

In the case that the radio link failure is determined, the UE abandons maintaining communication with the current serving cell, selects a new cell through a cell selection (or cell reselection) procedure, and attempts an RRC connection re-establishment to the new cell.

The UE, in the case that the following problems occur in the radio link, may determine that an RLF has occurred.

(1) First, it may be determined that an RLF has occurred owing to a physical channel problem.

When a quality of reference signal received periodically from an eNB in a physical layer is detected to be a threshold value or lower, a UE may determine that out-of sync is occurred in the physical layer. In the case that the out-of-sync occurs as much as specific times (e.g., N310) consecutively, the UE informs it to an RRC. The RRC that receives an out-of-sync message from the physical layer runs timer T310 and waits for the problem of the physical channel to be solved. In the case that the RRC receives a message indicating that consecutive in-syncs are occurred as much as a specific times (e.g., N311) while the RRC operates T310, the RRC determines the physical channel problem to be solved and stops T310 which is running. However, in the case that the RRC is unable to receive the in-sync message until T310 expires, the RRC determines an RLF to be occurred.

(2) It may be determined that an RLF has occurred owing to MAC random access problem.

While performing the random access procedure at the MAC layer, a UE goes through random access resource selection→random access preamble transmission→random access response reception→contention resolution. The above overall process is referred to as one random access procedure, and unless this procedure is successfully completed, a next random access procedure is carried out after waiting as long as a back-off time. However, in the case that such random access procedure is unsuccessful despite a predetermined number of times (e.g., preambleTransMax) of attempts, this is informed to the RRC, and the RRC determines that an RLF has occurred.

(3) It may be determined that an RLF has occurred owing to RLC maximum retransmission problem.

In the case that Acknowledged Mode (AM) RLC is used in the RLC layer, a UE retransmits an RLC PDU that was not successfully transmitted.

However, in the case that the AM RLC is retransmitted for a predetermined number of times (e.g., maxRetxThreshold) but failed to transmit, this is informed to the RRC, and the RRC determines that an RLF has occurred.

The RRC determines the occurrence of an RLF for the three reasons as above. When an RLF occurs as such, an RRC connection reestablishment is performed that is a procedure to reestablish an RRC connection with the eNB.

The RRC connection reestablishment procedure that is performed when an RLF occurs is as follows.

When determining that a serious problem has occurred in the RRC connection itself, a UE performs an RRC connection reestablishment procedure in order to reestablish a connection with the eNB. The serious problems with the RRC connection may include the following 5 cases: (1) radio link failure (RLF); (2) handover failure; (3) mobility from E-UTRA; (4) PDCP integrity check failure; and (5) RRC connection reconfiguration failure.

When one of the above problems occurs, the UE runs the timer T311 and initiates an RRC connection reestablishment procedure. During this procedure, the UE accesses to a new cell through a cell selection random, access procedure and the like.

In the case that the UE discovers a proper cell through the cell selection procedure while the timer T311 is running, the UE stops the timer T311 and starts a random access procedure to a corresponding cell. However, in the case that the UE fails to discover a proper cell until the timer T311 expires, the UE determines it to be an RRC connection failure and is shifted to the RRC_IDLE mode.

FIG. 16 is a view illustrating an example RRC connection reestablishment procedure to which the present invention can be applied.

Referring to FIG. 16, the terminal stops using all the radio bearers configured except for SRB 0 (Signaling Radio Bearer #0) and initializes various sub-layers of the AS (Access Stratum) (S1610). Further, the terminal sets each sub-layer and physical layer as a default configuration. During such process, the terminal maintains the RRC connection state.

The terminal performs a cell selection procedure for performing the RRC connection reestablishment procedure (S1620). During the RRC connection reestablishment procedure, the cell selection procedure may be performed like a cell selection procedure performed by the terminal in RRC idle mode even when the terminal maintains the RRC connection state.

After performing the cell selection procedure, the terminal identifies system information of a corresponding cell to determine whether the corresponding cell is a proper cell (S1630). In case the selected cell is a proper E-UTRAN cell, the terminal sends a RRC connection reestablishment request message to the corresponding cell (S1640).

Meanwhile in case the cell selected through the cell selection procedure for performing the RRC connection reestablishment procedure is a cell using other RAT than E-UTRAN, the terminal stops the RRC connection reestablishment procedure and enters the RRC idle mode (S1650).

The terminal may be implemented so that the cell selection procedure and identifying whether the cell is proper through receiving the system information of the selected cell are complete within a limited time. To that end, the terminal may run a timer as the RRC connection reestablishment procedure is initiated. The timer may pause when the terminal is determined to have selected a proper cell. In case the timer expires, the terminal considers the RRC connection reestablishment procedure as failing and may enter the RRC idle mode. This timer is hereinafter referred to as a radio link failure timer. In LTE spec. TS 36.331, a timer named T311 may be utilized as the radio link failure timer. The terminal may obtain setting values of the timer from the system information of a serving cell.

When receiving the RRC connection reestablishment request message from the terminal and accepting the request, the cell sends a RRC connection reestablishment message to the terminal.

When receiving the RRC connection reestablishment message from the cell, the terminal reconfigures a PDCP sub-layer and an RLF sub-layer on SRB1. Further, the terminal recalculates various key values relating to security configuration and reconfigures the PDCP sub-layer responsible for security with the newly calculated security key values.

By doing so, SRB 1 is opened between the terminal and the cell so that RRC control messages may be communicated. The terminal completes resumption of SRB1 and sends to the cell an RRC connection reestablishment complete message indicating the RRC connection reestablishment procedure has been complete (S1660).

In contrast, when receiving the RRC connection reestablishment request message from the terminal and not accepting the request, the cell sends a RRC connection reestablishment reject message to the terminal.

If the RRC connection reestablishment procedure is successfully performed, the cell and the terminal perform a RRC connection reestablishment procedure. By doing so, the terminal restores to the state before the RRC connection reestablishment procedure is performed and maximally assures service continuity.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.)

FIG. 17 is a flowchart showing a method of performing measurement to which the present invention can be applied.

A UE receives measurement configuration information from a BS (step S1710). A message including the measurement configuration information is referred to as a measurement configuration message. The UE performs measurement based on the measurement configuration information (step S1720). If a measurement result satisfies a reporting condition included in the measurement configuration information, the UE reports the measurement result to the BS (step S1730). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) 'Evolved Universal Terrestrial Radio Access (E-UTRA) Radio Resource Control (RRC); Protocol specification (Release 8)'.)

TABLE 1

| Event | Reporting Condition |
| --- | --- |
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold 1 and inter RAT neighbor becomes better than threshold2 |

If the measurement result of the UE satisfies the determined event, the UE transmits a measurement report message to the BS.

Dual Connectivity

In a heterogeneous network which supports small cell evolution, there are various requirements related to mobility robustness, increased signaling load due to frequent handover and improving per-user throughput and system capacity, and the like.

As a solution to realize these requirements, in the E-UTRAN, a multiple RX/TX UEs in RRC_CONNECTED state is provided by two distinct schedulers, and the E-UTRAN supports Dual Connectivity (DC) operation configured to utilize radio resources located in two eNBs connected via a non-ideal backhaul through the X2 interface.

The Dual connectivity may imply Control and Data separation. For example, the control signaling for mobility is provided via the macro cell at the same time as high-speed data connectivity is provided via a small cell.

In addition, a separation between downlink and uplink and a connection between downlink and uplink are provided via different cells.

The eNBs associated with the dual connectivity for a specific UE may assume two different roles. For example, an eNB may act as either an MeNB or an SeNB.

In the dual connectivity a UE may be connected to one MeNB and one SeNB.

The MeNB is an eNB which terminates at least one S1-MME in the dual connectivity, and the SeNB is an eNB that provides an additional radio resource for the UE but is not the Master eNB in the dual connectivity.

In addition, the DC with CA configured means an operation mode of a UE in RRC_CONNECTED state, and includes a Master Cell Group and a Secondary Cell Group.

Here, the "cell group" represents a group of serving cells associated with either the Master eNB (MeNB) or the Secondary eNB (SeNB) in the dual connectivity.

The "Master Cell Group (MCG)" is a group of serving cells associated with the MeNB, and includes a primary cell (PCell) and one or more optional secondary cells (SCells) in the dual connectivity.

The "Secondary Cell Group (SCG)" is a group of serving cells associated with the SeNB including a primary SCell (pSCell) and one or more optional SCells.

Here, the "cell" described below should be distinguished from a 'cell' as a general region covered by an eNB. That is, a cell means a combination of downlink and optionally uplink resources.

The linking between the carrier frequency (i.e. center frequency of the cell) of the downlink resources and the carrier frequency of the uplink resources is indicated in the system information transmitted on the downlink resources.

MCG bearer is a wireless protocol located only in the MeNB to use MeNB resources only in the dual connectivity, and SCG bearer is a wireless protocol located only in the SeNB to use SeNB resources in the dual connectivity.

In addition, Split bearer is a wireless protocol located in both of the MeNB and the SeNB to use both of MeNB and SeNB resources in the dual connectivity.

Reliable communication is one of the fields that becomes more important and materialized in 5G mobile communication technology.

The reliable communication means a new communication service realized by an Error Free Transmission or Service Availability for realizing a Mission Critical Service (MCS).

A necessity of the reliable communication has been recognized as a way of Machine-to-Machine (M2M) communication that satisfies Real-Time requirements for Traffic Safety, Traffic Efficiency, E-Health, Efficient Industrial Communication, and so on.

In addition, the reliable communication is needed to be provided with a reliable connection for an application sensitive to delay like Traffic Safety or Mission Critical Machine-Type Communications (MTCs).

Further, a necessity of the reliable communication has been also recognized for the purpose of Medical/Emergency Response, Remote Control, Sensing, and the like.

It is expected that tremendous improvement is required for MCSs in the aspect of the existing UMTS/LTE, End-to-End Latency in comparison with LTE-A/Wi-Fi, Ubiquity, Security, Availability/Reliability, and the like.

That is, the commercial wireless techniques (including 3GPP LTE and LTE-A) that have been introduced so far are unable to guarantee enough performance for providing various MCSs in the aspect of Real-Time requirements and Reliability requirements.

In addition, a Metric called the Reliability may be 'a basis for valuation for describing Quality of a Radio Link Connection for satisfying a specific Service Level'.

Further, a Metric for a service availability may be called Radio Link Availability (RLA), and in the case that Quality of Experience (QoE) of a UE is represented in the Link Quality aspect, it may be defined as RLA=Pr (RLQ>. QoE).

Here, RLQ is a radio link quality which is measured, and QoE are QoE requirements in the Link Quality aspect.

In addition, the following services may be exemplified as applicable scenarios of 5G mobile communication environment for MCSs.

In order to realize Industrial Automation, a Robot Arm is controlled remotely or heavy large-size freights are carried through a remote control of Automated Guided Vehicles (AGVs)

Drone remote control for providing goods distribution, remote medical service, and other various public services Information required between vehicles for providing autonomous vehicle service is safely exchanged or a safety signal informing a hidden vehicle not detected by a sensor (camera, radar, etc.) of a vehicle or a forward collision is safely delivered In the case that an available alternative eNB link is quickly determined according to degradation of radio link (serving link) quality of a service eNB and the radio link quality of the serving eNB is deteriorated to an extent as not proper to MCSs, a UE switches to the available alternative link of the corresponding alternative eNB, and accordingly, is needed to be provided of the services in a seamless manner.

Accordingly, in the case that a degradation of radio link quality of a serving eNB is detected and it is determined that the radio link is not proper for being provided with MCSs, a method is required for activating other alternative link quickly and configuring an MCS bearer through the activated alternative link.

For this reason, in order for the Reliable Communication of 5G to be available, a UE may activate all neighboring radio links and indicate to maximize radio link quality depending on a situation, and accordingly, decrease of radio link outage for providing MCS should be considered as an essential factor.

In addition, in the conventional LTE/LTE-A system, a UE controls an RLF based on a plurality of timers.

As described above, a UE is unable to detect an RLF until a specific Timer (e.g., T310) expires, and according to whether an RRC Connection Re-establishment procedure is succeeded before another Timer (e.g., T311) expires, the UE maintains the RRC connection or makes a transition to an RRC Idle state.

Future 5G mobile communication should satisfy an error rate under $10^{-6}$ and RLA requirements of $10^{-6}$ in order to support MCSs such as Industrial Automation, Drone remote control, autonomous vehicle, and so on.

Through this, 5G sets a goal of constructing highly reliable system in which a UE is provided with MCSs always while not detects an outage of radio link.

However, since the current LTE/LTE-A system is designed to deal with a recovery from an RLF very conservatively, there is a problem that it is hard to search another alternative available eNBs quickly depending on a channel situation of a UE and to secure an available alternative link eNB for connection switch to the corresponding alternative eNBs.

In order to solve this, methods are proposed for a UE to secure a plurality of eNB links when the UE accesses a network, and even in the case that a channel situation of a serving eNB link becomes degraded, to secure alternative link eNBs that may substitute it.

First, terms used in the present disclosure are defined as below.

Multi-link is referred to as a plurality of radio links through which a UE is connected to a plurality of eNBs.

The multi-link may include a serving link and at least one alternative link.

The serving link indicates a radio link which a UE is connected to the serving link, and the alternative link means a radio link through which a UE is connected to an eNB except the serving link.

The meaning of the alternative link and the related operation will be described in more detail with reference to FIG. 18 that will be described below.

The serving link may be represented as a first radio link and the alternative link may be represented as a second radio link.

Here, the eNB except the serving link may be represented as an alternative eNB, a candidate (target) eNB, an adjacent eNB, a target eNB, and the like.

The serving eNB means an eNB from which a UE is currently served.

The alternative eNB represents a new serving eNB that substitutes the serving eNB when radio link quality of the serving eNB is deteriorated (or degraded).

The alternative serving eNB may be one alternative eNB among the alternative eNBs to which an alternative link of SRB inactive state is configured.

An additional alternative eNB represents an alternative eNB additionally discovered by a UE except an alternative eNB to which an alternative link is preconfigured and an alternative link is additionally configured.

Link connection means a wireless connection with an eNB and may be represented as radio link configuration, radio link establishment, and the like.

In addition, multi-link connection (or configuration) may be represented as a multiple connection, an alternative link connection, and so on.

Hereinafter, the multi-link connection and the alternative link configuration are used in a mixed manner as occasion demands.

A radio link quality value represents a quality of radio link or means information indicating a quality of radio link based on the value, and corresponds to information that an eNB transmits to a UE.

The radio link quality value may be replaceable by other term that may represent a quality state of radio link, and may also be called by a radio link quality indicator, radio link quality indication information, a radio link quality value indicator, and the like.

An example of the radio link quality value includes Packet Error Rate (PER), Quality of Service (QoS), the number of resources (RB number) that an eNB may allocate to a specific UE.

In addition, the radio link quality information represents information in relation to the radio link quality value, and similarly, corresponds to information that an eNB transmits to a UE.

The radio link quality information may include a current radio link quality value, a radio link quality value to be changed, a time when a radio link quality value to be changed is applied, a time guarantee (or maintain or continue) of a current radio link quality value/a radio link quality value to be changed, transmission period information of a radio link quality value, and so on.

Definition of Alternative Link and the Related Operation

FIG. 18 is a conceptual diagram illustrating an alternative link to which the methods proposed in the present disclosure may be applied.

As defined above, a multi-connection or a multi-link includes a serving link and at least one alternative link.

The serving link means a radio link between a UE and an eNB. In the serving link, both of Signaling Radio Bearer (SRB) and Data Radio Bearer (DRB) are in active state generally.

The alternative link represents a radio link between a UE and at least one alternative eNB, and is in a state to which only SRB of an inactive state is configured but the DRB is not configured.

The alternative link is activated only by an activation instruction of a UE. The alternative link has a link concept which has different state from a general dormant mode, and may be in event-triggered dormant mode.

That is, the UE that has an alternative link in the SRB inactive mode maintains a sleep state in the alternative link continuously until the UE receives an activation result (from a serving eNB).

In addition, the UE may receive information of the number of maximum alternative links that the UE may connected to a neighboring alternative eNB through a broadcast message like SIB, and the like from the serving eNB.

Further, in the case that the information of the number of maximum alternative links does not exceed the number of maximum alternative link that the UE itself may configure, the UE may configure an alternative link additionally with a neighboring alternative eNB that satisfies a specific condition ($Q_{MCS}$).

Multi-Link Configuration Method when Accessing to a Network

First, before describing a multi-link update method based on a UE instruction proposed in the present disclosure, for the convenience of understanding, a method for configuring a multi-link (hereinafter, referred to as 'conventional method') when a UE accesses a network is briefly described.

In the case that a UE accesses a network, the conventional method relates to a method for the UE to configure an alternative link with a neighboring alternative eNB.

Here, the case that a UE accesses a network corresponds to an initial network access procedure of a UE, a network access procedure in the case that a Mission Critical Service (MCS; hereinafter, referred to as 'MCS') is generated in an idle state, and the like.

That is, the conventional method relates to a method for a UE to configure an alternative link with an alternative eNB in order to support an MCS in the case that the UE accesses a network.

In addition, the conventional method may be applied to both of (1) the case that synchronization is not required between a UE and an eNB (or small eNB) and (2) the case that synchronization is required between a UE and an eNB.

Here, the case that synchronization is not required corresponds to (1) 'small cell environment' in which timing advance (TA) between a UE and an eNB (or small eNB) reaches about '0' or (2) an environment in which a asynchronous system based on a new waveform is constructed.

In the case that a UE has a multi-link with a plurality of eNBs, the UE has a connection (serving link in an active state) in an active state with a serving eNB, and has a connection (serving link in an inactive state) in an inactive state with an alternative eNB.

The serving link in the active state may mean that the UE configures active Signaling Radio Bearer (SRB)/active Data Radio Bearer (DRB) with the serving eNB, and the alternative link in the inactive state may mean that the UE configures only the inactive SRB with the alternative eNB.

That is, the inactive SRB may indicate a state in which DRB is not configured between the UE and the alternative eNB.

In addition, through a network access, a serving eNB configures an E-RAB by configuring S1-U Bearer with an S-GW, and this means that EPS Bearer is configured with S5/S8 Bearer between the S-GW and a P-GW.

Meanwhile, the alternative eNB that configures an alternative link with the UE configures S1-U Bearer with the S-GW. However, the E-RAB is not configured since a DRB is not configured with the UE.

However, similarly, even in this case, S5/S8 Bearer may be configured with the P-GW.

That is, the UE configures inactive SRB with at least one alternative eNB in relation to an MCS, but does not configure a DRB.

As described above, the inactive SRB (or SRB inactive state) has different state from a general (LTE/LTE-A system) dormant mode or dormant state.

The SRB inactive state may also be represented as an SRB inactive mode.

That is, a general Dormant Mode means a mode used for Power Saving of an RRC connected UE.

For example, in the case that a UE does not have data to receive through DL, the UE enters the Dormant Mode, and periodically enters sleep state and wake up state repeatedly, thereby decreasing unnecessary power consumption of the UE.

On the other hand, the SRB inactive mode (or state) described in the present disclosure refers to a state that the UE is in sleep state continuously in the case that there is no separate SRB active indication.

The SRB inactive mode may be defined as a state which is activated only by an indication of the UE.

Accordingly, the SRB inactive mode may also be represented as an event-triggered dormant mode.

As described above, in the case that Multi-Tier/Multi-Layer eNBs are existed in a coverage of a UE (in-coverage situation) and the UE determines that quality of a serving link is not sufficient to provide an MCS, the UE may secure another eNB that may guarantee better radio link quality than a serving eNB, that is, an alternative eNB and a radio link, and accordingly, the UE may be provided with an MCS reliably and seamlessly.

In addition, following four types of modes may be considered according to an active or inactive state of an SRB and a DRB of an alternative link between a UE and an alternative eNB.

1. First mode: SRB Inactive and DRB Inactive
2. Second mode: SRB Inactive and DRB Active
3. Third mode: SRB Active and DRB Inactive
4. Fourth mode: SRB Active and DRB Active In the methods proposed in the present disclosure, the first mode and the fourth mode, that is, a case of two types is considered.

Particularly, the first mode (SRB Inactive state/DRB Inactive state) corresponds to a state that an SRB is in the inactive state and the EPS Bearer that satisfies QoS for an MCS is not configured. In the first mode, a DRB is not configured.

The fourth mode (SRB Active state/DRB Active state) corresponds to a state that an inactive RRC connection is activated by an activation indicator and RRC messages are exchangeable between a UE and an eNB.

In the fourth mode, the EPS Bearer that satisfies QoS for an MCS may be configured, and a DRB is configured.

In the case that radio link quality value (e.g., PER) of a serving eNB and/or an alternative eNB is changed in order to provide various Mission Critical Services (MCSs) of new 5G with high service availability, this is informed to a UE or the serving eNB, and accordingly, the present disclosure provides (1) a method for switching a serving eNB and (2) a method for performing an update of MCS Bearer quickly through an alternative eNB which is activated by activating a connection with the alternative eNB.

The expression of 'A and/or B' used in the present disclosure may be identically interpreted to the meaning of including at least one of A or B.

In addition, the present disclosure additionally provides a method for a UE to update or maintain a serving eNB and/or alternative eNBs consecutively according to a change of radio link quality value.

Here, the meaning of updating a serving eNB and/or alternative eNBs according to a change of radio link quality value corresponds to a concept that includes the case that a UE changes the serving eNB to the alternative eNB and the case that a UE adds or deletes the alternative eNB as occasion demands in order to satisfy radio link quality value for a specific service (specific MCS).

That is, in the case that the radio link (serving link) quality of a serving eNB with respect to a specific service (specific MCS) is deteriorated, a UE may quickly activate an alternative link with an alternative eNB among the alternative eNBs (alternative eNB to which alternative link of SRB inactive state is configured) that may replace the serving eNB, and take the role of the serving eNB.

Here, the meaning of activating an alternative link may be interpreted to meaning of configuring a DRB.

In addition, in the case that an alternative link quality of an alternative eNB is deteriorated, a UE searches another alternative eNB that may replace the corresponding alternative eNB, and accordingly, the present disclosure provides a method for updating or maintaining an alternative eNB in order to secure multi-connection eNBs of a predetermined number or more always.

Further, the present disclosure provides a method for changing a serving eNB to one eNB among multi-connection eNBs that are already secured, and a method for performing a procedure of updating (adding or deleting) an alternative eNB simultaneously.

In this case, a UE does not search an alternative eNB (or alternative link) according to a reception signal quality, but receives a radio link quality value from a serving eNB or the alternative eNB, thereby providing a method for securing an alternative link in advance before the sensory reception signal quality of the UE becomes degraded.

Hereinafter, (1) a method for switching a serving eNB or an alternative eNB and (2) a method for adding and/or deleting (updating) an alternative eNB for a simultaneous transmission, proposed in the present disclosure, will be described according to a change of a radio link quality value (e.g., PER).

For the convenience of description, it is described by exemplifying that 'PER' is an example of a radio link quality value.

First, as a reference value of PER that should satisfy for a specific MCS (providing), (1) minimum PER ($PER_{MCS\_Min}$) and (2) target PER ($PER_{MCS\_Target}$) are defined.

The minimum PER may be represented as a first MCS threshold value and the target PER may be represented as a second first MCS threshold value.

A UE may secure the minimum PER and the target PER in advance through system information, and the like.

In addition, the simultaneous transmission used in the present disclosure may mean that a UE configures a DRB with two or more eNBs (e.g., serving eNB-alternative eNB, alternative eNB-alternative eNB) and is provided with a specific MCS through the corresponding eNBs.

Further, the changed PER of a serving eNB or an alternative eNB is called 'alternative PER' simply.

In the methods described below, in the case that the PER of a serving eNB or an alternative eNB is unable to satisfy a minimum PER for a specific MCS (greater than a minimum PER), the serving eNB or the alternative eNB is switched to another alternative eNB, and a connection with a UE is released.

In addition, in the case that the PER of a serving eNB or an alternative eNB satisfies a minimum PER for a specific MCS, but is unable to satisfy a target PER, it is unable to provide an MCS to a UE only with the corresponding eNB.

Accordingly, the UE additionally configures a DRB with another alternative eNB except the serving eNB or the alternative eNB, and through this, the UE is provided with an MCS.

In the case that the PER of a serving eNB is changed, according to whether the changed PER satisfies a minimum PER and/or a target PER for a specific MCS, a method is described for determining whether to perform a simultaneous transmission by shifting (or switching) the serving eNB or adding an alternative eNB proposed in the present disclosure with reference to the related drawings.

FIG. 19 is a flowchart illustrating an example of a method for determining whether to perform a switching of a serving eNB or a simultaneous transmission proposed in the present disclosure.

FIG. 19 shows a method for determining whether to switch (or shift) a serving eNB to an alternative eNB first accordingly PER change of the serving eNB, before performing 1) alternative link activation (DRB configuration) of the alternative eNB according to PER change of the serving eNB and 2) alternative link activation (DRB configuration) of another alternative eNB according to PER change of the alternative eNB in order to perform a simultaneous transmission.

Hereinafter, for the convenience of description, shifting or switching a serving eNB to an alternative eNB before performing a simultaneous transmission is referred to as 'preferential switching'.

That is, the determination on whether to perform the preferential switching may be performed in the case that the PER of a serving eNB to be changed is unable to satisfy a target PER for providing a specific MCS.

In the case that the PER of a serving eNB to be changed is unable to satisfy a target PER for providing a specific MCS and an alternative eNB that satisfies the target PER is existed, a UE determines the alternative eNB that satisfies the target PER to be a new serving eNB, and performs the preferential switching of the serving eNB.

In the case that an alternative eNB that satisfies the target PER is not existed, a procedure for performing a simultaneous transmission is started, which will be described below.

The serving eNB or the UE may perform the following procedures in order to determine whether to perform the preferential switching.

FIG. 19 shows an operation in relation to a switching of a serving eNB, but FIG. 19 may be identically applied to an operation in relation to a switching of an alternative eNB.

As shown in FIG. 19, a serving eNB determines to change PER for a specific MCS.

That is, in the case that the PER is changed (step, S1901), the serving eNB transmits a PER Change Notification message for informing that the PER of the serving eNB is going to be be changed to the UE (step, S1902).

The PER Change Notification message may include the changed PER (or PER to be changed), PER change timing information indicating a time when the PER change is applied, and the like.

Next, the serving eNB transmits a PER Change Indication message for indicating that the PER of the serving eNB is going to be changed to alternative eNBs (alternative eNBs 1 and 2) to which an alternative link in an SRB inactive sate is set with the UE (step, S1903).

The PER Change Indication message may include an ID of the UE, the PER of the current serving eNB, the PER of the serving eNB to be changed, timing information indicating a time when the PER to be changed is applied, and so on.

Later, the serving eNB receives a PER Change Indication Response message in response to the PER Change Indication message from the alternative eNBs (alternative eNBs 1 and 2) (step, S1904).

The PER Change Indication Response message may include an ID of the UE, indication information indicating allowance or rejection in relation to the PER change, PER supportable in the alternative eNB, PER guarantee time supportable in the alternative eNB, and the like.

Later, the serving eNB transmits information in relation to a candidate alternative eNB which is switchable (or allowable) of the serving eNB to the UE (step, S1905).

The candidate alternative eNB which is switchable of the serving eNB may be limited to an alternative eNB of which specified PER is not changed during a predetermined time. The specified PER is a PER that satisfies the target PER of an MCS.

That is, FIG. 19 shows a method for the serving eNB to inform the PER change to the alternative eNB, and for the serving eNB or the UE to receive supportable PER that may be supported by the alternative eNB from the alternative eNB and supportable PER Guaranteeing time information for a time when the corresponding PER is secured, and the like, when the PER of the serving eNB is changed.

Particularly, FIG. 19 shows a method for the serving eNB to inform the PER to be changed to the alternative eNB to which an alternative link is configured in the SRB inactive state with a specific UE when the PER of the serving eNB is changed, and to receive a PER value that may be provided (or supported) by each alternative eNB from each alternative eNB and the supportable PER Guaranteeing time information that represents a guaranteeing time of the corresponding PER value.

FIG. 19b shows a method for a UE to transmit an RRC activation message for informing that a PER value of the serving eNB is changed to the alternative eNBs that the UE itself is already secured, and to receive the PER that may be provided by each alternative eNB from each alternative eNB and the PER Guaranteeing time information that represents a guaranteeing time of the corresponding PER through a PER change allowance information message.

Here, the RRC activation message may include Temporary Activate Indication information indicating an SRB of the SRB inactive state to be temporarily active to the alternative eNB, an ID of the serving eNB of which PER is changed, a current PER value, a PER value to be changed, information of a time when a PER is changed, and so on.

In addition, the PER change allowance information message may include indication information that indicates allowance or rejection of the alternative eNB in relation to the PER change, and the like.

That is, FIG. 19a shows a method for the serving eNB to determine whether to switch the serving eNB to the alternative eNB based on the supportable PER of each alternative eNB received from each alternative eNB and the guaranteeing time of the corresponding PER.

Further, in the case that the serving eNB transmits the supportable PER of each alternative eNB and the guaranteeing time of the corresponding PER to the UE in step S1905 of FIG. 19a, the UE may determine whether to switch the serving eNB to the alternative eNB.

FIG. 19b shows a method for the UE to determine whether to switch the serving eNB to the alternative eNB based on the supportable PER of each alternative eNB received from each alternative eNB and the guaranteeing time of the corresponding PER.

In addition, the determination of the preferential switching of the serving eNB proposed in the present disclosure may be divided into two cases as below according to a subject of determining whether to perform the preferential switching.

1. Determination of the preferential switching of the serving eNB in the serving eNB
2. Determination of the preferential switching of the serving eNB in the UE The cases 1 and 2 may be classified into the following scenarios according to whether to satisfy the minimum PER and/or the target PER for a specific MCS.

Here, the meaning of 'satisfy a PER' indicates the case that a specific PER is smaller than a reference PER (the minimum PER and the target PER), and the meaning of 'fail to satisfy a PER' indicates the case that a specific PER is greater than a reference PER.

(1) Maintain a serving link (or RRC connection) with a serving eNB: The PER to be changed, of a serving eNB satisfies only the minimum PER ($PER_{Target}$<PER to be changed <$PER_{Min}$) or both of the minimum PER and the target PER (PER to be changed <$PER_{Min}$, $PER_{Target}$).

1) Maintain the serving link as an active state
   i. The case of being provided with a specific MCS only from the serving eNB: PER to be changed <$PER_{Target}$
   ii. The case of being provided with a specific MCS through a simultaneous transmission (the serving eNB and the alternative eNB): $PER_{Target}$<PER to be changed <$PER_{Min}$
2) Maintain the serving link as an inactive state
   i. The case of being provided with a specific MCS only from the alternative serving eNB to which the serving eNB is switched: PER of alternative eNB<$PER_{Target}$
   ii. The case of being provided with a specific MCS through a simultaneous transmission of the alternative serving eNB to which the serving eNB is switched and another alternative eNB: $PER_{Target}$<PER of alternative eNB<$PER_{Min}$ (2) Release a serving link (or RRC connection) with a serving eNB: The case that the PER to be changed, of the serving eNB, is unable to satisfy the minimum PER (PER to be changed >$PER_{Min}$)

1) The case of being provided with a specific MCS only from the alternative serving eNB to which the serving eNB is switched: PER of alternative eNB <$PER_{Target}$
2) The case of being provided with a specific MCS through a simultaneous transmission of the alternative serving eNB and another alternative eNB: $PER_{Target}$<PER of alternative eNB <$PER_{Min}$ FIG. 19 shows a method for the serving eNB (or alternative eNB) or the UE to determine whether to switch the serving eNB to the alternative eNB based on a PER of the alternative eNB and a guaranteeing time of the corresponding PER, and the like, and to switch the serving eNB or perform a simultaneous transmission (serving eNB-alternative eNB or alternative eNB-alternative eNB) according to conditions (1) and (2) described above.

Assuming the situation of FIG. 24 and FIG. 25 that will be described below in FIG. 19a, the UE transmits a Multi-Link Activate message to the serving eNB.

The transmission of the Multi-Link Activate message is performed after the procedures of FIGS. 19a and 19b.

First, through the procedure of FIG. 19a, the serving eNB may identify that there are a plurality of alternative eNBs that satisfies the target PER of a specific MCS and there are also a plurality of alternative eNBs that has low PER.

Accordingly, the serving eNB selects the alternative eNB that has the longest PER guaranteeing time as the alternative serving eNB among the alternative eNBs that have low PER.

Later, the serving eNB perform switching to the selected alternative serving eNB.

In this case, since the selected alternative serving eNB satisfies the target PER of a specific MCS, the UE is not required to perform an additional DBR configuration with other alternative eNB except the alternative serving eNB in order to be provided with the specific MCS.

That is, in this case, only the switching from the serving eNB to the alternative serving eNB occurs but a simultaneous transmission is not performed.

In the case that there is no alternative eNB that satisfies the target PER of the specific MCS, the serving eNB performs a simultaneous transmission with at least one alternative eNB among the alternative eNBs that satisfy the minimum PER of the specific MCS.

Next, assuming the situation of FIG. 24 and FIG. 25 that will be described below in FIG. 19b, the UE may know that there is a plurality of alternative eNBs that satisfies the target PER of the specific MCS through the procedure of FIG. 19b, and among these, there is a plurality of alternative eNBs that has low PER.

Accordingly, the UE selects the alternative eNB that has the longest PER guaranteeing time as the alternative serving eNB among the alternative eNBs that have low PER.

Later, the UE transmits a request for attempting a switching to the selected alternative eNB (alternative serving eNB) to the serving eNB.

The Multi-Link Activation message that the UE transmits to the serving eNB may include preferential switching indication information indicating that the UE attempts to switch the serving eNB and information in relation to the alternative serving eNB that is going to replace the serving eNB.

In this case, since the alternative serving eNB satisfies the target PER of a specific MCS, the UE is not required to perform an additional DBR configuration with other alternative eNB.

In the case that there is no alternative eNB (including the alternative serving eNB) that satisfies the target PER of the specific MCS, the UE performs a procedure for a simultaneous transmission.

In order to perform the simultaneous transmission, the UE may transmit the information of the alternative eNBs that require additional DBR configuration with being included in the Multi-Link Activation message to the serving eNB.

Hereinafter, the method for the serving eNB to switch and/or to perform a simultaneous transmission according to conditions (1) and (2) will be described in more detail with reference to the related drawings.

Here, the 'preferential switching' indicates to activate a connection of the alternative eNB of inactive SRB in the case that a radio link quality of a serving eNB for a specific MCS is degraded, and to switch the serving eNB to the activated alternative eNB (alternative serving eNB).

FIG. 20 is a flowchart illustrating an example of a preferential switching method proposed in the present disclosure.

That is, FIG. 20 shows examples of attempting to perform a preferential switching or a simultaneous transmission according to PER conditions of a specific MCS in FIGS. 23 to 25 that will be described below.

The PER conditions of a specific MCS in FIGS. 23 to 25 are as below.

FIG. 23 shows the case that the PER to be changed, of a serving eNB, is smaller than a minimum PER for a specific MCS and greater than a target PER.

In addition, in the case that there is no alternative eNB that has the PER smaller than the PER to be changed, of the serving eNB, a method is shown for a UE to maintain a connection with the serving eNB and perform a simultaneous transmission through a DRB configuration between specific alternative eNBs.

Here, the specific alternative eNB means an alternative eNB that has a PER multiplied with the PER to be changed, of the serving eNB, that may have a value smaller than a target PER value of an MCS.

That is, FIG. 23 shows a method for performing a simultaneous transmission through the serving eNB and the alternative eNB by adding a DRB configuration with the alternative eNB, not switching the serving eNB to the alternative eNB.

FIGS. 24 and 25 illustrate a method for changing a serving eNB and adding an alternative eNB, and performing a simultaneous transmission through the changed serving eNB and the added alternative eNB.

Here, in the case that (i) PER to be changed, of the serving eNB, is greater than a minimum PER, (ii) there is an alternative eNB that has a PER smaller than the PER to be changed, of the serving eNB, and (iii) PER of the corresponding alternative eNB is greater than a target PER, FIG. 24 shows the case of releasing an SRB of the serving eNB since the PER to be changed, of the serving eNB, fails to satisfy the minimum PER of a specific MCS.

In addition, in the simultaneous transmission that will be described below in FIGS. 23 to 25, in the case that there are a serving eNB and eNBs 1 to 3 when a PER of the serving eNB is changed, the following combinations for the simultaneous transmission may be considered.

That is, the following combinations are the cases of selecting the combination that satisfies a target PER of a specific MCS with a first priority and selecting the combination of which guaranteeing time of the target PER is the longest with a second priority.

In the case of the simultaneous transmission of FIG. 23, the simultaneous transmission is performed by adding an alternative eNB that has the longest PER guaranteeing time among alternative eNBs 1 to 3 and through the serving eNB and the added alternative eNB.

In the case of FIG. 24 (the case that the serving eNB is changed and the serving eNB stays as an alternative eNB), it is assumed that PER product of the serving eNB and alternative eNB 1 satisfies the target PER of a specific MCS, and a product of the PER of alternative eNB 2 and the PER of alternative eNB 3 satisfies the target PER of a specific MCS.

In this case, in order to decrease signaling overhead, it may be preferable not to switch the serving eNB to alternative eNB 2 or alternative eNB 3.

However, in the case that the PER guaranteeing times of alternative eNBs 2 and 3 are longer than the PER guaranteeing time of alternative eNB 1, it may be preferable to switch the serving eNB to alternative eNB 2 or alternative eNB 3 according to the selection criteria of the second priority described above, and to perform a simultaneous transmission through alternative eNB 2 and alternative eNB 3.

On the contrary, in the case that the PER guaranteeing times of alternative eNBs 2 and 3 are shorter than the PER guaranteeing time of alternative eNB 1, it may be preferable to perform a simultaneous transmission through the serving eNB and alternative eNB 1.

In the case of FIG. 25 (the case that the serving eNB is changed and the serving eNB is released), it is assumed that the PER product of alternative eNBs 1 and 2 satisfies the target PER of a specific MCS, and the PER product of alternative eNBs 2 and 3 satisfies the target PER of a specific MCS.

In the case that the PER guaranteeing time of alternative eNBs 1 and 2 is longer than the PER guaranteeing time of alternative eNBs 2 and 3, the serving eNB is switched to alternative eNBs 1 and 2 and a simultaneous transmission is performed through alternative eNBs 1 and 2.

Here, in the case that the PER product of alternative eNBs 1 and 2 is smaller than the PER product of alternative eNBs 2 and 3 but the PER guaranteeing time of alternative eNBs 1 and 2 is smaller, a simultaneous transmission is performed through alternative eNBs 2 and 3.

Hereinafter, a method for activating a connection between a UE and an alternative eNB will be described according to a PER change of a serving eNB or a PER change of an alternative eNB.

Here, the activation of a connection may also be interpreted as a meaning of configuring a DRB.

FIG. 21 illustrates an overall flowchart of a connection activation method between a UE and an alternative eNB according to a PER change of a serving eNB proposed in the present disclosure, and FIG. 22 is a diagram illustrating an overall flowchart of a connection activation method between a UE and another alternative eNB according to a PER change of an alternative eNB proposed in the present disclosure.

FIGS. 21 and 22 assume a situation that a UE configures an alternative link in an SRB inactive state with a plurality of alternative eNBs except a serving eNB.

First, a method for activating a connection between a UE and an alternative eNB according to a PER change of a serving eNB is described with reference to FIG. 21.

In FIG. 21, it is assumed that the UE is in the state of configuring active SRB and active DRB with the serving eNB and in the state of configuring inactive SRB with a plurality of alternative eNBs.

First, a UE receives PER information (or radio link quality information) in relation to PER to be changed, of the serving eNB, from the serving eNB through an RRC connection (step, S2101).

Here, the UE switches inactive SRB state to active SRB state temporarily with each alternative eNB in order to receive the PER information of each alternative eNB from each alternative eNB.

The alternative eNBs may switch the active SRB to the inactive SRB again after transmitting the PER information to the UE, and may also maintain the active SRB.

In addition, the reason why the UE may receive the PER information from the alternative eNBs is that synchronization is tuned between the UE and the alternative eNBs.

In the case that synchronization is not tuned between the UE and the alternative eNBs, a procedure for tuning synchronization between the UE and the alternative eNBs may be added.

The UE may receive the PER information only when it is periodically received or the PER information is changed from the alternative eNBs.

Later, the UE receives the PER information that each alternative eNB may support (or provide) from the alternative eNBs (step, S2102).

And then, the UE compares the PER to be changed, received from the serving eNB and the minimum PER (or PER lower limit value; $PER_{MCS\_Min}$) that the UE itself is intended to be provided (step, S2103).

Here, the target PER and the minimum PER of each MCS corresponding to various MCSs may be transmitted to the UE through RRC signaling or system information (SI), and the like by the serving eNB.

Later, as a result of the comparison, in the case that the PER to be changed, of the serving eNB, is greater than the minimum PER of the MCS that UE is intended to be provided, the UE activates (active SRB/DRB configuration) the alternative link of the alternative eNB that has the smallest PER among the alternative eNBs (inactive SRB state) which is already secured, and releases the serving link of the serving eNB (step, S2104).

Here, the meaning of activating the alternative link may be interpreted as activating a connection with the alternative eNB or activating an SRB of the alternative eNB and configuring a DRB.

After step S2104, the UE compares the PER of the activated alternative eNB (alternative eNB that is going to perform the role of the serving eNB; alternative serving eNB) and the target PER of a specific MCS (step, S2105).

In step S2105, in the case that the PER of the activated alternative eNB is greater than the target PER of a specific MCS, the UE additionally performs a DRB configuration with another alternative eNB in order to satisfy the target PER of the specific MCS (step, S2106).

In this case, a product of the PER of the activated alternative eNB and the PER of another alternative eNB to which a DRB is additionally configured (summation of Log PERs) becomes smaller than the target PER of the specific MCS.

As a result of comparison in step S2103, in the case that the PER to be changed, of the serving eNB, is smaller than the minimum PER of the MCS that UE itself is going to be served, the UE compares the PER to be changed, of the serving eNB, with the PER of the alternative eNB (step, S2107).

As a result of comparison in step S2107, in the case that the PER to be changed, of the serving eNB, is greater than the PER of the alternative eNB (or in the case that the UE has an alternative eNB that has a PER smaller than the PER to be changed, of the serving eNB), the UE activates an alternative link (SRB/DRB) of the alternative eNB that has the smallest PER among the alternative eNBs that the UE possesses, and switches the serving eNB to the alternative eNB in which the alternative link is activated (step, S2108).

That is, the activated alternative eNB newly performs the role of the serving eNB.

That is, in the activated alternative eNB, the inactive SRB already configured is activated and switched to active SRB, and a DRB is additionally configured.

In addition, according to the PER to be changed, a DRB (SRB inactive) of the original serving eNB is switched to the activated alternative eNB or both of the SRB and the DRB are changed to the alternative eNB of inactive state.

After step, S2108, the UE performs step S2105. That is, the UE checks whether the PER of the activated alternative eNB is greater or smaller than the target PER of a specific MCS.

Next, as a result of comparison in step S2107, in the case that the PER to be changed, of the serving eNB, is smaller than the PER of the alternative eNB (or in the case that the UE does not have an alternative eNB that has a PER smaller than the PER to be changed, of the serving eNB), the UE compares the PER to be changed, of the serving eNB, with the target PER of a specific MCS (step, S2109).

As a result of comparison in step S2109, in the case that the PER to be changed, of the serving eNB, is greater than the target PER, the UE activates the alternative link of the alternative eNB in order to satisfy the the target PER of a specific MCS (DRB configuration) (step, S2110).

The alternative eNB activated in step S2110 is the activated alternative eNB of which PER product (summation of Log PERs) with the PER to be changed, of the serving eNB becomes smaller than the target PER ($PER_{MCS\_Target}$) of the specific MCS.

As a result of comparison in step S2109, in the case that the the PER to be changed, of the serving eNB becomes smaller than the minimum PER of the MCS that the UE itself is going to be provided with and smaller than the target PER, and the UE does not possess the alternative eNBs that have PERs smaller than the PER to be changed, of the serving eNB, the UE maintains a connection (SRB/DRB) with the serving eNB and also maintains a connection (inactive SRB) with the alternative eNBs which are already secured.

As a result of comparison in step S2109, the case that the PER to be changed, of the serving eNB, is smaller than the target PER for the specific MCS is described in detail with reference to FIG. 22 that will de described below.

In summary, FIG. 21 shows a method for a UE to switch the serving eNB with active SRB/DRB and the serving eNB according to a PER change of the serving eNB in a state of configuring inactive SRB with the alternative eNB, and to activate a connection with the alternative eNB.

FIG. 22 illustrates a method in relation to an update of an alternative eNB and another alternative eNB search according to a PER change of the alternative eNB in a state of configuring active SRB/DRB with a serving eNB and inactive SRB/Active DRB with the alternative eNB.

A UE may receive PER information (or radio link quality information) in relation to a PER to be changed, of the serving eNB, from the serving eNB from an RRC connection.

In addition, the UE may receive the PER information in relation to the PER to be changed, of each alternative eNB from the alternative eNBs according to a channel state of the UE by switching an RRC connection in the Inactive state to the Active state whenever the PER of each alternative eNB is changed for the alternative eNBs.

Referring to FIG. 22, the UE receives the PER information in relation to the PER to be changed, of the alternative eNB, from the alternative eNB(s) to which a connection is configured as the active state (DRB and SRB are inactive) (step, S2201).

Step S2201 may be performed after step S2106 described with reference to FIG. 21.

The meaning that a connection is configured as the active sate means that a DRB is configured between the UE and the alternative eNB.

Later, the UE compares the PER to be changed, of the alternative eNB, with the minimum PER of an MCS that the UE itself is going to be served (step, S2202).

As described above, the minimum PER and the target PER for each MCS corresponding to various MCSs may be transmitted to the UE in a form of an RRC signaling or system information (SI) by the alternative eNB.

As a result of comparison in step S2202, in the case that the PER to be changed, of the alternative eNB, is smaller than the minimum PER of the MCS, the UE compares a product (summation of Log PERs) of the PER of the serving eNB and the PER to be changed, of the alternative eNB with the target PER of the specific MCS (step, S2203).

As a result of comparison in step S2203, in the case that a product (summation of Log PERs) of the PER of the serving eNB and the PER to be changed, of the alternative eNB, is greater than the target PER of the specific MCS, the UE activates the link of another alternative eNB described above (configures a DRB with another alternative eNB). That is, the UE performs step S2106 described in FIG. 21 again.

In this case, the PER of the serving eNB and a product (summation of Log PERs) of the PER of the alternative eNB and the PER of another alternative eNB is smaller than the target PER of the specific MCS.

That is, the UE configures Active SRB and Active DRB with the serving eNB, configures Inactive SRB and active DRB with the alternative eNB, and configures Inactive SRB and Active DRB with another alternative eNB.

As a result of comparison in step S2203, in the case that a product (summation of Log PERs) of the PER of the serving eNB and the PER of the alternative eNB is smaller than the target PER of the specific MCS, the UE maintains the connection (Active SRB, Active DRB) between the serving eNB and the serving link (step, S2206). In addition, the UE maintains the connection (Inactive SRB, Active DRB) between the alternative eNB and the alternative link.

As a result of comparison in step S2203, in the case that the PER to be changed, of the alternative eNB, is greater than the minimum PER, the UE configures a DRB with another alternative eNB that has the smallest PER among the alternative eNBs that the UE secures already, and releases a DRB configuration with the alternative eNB (current alternative eNB) that transmits the PER to be changed (step, S2204).

Here, the UE releases the DRB configuration and the SRB configuration with the current alternative eNB.

The reason why the UE also releases the SRB configuration with the current alternative eNB is that the current alternative eNB is unable to satisfy the minimum PER of the MCS.

In this case, a product (summation of Log PERs) of the PER of the serving eNB and the PER of another alternative eNB is smaller than the target PER ($PER_{MCS\_Target}$) of the specific MCS.

At the same time of performing step S2204, the UE informs a result of another eNB search that is going to supplement the released alternative eNB, and configures an RRC connection (SRB) of Inactive state to the another alternative eNB (step, S2205).

That is, the UE configures active SRB and active DRB with the serving eNB, configures Inactive SRB and Active DRB with another alternative eNB, and configures Inactive SRB with another alternative eNB that is going to supplement the released alternative eNB.

In step S2202, in the case that the PER to be changed, of the alternative eNB, received from the alternative eNB is smaller than the minimum PER of the specific MCS that the UE itself is going to be served, when a product (summation of Log PERs) of the PER to be changed, of the alternative eNB and the PER of the serving eNB is smaller than the target PER of the specific MCS, the UE maintains the connection (SRB/DRB) with the serving eNB and also maintains the DRB configuration with the alternative eNBs that are already secured.

Serving eNB Switch and Alternative eNB Update According to a PER Change of a Serving eNB Hereinafter, according to whether the PER to be changed, of a serving eNB satisfies the minimum PER and/or the target PER for a specific MCS described above, a switching method of a serving eNB and an update method of an alternative eNB will be described with reference to related drawings in detail.

FIG. 23 is a flowchart illustrating an example of a method for switching a serving eNB and for updating an alternative eNB proposed in the present disclosure.

FIG. 23 shows the case that the PER to be changed, of a serving eNB, is smaller than the minimum PER of a specific MCS and greater than the target PER ($PER_{Target}$<PER to be changed, of a serving eNB <$PER_{Min}$).

Here, it is assumed that a UE does not possess an alternative eNB that has a PER smaller than the PER to be changed, of a serving eNB, and the UE is in a state that the UE configures active SRB and active DRB with the serving eNB and configures only Inactive SRB with alternative eNBs.

The serving eNB or the UE may know PER information associated with the PER that the alternative eNB may support through the procedure shown in FIG. 19.

That is, the UE knows radio link quality information of the alternative eNBs such as a PER guaranteeing time which is available to be provided by the alternative eNBs that satisfy the target PER of a specific MCS and the corresponding alternative eNBs, and the like.

The method shown in FIG. 23 is to perform a simultaneous transmission through an additional DRB configuration with a new alternative eNB except the serving eNB, and a PER product (summation of Log PERs) of the PER to be changed, of the serving eNB and the alternative eNB is to satisfy the target PER of a specific MCS.

Now, FIG. 23 is described in more detail.

First, the UE detects that the PER of the serving eNB for a specific MCS is going to be changed (step, S2301).

The detection may be performed through the PER Change Notification message from the serving eNB of FIG. 19 described above.

Later, the UE or the serving eNB identifies PER guaranteeing time which is available to be provided (or supported) by the alternative eNBs that has a PER satisfying the target PER of a specific MCS and the corresponding alternative eNBs, through the procedure described in FIG. 19.

And then, the UE transmits a Multi-Link Activate message that requests a multi-link activation of the alternative eNBs to the serving eNB (step, S2302).

The Multi-Link Activate message may include information of a target PER value, a minimum PER value of a specific MCS that the UE is provided, and the like.

In addition, the Multi-Link Activate message may include information (PER information) informing that it may be provided by the alternative eNBs that have a PER smaller than a minimum PER of a specific MCS and the corresponding alternative eNBs.

Here, in the case that the serving eNB already knows the PER guaranteeing time which is available to be provided by the alternative eNBs that have a PER satisfying the target PER of a specific MCS and the corresponding alternative eNBs through the procedure described in FIG. 19, the UE may not include the PER information of the corresponding alternative eNBs in the Multi-Link Activate message.

Here, in the case that the PER to be changed, of the serving eNB, is smaller than the minimum PER of a specific MCS and greater than the target PER (step, S2303), the serving eNB transmits a Link Activation Request message including a UE identifier, E-RAB Parameter, UE Capabilities, S-GW TEID, and the like to the alternative eNB (alternative eNB 2) that has the smallest PER with which PER product (summation of Log PERs) of the PER to be changed, of the serving eNB satisfies the target PER of the corresponding MCS among the alternative eNBs that have PERs smaller than the minimum PER informed by the UE (step, S2304).

Later, the alternative eNB (alternative eNB 2) that receives the Link Activation Request message transmits a Link Activation Response message including information associated with Radio Resource Configuration such as a UE identifier, an indicator specifying (indicating) an accept or reject for the Link Activation Request, DRB ID for the UE, and so on, to the serving eNB, in response to the Link Activation Request message (step, S2305).

The Control/User-Plane Branch Indication information included in the Link Activation Request message is an optional indicator specifying that the alternative eNB receives the corresponding MCS from the serving eNB and transmits it to the UE as occasion demands in the case that the gateways (GWs) of the serving eNB and the alternative eNB transmitting the Link Activation Response message are identical.

Later, the serving eNB transmits the changed Radio Resource Configuration information including the Radio Resource Configuration information for the UE received from the alternative eNB (alternative eNB 2) to the UE through an RRC Connection Reconfiguration message (step, S2306).

The changed Radio Resource Configuration information may include DRB ID of the serving eNB and/or the alternative eNB, and so on.

Later, in response to the RRC Connection Reconfiguration message, the UE transmits an RRC Connection Reconfiguration Complete message to the serving eNB (step, S2307).

And then, the serving eNB transmits an Status Number (SN) Status Transfer message indicating a UL/DL transmission state of the UE up to now to the activated alternative eNB (alternative eNB 2) (step, S2308).

That is, in step S2305, in the case that the specific MCS transmitted to the UE with the Link Activation Response message that the alternative eNB (alternative eNB 2) transmits to the serving eNB, including a C/U-Plane Branch Indication, is forwarded to the serving eNB and transmitted to the UE through the alternative eNB, the serving eNB may transmit the SN Status Transfer message to the alternative eNB for use of preventing damage of service continuity.

FIG. 24 is a flowchart illustrating another example of a method for switching a serving eNB and for updating an alternative eNB proposed in the present disclosure.

FIG. 24 exemplifies, in the case that a PER to be changed, of a serving eNB is smaller than the minimum PER ($PER_{MCS\_Min}$) for a specific MCS and there is an alternative eNB having a PER smaller than the PER to be changed, of a serving eNB, the case that the PER of the corresponding alternative eNB is greater than the target PER ($PER_{MCS\_Target}$).

In this case, a UE is in the state of configuring active SRB and active DRB with the serving eNB, and configuring inactive SRB and Active DRB with the alternative eNBs or configuring only inactive SRB with the alternative eNBs.

Here, through the procedure described in FIG. 19, the serving eNB or the UE may know the PER information that the alternative is available to provide (or support).

In FIG. 24, it is assumed that the alternative eNBs having a PER smaller than the PER to be changed, of the serving eNB, the PER guaranteeing time available to be provided by the corresponding alternative eNBs and the alternative eNB (alternative serving eNB) that is going to newly perform the role of serving eNB is unable to satisfy the target PER of a specific MCS of the UE.

In addition, the UE may know PER information such as alternative eNBs available to activate DRB additionally and PER guaranteeing time supportable by the corresponding alternative eNBs.

In FIG. 24, it is assumed that the alternative eNB having a PER smaller than the PER to be changed, of the serving eNB, is switched (shifted) to a new serving eNB of the UE and additional DRB is configured through a new another alternative eNB, and a product of the PER (summation of Log PERs) of the alternative eNB corresponding to new serving eNB and the PER of another alternative eNB satisfies the target PER of a specific MCS.

FIG. 24 is described in more detail.

Through the procedure described in FIG. 19, the UE or the serving eNB receives PER information such as alternative eNBs having a PER smaller than the PER to be changed, of the serving eNB, and a PER guaranteeing time available to be provided by the corresponding alternative eNBs.

In the case of FIG. 24, since it is assumed that the alternative eNB that is going to newly perform the role of serving eNB is unable to satisfy the target PER of a specific MCS of the UE, the UE further checks alternative eNBs available to activate DRB and a PER guaranteeing time available to be provided by the corresponding alternative eNBs.

The UE detects that the PER of the serving eNB is going to be changed (step, S2401).

This may be performed through an RRC signaling from the serving eNB.

Later, the UE transmits a Multi-Link Activate message to the serving eNB (step, S2402).

The Multi-Link Activate message may include information of the target PER value or the minimum PER value of a specific MCS that the UE is provided, and the like.

In addition, the Multi-Link Activate message may include information (PER information) informing that it may be provided by the alternative eNBs that have a PER smaller than a minimum PER of a specific MCS and the corresponding alternative eNBs.

Here, in the case that the serving eNB already knows the PER guaranteeing time which is available to be provided by the alternative eNBs that have a PER satisfying the target PER of a specific MCS and the corresponding alternative eNBs through the procedure described in FIG. 19, the UE may not include the PER information of the corresponding alternative eNBs in the Multi-Link Activate message.

Different from FIG. 23, FIG. 24 shows the case that the PER to be changed, of the serving eNB, is smaller than the minimum PER for a specific MCS, there is an alternative NB having a PER smaller than the PER to be changed, of the serving eNB, and the PER of the corresponding alternative eNB is greater than the target PER (step, S2403).

In the case, the serving eNB starts a procedure for switching inactive SRB to active SRB, switching to the alternative eNBs (alternative eNBs 2 and 3) that have PERs smaller than the PER to be changed, of the serving eNB.

Here, among the alternative eNBs (alternative eNBs 2 and 3) that have PERs smaller than the PER to be changed, of the serving eNB, only the SRB of the alternative eNB (serving alternative eNB) that is going to newly perform the serving eNB is activated.

That is, SRBs of other alternative eNBs except the serving eNB is not activated.

In addition, the SRB of the serving eNB may be switched from the active state to the inactive state.

Further, for the alternative eNB that has the smallest PER among the alternative eNBs that have a PER smaller than the minimum PER informed by the UE, the serving eNB transmits a Link Activation Request message including a UE identifier, an indicator specifying SRB activation, E-RAB Parameter, UE Capabilities, an identifier of the alternative eNBs of which DRB is activated, PER of the corresponding alternative eNB, identifier for other alternative eNBs configured to be connected with SRB Inactive, and so on (step, S2404).

Here, the reason why the serving eNB transmits the information of the alternative eNBs of which DRB is activated and alternative eNBs configured to be connected with SRB Inactive is that the PER of a new alternative eNB that is going to replace the serving eNB is unable to satisfy the target PER, and for informing the information of other alternative eNBs that have the PER that satisfies the target PER.

In this case, according to the procedure described in FIG. 19, the serving eNB checks whether there is an alternative eNB having the PER that satisfies the PER of the serving eNB before being switched.

As a result of the check, in the case that there is an alternative eNB having the PER that satisfies the PER of the serving eNB before being switched, the serving eNB activates the SRB of the corresponding alternative eNB, and in the case that the corresponding alternative eNB also satisfies the target PER of a specific MCS, the procedure for generating additional DRB with other alternative eNB described above may be omitted.

Later, the alternative eNB that receives the Link Activation Request message from the serving eNB transmits a Link Activation Response message including information associated with Radio Resource Configuration such as a UE identifier, an indicator indicating an accept or reject for the Link Activation Request, S-GW TEID, DRB ID for the UE, and so on, to the serving eNB, in response to the Link Activation Request message (step, S2405).

In addition, the serving eNB transmits a Link Activation Request message including a UE identifier, an alternative eNB identifier that is going to perform the role of the serving eNB, an indicator specifying SRB inactivation, E-RAB Parameter, UE Capabilities, S-GW TEID, and so on to the alternative eNBs of which DRB is going to be activated.

Later, the alternative eNBs that receives the Link Activation Request message transmits a Link Activation Response message including information associated with Radio Resource Configuration such as a UE identifier, an indicator indicating an accept or reject for the Link Activation Request, DRB ID for the UE, and so on to the serving eNB.

The Control/User-Plane Branch Indication information included in the Link Activation Request message is an optional indicator specifying that the alternative eNB receives the corresponding MCS from the serving eNB and transmits it to the UE as occasion demands in the case that the gateways (GWs) of the serving eNB and the alternative eNB transmitting the Link Activation Response message are identical.

Later, the serving eNB transmits the changed Radio Resource Configuration information including the Radio Resource Configuration information for the UE received from the alternative eNB of which DRB is going to be activated to the UE through an RRC Connection Reconfiguration message (step, S2406).

Later, in response to the RRC Connection Reconfiguration message, the UE transmits an RRC Connection Reconfiguration Complete message to the serving eNB (alternative eNB 2) that is going to perform the role of serving eNB (step, S2407).

In step S2405, in the case that the specific MCS transmitted to the UE with the Link Activation Response message that the alternative eNB transmits to the serving eNB, including a C/U-Plane Branch Indication, is forwarded to the serving eNB and transmitted to the UE through the alternative eNB, the serving eNB may transmit the SN Status Transfer message to the alternative eNB for use of preventing damage of service continuity (step, S2408).

Here, the alternative eNB (alternative serving eNB) that is going to perform the role of serving eNB transmits an RRC Deactivate Request message for requesting an RRC connection deactivation with the UE to the (previous) serving eNB (step, S2409), and switches the SRB with the UE in inactivate state.

The RRC Deactivate Request message may include a UE ID, and the like.

That is, the serving eNB switched to the inactive SRB state may maintain or release the DRB configuration with the UE according to the PER to be changed.

That is, in the case that the PER value to be changed, of the serving eNB, is unable to satisfy the minimum PER value for a specific MCS, the DRB configuration with the UE is released.

FIG. 25 is a flowchart illustrating another example of a method for switching a serving eNB and for updating an alternative eNB proposed in the present disclosure.

That is, FIG. 25 exemplifies the case that a PER to be changed, of a serving eNB is greater than the minimum PER, there is an alternative eNB having a PER smaller than the PER to be changed, of a serving eNB, and the PER of the corresponding alternative eNB is greater than the target PER.

In this case, a UE is in the state of configuring active SRB and active DRB with the serving eNB, and configuring inactive SRB and Active DRB with the alternative eNBs or configuring only inactive SRB.

Here, through the procedure described in FIG. 19, the serving eNB or the UE may know the PER information that the alternative is available to provide.

In FIG. 25, it is assumed that the alternative eNBs having a PER smaller than the PER to be changed, of the serving eNB, the PER guaranteeing time available to be provided by the corresponding alternative eNBs and the alternative eNB (alternative serving eNB, alternative eNB 2) that is going to newly perform the role of serving eNB is unable to satisfy the target PER of a specific MCS of the UE.

In addition, it is assumed that the serving eNB or the UE may know PER information such as alternative eNBs available to activate DRB additionally and PER guaranteeing time supportable by the corresponding alternative eNBs.

In FIG. 25, that the alternative eNB having a PER smaller than the PER to be changed, of the serving eNB, is switched to a new serving eNB (alternative eNB 2) of the UE and additional DRB is configured through a new another alternative eNB (alternative eNB 3), and a product of the PER (summation of Log PERs) of the alternative eNB corresponding to new serving eNB and the PER of another alternative eNB, which is newly added, satisfies the target PER of an MCS.

FIG. 25 is described in more detail.

By performing the procedure described in FIG. 19, It is assumed that the UE or the serving eNB is unable to satisfy the alternative eNBs having a PER smaller than the PER to be changed, of the serving eNB, and a PER guaranteeing time available to be provided by the corresponding alternative eNBs, and the alternative eNB that is going to newly perform the role of serving eNB is unable to satisfy the target PER of a specific MCS of the UE.

Accordingly, the serving eNB or the UE further checks the alternative eNBs available to activate DRB and a PER guaranteeing time available to be provided by the corresponding alternative eNBs.

Likewise FIG. 23 and FIG. 24, the UE detects that the PER of the serving eNB is going to be changed (step, S2501).

Later, the UE transmits a Multi-Link Activate message to the serving eNB (step, S2502).

The Multi-Link Activate message may include information of the target PER value or the minimum PER value of a specific MCS that the UE is provided, and the like.

In addition, the Multi-Link Activate message may include information (PER information) informing that it may be provided by the alternative eNBs that have a PER smaller than a minimum PER of a specific MCS and the corresponding alternative eNBs.

Further the Multi-Link Activate message may include information of additional candidate alternative eNBs that are going to replace the serving eNB.

Here, in the case that the serving eNB already knows the PER guaranteeing time which is available to be provided by the alternative eNBs that have a PER satisfying the target PER of a specific MCS and the corresponding alternative eNBs through the procedure described in FIG. 19, the UE may not include the PER information of the corresponding alternative eNBs in the Multi-Link Activate message.

FIG. 25 shows the case that the PER to be changed, of the serving eNB, is greater than the minimum PER for a specific MCS, there is an alternative NB having a PER smaller than the PER to be changed, of the serving eNB, and the PER of the corresponding alternative eNB is greater than the target PER (step, S2503).

In the case, the serving eNB starts a procedure for switching SRB to the corresponding alternative eNBs. That is, the alternative eNB becomes a new serving eNB.

This means that the SRB of the corresponding alternative eNB is activated, and the SRB of the serving eNB is released.

The serving eNB transmits a Link Activation Request message including a UE identifier, an indicator specifying SRB activation, E-RAB Parameter, UE Capabilities, an identifier of the alternative eNBs of which DRB is activated, PER of the corresponding alternative eNB, identifier for other alternative eNBs configured to be connected with SRB Inactive, an identifier for an additional candidate alternative eNBs that are going to replace the serving eNB, and so on to the alternative eNB (alternative eNB 2) that has the smallest PER among the alternative eNBs that have a PER smaller than the minimum PER informed by the UE (step, S2504).

The reason why the serving eNB transmits the information of the alternative eNBs of which DRB is activated and alternative eNBs configured to be connected with SRB Inactive is that the PER of a new alternative eNB that is going to replace the serving eNB is unable to satisfy the target PER, and for informing the information of other alternative eNBs that have the PER that satisfies the target PER.

In addition, the reason why the serving eNB transmits the information of the additional candidate alternative eNBs that are going to replace the serving eNB is for securing another alternative eNB that is going to complement the released serving eNB and configuring a connection in the SRB Inactive state, since the RRC connection with the serving eNB is going to be released.

In this case, according to the procedure described in FIG. 19, the serving eNB checks whether there is an alternative eNB having the PER that satisfies the PER of the serving eNB before being switched.

As a result of the check, in the case that there is an alternative eNB having the PER that satisfies the PER of the serving eNB before being switched, the serving eNB activates the SRB of the corresponding alternative eNB, and in the case that the corresponding alternative eNB also satisfies the target PER of a specific MCS, the procedure for generating additional DRB may be omitted.

Later, the alternative eNB that receives the Link Activation Request message transmits a Link Activation Response message including information associated with Radio Resource Configuration such as a UE identifier, an indicator indicating accept/reject for the Link Activation Request, S-GW TEID, DRB ID for the UE, and so on, to the serving eNB, in response to the Link Activation Request message (step, S2505).

In addition, the serving eNB transmits a Link Activation Request message including a UE identifier, an alternative eNB identifier that is going to perform the role of the serving eNB, an indicator specifying SRB inactivation, E-RAB Parameter, UE Capabilities, S-GW TEID, and so on to the alternative eNBs (alternative eNB 3) of which DRB is going to be activated (step, S2506).

In step S2506, the alternative eNBs that receives the Link Activation Request message transmits a Link Activation Response message including information associated with Radio Resource Configuration such as a UE identifier, an indicator indicating an accept or reject for the Link Activation Request, DRB ID for the UE, and so on to the serving eNB (step, S2507).

The Control/User-Plane Branch Indication information included in the Link Activation Request message is an optional indicator specifying that the alternative eNB receives the MCS from the serving eNB and transmits it to the UE as occasion demands in the case that the GWs of the serving eNB and the alternative eNB transmitting the Link Activation Response message are identical.

The serving eNB transmits the changed Radio Resource Configuration information including the Radio Resource Configuration information for the UE received from the alternative eNB of which DRB is going to be activated to the UE and information of alternative eNBs to which Inactive SRB is newly configured through an RRC Connection Reconfiguration message (step, S2508).

Later, in response to the RRC Connection Reconfiguration message, the UE transmits an RRC Connection Reconfiguration Complete message to the serving eNB (alternative eNB 2) that is going to perform the role of serving eNB (step, S2509).

In step S2507, in the case that the MCS transmitted to the UE with the Link Activation Response message that the alternative eNB transmits to the serving eNB, including a C/U-Plane Branch Indication, is forwarded to the serving eNB and transmitted to the UE through the alternative eNB, the serving eNB may transmit the SN Status Transfer message to the alternative eNB for use of preventing damage of service continuity.

The alternative eNB (alternative eNB 2) that is going to perform the role of serving eNB transmits an RRC Deactivate Request message to the previous serving eNB (step, S2510), and releases the RRC connection with the UE.

Method for Alternative eNB Update and Connection Activation of Additional Alternative eNB According to a PER Change of an Alternative eNB Hereinafter, according to whether the PER to be changed, of an alternative eNB satisfies the minimum PER and/or the target PER for a specific MCS described above, an updating method of the alternative eNB and a connection activation with an additional alternative eNB will be described with reference to related drawings in detail.

FIG. 26 is a flowchart illustrating an example of an updating method of an alternative eNB according to a PER change of an alternative eNB proposed in the present disclosure. FIG. 26a shows an example of a method for an alternative eNB in SRB inactive state to inform PER related information to a UE.

The PER related information may include a PER to be changed, of an alternative eNB, an application time of the PER to be changed, a guaranteeing time for the PER to be changed, and so on, and may be transmitted/received through an RRC Activation message, and the like.

The RRC Activation message may further include Temporary Activate Indication information.

That is, FIG. 26a shows, when a UE 1) configures Active SRB/DRB with a serving eNB and, in the state of configuring only Inactive SRB with an alternative eNB, the alternative eNB is intended to inform a quality value indicator (PER) that the alternative eNB itself may provide, 2) configures Active SRB/DRB with the serving eNB and, in the state of configuring Inactive SRB and Active DRB with the alternative eNB, the alternative eNB is intended to change its own quality value indicator (PER), a method for inform the information in relation to the PER to be changed.

Since an RRC connection between the UE and the alternative eNB is Inactive state in both of 1) and 2) cases, the alternative eNB should activate the RRC connection in order to forward the quality value indicator (PER) to the UE.

In the first method (Alt. 1) shown in FIG. 26a, the alternative eNB transmits an RRC Activation message that includes an indicator specifying a temporary activation mode for the RRC connection and an indicator of quality value to be changed to the UE.

The UE obtains the information in relation to the quality value indicator (PER) to be changed, of the corresponding alternative eNB by receiving the RRC Activation message, and after transmitting the RRC Activation message to the UE, the alternative eNB switches the RRC connection with the corresponding UE to Inactive state again, implicitly.

In the second method (Alt. 2) shown in FIG. 26a, after the alternative eNB transmits an RRC Activation message that includes only the indicator specifying a temporary activation mode for the RRC connection, the alternative eNB transmits the information in relation to the quality value indicator (PER) to the UE through an RRC Connection Reconfiguration message.

After the UE obtains the information in relation to the quality value indicator (PER) of the alternative eNB through the RRC Connection Reconfiguration message, the UE transmits an RRC Connection Reconfiguration Complete message including an indicator specifying to switch the RRC connection to inactive state to the alternative eNB.

The alternative eNB switches the RRC connection with the corresponding UE to Inactive state by receiving it.

That is, the UE may obtain the information in relation to the quality value indicator (PER) to be changed from the alternative eNB through the RRC connection which is temporarily activated.

For both of the two methods (Alt. 1 and Alt. 2), in the case of 1), instead of the information in relation to the quality value indicator (PER) to be changed, the information in relation to the quality value indicator (PER) supportable by the alternative eNB may be included and forwarded to the UE.

FIG. 26b illustrates an update procedure of an alternative eNB according to a change of PER of the alternative eNB during performing a simultaneous transmission through a serving eNB and the alternative eNB.

FIG. 26b shows an example of the case that the PER to be changed, of the alternative serving eNB, is smaller than the minimum PER ($PER_{MCS\_Min}$) of a specific MCS, but a product (summation of Log PERs) of a PER of the serving eNB and a PER to be changed, of the alternative eNB is greater than the target PER (PER$_{Target}$)

In this case, it is assumed that the UE configures Active SRB/DRB with the serving eNB and configures inactive SRB/active DRB with alternative eNB 3.

The serving eNB and the UE may know PER information that the alternative eNB may provide through the procedure shown in FIG. 19 or FIG. 26*a*.

Here, it is assumed that a product (summation of Log PERs) of a PER of the serving eNB and a PER to be changed, of the alternative eNB is unable to satisfy the target PER of a specific MCS of the UE.

Accordingly, the UE knows PER information such as the alternative eNBs in which DRB activation is available additionally and a PER guaranteeing time which is available to be provided by the corresponding alternative eNBs, and the like.

In FIG. 26*b*, the UE configures an additional DRB with a new alternative eNB, and a product (summation of Log PERs) of a PER of the serving eNB and a PER of the added alternative eNB is to satisfy the target PER of a specific MCS.

In this case, the previous alternative eNB is switched from Inactive SRB/Active DRB state to Inactive SRB and inactive DRB.

Now, FIG. 26*b* is described in more detail.

Since a product (summation of Log PERs) of a PER of the serving eNB and a PER to be changed, of the alternative eNB is unable to satisfy the target PER of a specific MCS of the UE, the UE or the serving eNB knows PER information such as the alternative eNBs in which DRB activation is available additionally and a PER guaranteeing time which is available to be provided by the corresponding alternative eNBs, and the like, by performing the procedure described in FIG. 19.

The UE may detect that the PER of the serving eNB is going to be changed through a PER Change Notification, or the like from the serving eNB (step, S2601).

Next, the UE transmits a Multi-Link Activate message for a multi-link configuration with the alternative eNB (step, S2602).

The Multi-Link Activate message includes information of a target PER value, a minimum PER value of an MCS that the UE is provided, and the like.

In addition, the Multi-Link Activate message may further include information of PER informing that it may be provided by the alternative eNBs that have a PER smaller than a minimum PER of a specific MCS and the corresponding alternative eNBs.

In the case that the PER to be changed, of the alternative eNB, is smaller than the minimum PER, and a product (summation of Log PERs) of a PER of the serving eNB and a PER to be changed, of the alternative eNB is greater than the target PER (step, S2603), FIG. 26*b* shows a method for performing a procedure for updating the corresponding alternative eNB.

That is, this means that the DRB of another alternative eNB that is going to replace the corresponding alternative eNB is activated, and a simultaneous transmission through the serving eNB and another alternative eNB.

The serving eNB transmits a Link Activation Request message including a UE identifier, E-RAB Parameter, UE Capabilities, S-GW TEID, and so on, to the alternative eNB (alternative eNB 2) that has the smallest PER with which PER product (summation of Log PERs) of the serving eNB satisfies the target PER of a specific MCS among the alternative eNBs (alternative eNBs 1 and 2) that have PERs smaller than the minimum PER informed by the UE (step, S2604).

Next, the alternative eNB (alternative eNB 2) that receives the Link Activation Request message transmits a Link Activation Response message including information associated with Radio Resource Configuration such as a UE identifier, an indicator indicating an accept or reject for the Link Activation Request, DRB ID for the UE, and so on, to the serving eNB (step, S2605).

The Control/User-Plane Branch Indication information included in the Link Activation Request message is an optional indicator specifying that the alternative eNB receives the MCS from the serving eNB and forwards it to the UE as occasion demands in the case that the gateways (GWs) of the serving eNB and the alternative eNB are identical.

Next, the serving eNB transmits a Link Deactivation Request message requesting to release DRB for the corresponding UE to the previous alternative eNB (alternative eNB 3) (step, S2606), and receives a response to the Link Deactivation Request message (a Link Deactivation Request ACK) from the previous alternative eNB (step, S2607).

Later, the serving eNB transmits an RRC Connection Reconfiguration message including the changed Radio Resource Configuration information including the Radio Resource Configuration information for the UE received from the alternative eNB of which DRB is going to be activated, to the UE (step, S2608).

Next, in response to the RRC Connection Reconfiguration message, the UE transmits an RRC Connection Reconfiguration Complete message to the serving eNB (step, S2609).

In step S2605, in the case that MCS data transmitted to the UE with the Link Activation Response message that the alternative eNB transmits to the serving eNB, including a C/U-Plane Branch Indication, is forwarded to the serving eNB and transmitted to the UE through the alternative eNB, the serving eNB may transmit the SN Status Transfer message to the alternative eNB (alternative eNB 2) for use of preventing damage of service continuity (step, S2610).

FIG. 27 is a flowchart illustrating another example of an updating method of an alternative eNB according to a PER change of an alternative eNB proposed in the present disclosure.

FIG. 27 shows an example of the case that a PER to be changed, of an alternative eNB is greater than the minimum PER for a specific MCS.

In this case, it is assumed that the UE configures Active SRB and active DRB with the serving eNB and configures inactive SRB and Active DRB with alternative eNB 3 (Candidate Target 3).

The serving eNB or the UE may know PER information that the alternative eNB may provide through the procedure shown in FIG. 19 or FIG. 26*a*.

Here, it is assumed that the serving eNB or the UE knows PER information such as the alternative eNBs in which DRB activation is available additionally and a PER guaranteeing time which is available to be provided by the corresponding alternative eNBs, since the PER to be changed, of the alternative eNB, is unable to satisfy the minimum PER of a specific MCS of the UE.

In FIG. 27, the UE configures an additional DRB with a new alternative eNB, and a product (summation of Log PERs) of a PER of the serving eNB and a PER of the added alternative eNB is to satisfy the target PER of the MCS.

In this case, since the previous alternative eNB (alternative eNB 3) is unable to satisfy the minimum PER, an RRC connection with the UE is released in the Inactive SRB and the active DRB state.

Now, FIG. 27 is described in more detail.

Since the PER to be changed, of the alternative eNB is unable to satisfy the minimum PER of a specific MCS of the UE, the UE or the serving eNB knows PER information such as the alternative eNBs in which DRB activation is available additionally and a PER guaranteeing time which is available to be provided by the corresponding alternative eNBs, and the like, by performing the procedure described in FIG. 19.

The UE detects that the PER of the alternative eNB is changed (step, S2701).

Next, the UE transmits a Multi-Link Activate to the alternative eNB (step, S2702).

The Multi-Link Activate message includes information of the target PER and the minimum PER, and so on of the MCS that the UE is provided, information of a target PER value, a minimum PER value of an MCS that the UE is provided, information of additional candidate alternative eNBs and the like.

In the case that the PER to be changed, of the alternative eNB is greater than the minimum PER (step, S2703), FIG. 27 shows a procedure for the serving eNB to update the corresponding alternative eNB (release a connection with the corresponding alternative eNB and add another alternative eNB).

This means that the DRB of another alternative eNB (alternative eNB 2) that is going to replace the corresponding alternative eNB (alternative eNB 3) is activated, and an RRC connection with the previous alternative eNB is released.

Next, the serving eNB transmits a Link Activation Request message including a UE identifier, E-RAB Parameter, UE Capabilities, S-GW TEID, and so on, to the alternative eNB (alternative eNB 2) that has the smallest PER with which PER product (summation of Log PERs) of the serving eNB satisfies the target PER of a specific MCS among the alternative eNBs (candidate targets 1 and 2) that have PERs smaller than the minimum PER for a specific MCS informed by the UE (step, S2704).

Next, the alternative eNB that receives the Link Activation Request message transmits a Link Activation Response message including information associated with Radio Resource Configuration such as a UE identifier, an indicator indicating an accept or reject for the Link Activation Request, DRB ID for the UE, and so on, to the serving eNB (step, S2705).

The Control/User-Plane Branch Indication information included in the Link Activation Request message is an optional indicator specifying that the alternative eNB receives the MCS from the serving eNB and forwards it to the UE as occasion demands in the case that the GWs of the serving eNB and the alternative eNB are identical.

Here, the serving eNB configures a connection of SRB inactive mode (SRB of inactive state) to another alternative eNB reported by the UE.

Next, the serving eNB transmits an RRC Connection Release Request message to the previous alternative eNB (alternative eNB 3) that is unable to satisfy the minimum PER (step, S2706), and receives a response to the RRC Connection Release Request message (step, S2707).

And then, the previous alternative eNB transmits an RRC Connection Release Request Ack message to the serving eNB (step, S2707), and informs that DRB and Inactive SRB with the corresponding UE is released.

This is for releasing the DRB and Inactive SRB with the corresponding UE since the previous alternative eNB is unable to satisfy the minimum PER of a specific MCS.

Next, the serving eNB transmits an RRC Connection Reconfiguration message including the changed Radio Resource Configuration information including the Radio Resource Configuration information for the UE received from the alternative eNB of which DRB is going to be activated, information of a new alternative eNBs to which Inactive SRB is configured, previous alternative eNB information of which RRC connection is released, and the like to the UE (step, S2708).

Next, in response to the RRC Connection Reconfiguration message, the UE transmits an RRC Connection Reconfiguration Complete message to the serving eNB (step, S2709).

In step S2705, in the case that MCS data transmitted to the UE with the Link Activation Response message that the alternative eNB transmits to the serving eNB, including a C/U-Plane Branch Indication, is forwarded to the serving eNB and transmitted to the UE through the alternative eNB, the serving eNB may transmit the SN Status Transfer message to the alternative eNB for use of preventing damage of service continuity (step, S2710).

Hereinafter, by comparing the method proposed in the present disclosure and the Dual Connectivity procedure defined in the previous LTE/LTE-A system, a difference of efficiency in the aspect of latency will be described.

For quantitative comparison in the aspect of a UE operation between the method proposed in the present disclosure and the conventional Dual Connectivity procedure, total time consumed for transmitting an RRC Connection Reconfiguration Complete message to a Target eNB (e.g., alternative eNB) from the time of transmitting a measurement report (MR; a Multi-Link Activate transmission of UE in the method proposed in the present disclosure) to the serving eNB may be represented as Tables 2 to 4 below.

The method of FIG. 23 described above is compared with an SeNB Addition procedure of the Dual Connectivity, which is determined to similar in the aspect that an alternative eNB link is added without a change of the serving eNB, and the result is as represented in Table 2 below.

As represented in Table 2 below, in the conventional SeNB Addition procedure of the Dual Connectivity, 1) a UE transmits a Measurement Report to a serving eNB, 2) the UE receives an RRC Connection Reconfiguration message from the serving eNB, 3) the UE transmits a response to the RRC Connection Reconfiguration message (RRC connection reconfiguration complete) to the serving eNB, 4) the UE tunes synchronization with the SeNB, and 5) the UE performs Random Access procedure with the SeNB.

On the other hand, in the method proposed in the present disclosure, 1) since a UE is in the state of securing alternative eNBs that are available to be activated or updated (i.e., performs synchronization with alternative eNBs in advance and receives C-RNTI from the corresponding alternative eNBs) in preparation for the case that radio link quality is changed to the extent to be improper for a specific MCS depending on a change of radio link quality value of a serving eNB or an alternative eNB, the method proposed in the present disclosure has better efficiency than the conventional Dual Connectivity procedure in the aspect of latency.

For particular comparison, the Metric defined for C-Plane is used, and it is assumed that RRC Message Transfer Delay is 1 ms, Message Processing Delay by a UE or an eNB is 4 ms and X2 Message Transfer Delay between eNBs is 5 MS.

In the method proposed in the present disclosure, 1) a UE transmits a Multi-Link Activate request including radio link quality information that includes radio link quality value of alternative eNBs secured by the UE itself and the corresponding alternative eNBs according to a change of the radio link quality value of a serving eNB, 2) the serving eNB receives the Multi-Link Activate request and activates a connection to the corresponding alternative eNB by determining the alternative eNB of the best condition, 3) the serving eNB informs the result for it to the UE.

In the qualitative aspect, different from the conventional Dural Connectivity procedure that simply adds an SeNB according to the Measurement result of a UE in order to increase the capacity of the UE, the method proposed in the present disclosure is able to activate the best alternative links that satisfy the target PER for an MCS among the alternative eNBs that the UE is already secured according to a PER change of the serving eNB.

Table 2 represents the comparison of the method proposed in the present disclosure (FIG. 23) with the SeNB Addition procedure of the conventional Dual Connectivity.

TABLE 2

|   | Message | Delay (ms) | Message | Delay (ms) |
|---|---|---|---|---|
| 1 | Measurement Report | 1 + 4 (5) | Multi-Link Activate | 1 + 4 (5) |
| 2 | SeNB Addition Request | 5 + 4 (9) | Link Activation Request | 5 + 4 (9) |
| 3 | SeNB Addition Request Ack | 5 + 4 (9) | Link Activation Response | 5 + 4 (9) |
| 4 | RRC Connection Reconfiguration | 1 + 4 (5) | RRC Connection Reconfiguration | 1 + 4 (5) |
| 5 | RRC Connection Reconfiguration Complete | 1 + 4 (5) | RRC Connection Reconfiguration Complete | 1 + 4 (5) |
| 6 | SeNB Reconfiguration Complete | 5 + 4 (9) | | |
| 7 | Radio Synchronization | 1 | | |
| 8 | Average delay due to RACH scheduling period (1 ms periodicity) | 0.5 | | |
| 9 | RACH Preamble | 1 | | |
| 10 | Preamble detection and transmission of RA response (Time between the end RACH transmission and UE's reception of scheduling grant and timing adjustment) | 5 | | |
| 11 | Decoding of scheduling grant and timing alignment | 2 | | |
| Total | | 51.5 ms | | 33 ms |

The method of FIG. 25 described above is compared with the MeNB to eNB Change procedure of the conventional Dual Connectivity, which is determined to be similar in the aspect that a serving eNB is changed to an alternative eNB since the PER to be changed, of the serving eNB, is unable to satisfy the minimum PER of an MCS that the UE is provided and there is an alternative eNB that guarantees smaller PER than the PER to be changed, of the serving eNB, and the result is as represented in Table 3 below.

As represented in Table 3, in the MeNB to eNB Change procedure of the conventional Dual Connectivity, 1) a UE transmits a Measurement Report to a serving eNB. 2) Later, the serving eNB transmits a handover request to a target eNB. 3) Later, the serving eNB receives a response to the handover request from the target eNB. 4) Later, the serving eNB transmits a request for releasing an SeNB. 5) Later, the serving eNB transmits an RRC Connection Reconfiguration message to the UE. 6) Later, the UE tunes synchronization with the target eNB, and performs Random Access procedure. 7) Later, the UE transmits an RRC Connection Reconfiguration Complete message to the target eNB.

On the other hand, in the method proposed in the present disclosure, a UE is in the state of securing alternative eNBs that are available to be activated or updated (i.e., performs synchronization with alternative eNBs in advance and receives C-RNTI from the corresponding alternative eNBs) in preparation for the case that radio link quality is changed to the extent to be improper for an MCS according to a PER change of a serving eNB or an alternative eNB.

However, a procedure is added, that is the UE does not release the alternative eNB of which DRB is activated that the UE secures already, forwards the DRB activation request including the information of serving eNB to be changed to other alternative eNBs and receives a response for it.

That is, in the method proposed in the present disclosure, 1) a UE transmits a Multi-Link Activate request including the alternative eNBs secured by the UE itself according to a PER change of its own serving eNB and a PER of the corresponding alternative eNB to a serving eNB. 2) Later, the serving eNB determines the alternative eNB of the best condition by receiving the Multi-Link Activate request, and activates SRB to the corresponding alternative eNB. 3) Later, the serving eNB transmits a Link Activation Request that requests consecutive alternative eNB activation according to a change of the serving eNB to other alternative eNBs in the state of not releasing the alternative eNBs of which DRB is activated already. 4) Later, the serving eNB receives a response to the Activation Request, and informs the result to the UE.

Accordingly, in the method of FIG. 25, there may not be big decrease in the aspect of latency in comparison with the conventional method (the MeNB to eNB Change procedure of the Dual Connectivity).

However, in the qualitative aspect, when a UE is intended to change a serving eNB, different from the conventional Dural Connectivity procedure that a candidate eNB secured already is released and a serving eNB is switched to a target eNB, the method proposed in the present disclosure activates SRB to the best alternative link that satisfies the target PER for an MCS among the alternative eNBs that the UE secures already according to a PER change of the serving eNB.

In addition, the method proposed in the present disclosure (FIG. 25) it not to release the alternative eNBs of which DRB is activated already, but to be maintained for the corresponding UE continuously.

Table 3 below is a table that compares the method of FIG. 25 with the MeNB to eNB Change procedure of the conventional Dual Connectivity

TABLE 3

|   | Message | Delay (ms) | Message | Delay (ms) |
|---|---|---|---|---|
| 1 | Measurement Report | 1 + 4 (5) | Multi-Link Activate | 1 + 4 (5) |
| 2 | Handover Request | 5 + 4 (9) | Link Activation Request | 5 + 4 (9) |
| 3 | Handover Request Ack | 5 + 4 (9) | Link Activation Response | 5 + 4 (9) |
| 4 | SeNB Release Request | 5 + 4 (9) | Link Activation Request | 5 + 4 (9) |
| 5 | RRC Connection Reconfiguration | 1 + 4 (5) | Link Activation Response | 5 + 4 (9) |

TABLE 3-continued

| | Message | Delay (ms) | Message | Delay (ms) |
|---|---|---|---|---|
| 6 | Radio Synchronization | 1 | RRC Connection Reconfiguration | 1 + 4 (5) |
| 7 | Average delay due to RACH scheduling period (1 ms periodicity) | 0.5 | RRC Connection Reconfiguration Complete | 1 + 4 (5) |
| 8 | RACH Preamble | 1 | | |
| 9 | Preamble detection and transmission of RA response (Time between the end RACH transmission and UE's reception of scheduling grant and timing adjustment) | 5 | | |
| 10 | Decoding of scheduling grant and timing alignment | 2 | | |
| 11 | RRC Connection Reconfiguration Complete | 1 + 4 (5) | | |
| Total | | 51.5 ms | | 51 ms |

Next, the method of FIG. 27 is compared with the SeNB Change procedure of the conventional Dual Connectivity, which is determined to be similar in the aspect that the PER to be changed, of the alternative eNB, is unable to satisfy the minimum PER of the MCS and changed to a new alternative eNB, and the result is as represented in Table 4.

As represented in Table 4, in the SeNB Change procedure of the conventional Dual Connectivity, 1) a UE transmits a Measurement Report to a serving eNB. 2) Later, the serving eNB transmits an SeNB Addition request to another eNB, and receives a response to it. 3) Later, the serving eNB transmits a request for releasing the previous SeNB, and transmits an RRC Connection Reconfiguration including the result to the UE. 4) Later, the UE transmits an RRC Connection Reconfiguration Complete to serving eNB, and the serving eNB forwards it to another eNB. 5) Later, the UE tunes synchronization with another eNB, and performs Random Access procedure.

On the other hand, in the method proposed in the present disclosure, a UE is in the state of securing potential alternative eNBs that are available to be activated or updated (i.e., performs synchronization with alternative eNBs in advance and receives C-RNTI from the corresponding alternative eNBs) in preparation for the case that radio link quality is changed to the extent to be improper for an MCS according to a PER change of a serving eNB or an alternative eNB, and accordingly, the method proposed in the present disclosure has better efficiency than the conventional Dual Connectivity procedure in the aspect of latency.

That is, in the method proposed in the present disclosure, 1) a UE transmits a Multi-Link Activate request including the alternative eNBs secured by the UE itself according to a PER change of an alternative eNB and a PER of the corresponding alternative eNB to a serving eNB. 2) Later, the serving eNB determines the alternative eNB of the best condition by receiving the Multi-Link Activate request, and activates DRB to the corresponding alternative eNB. 3) Later, the serving eNB transmits a message for requesting to release a connection with the corresponding UE to the previous alternative eNB. 4) Later, the serving eNB receives a response to the message for requesting to release a connection, and informs the result to the UE.

In the qualitative aspect, different from the conventional Dural Connectivity procedure that simply changes an SeNB according to the Measurement result of a UE in order to increase the capacity of the UE, the method proposed in the present disclosure is able to activate the best alternative links that satisfy the target PER for an MCS among the alternative eNBs that the UE is already secured according to a PER change of the alternative eNB.

Table 4 below compares and summarizes the method of FIG. 27 with the SeNB Change procedure of the conventional Dual Connectivity.

TABLE 4

| | Message | Delay (ms) | Message | Delay (ms) |
|---|---|---|---|---|
| 1 | Measurement Report | 1 + 4 (5) | Multi-Link Activate | 1 + 4 (5) |
| 2 | SeNB Addition Request | 5 + 4 (9) | Link Activation Request | 5 + 4 (9) |
| 3 | SeNB Addition Request Ack | 5 + 4 (9) | Link Activation Response | 5 + 4 (9) |
| 4 | SeNB Release Request | 5 + 4 (9) | RRC Connection Release Request | 5 + 4 (9) |
| 5 | RRC Connection Reconfiguration | 1 + 4 (5) | RRC Connection Release Request Ack | 5 + 4 (9) |
| 6 | RRC Connection Reconfiguration Complete | 1 + 4 (5) | RRC Connection Reconfiguration | 1 + 4 (5) |
| 7 | SeNB Reconfiguration Complete | 5 + 4 (9) | RRC Connection Reconfiguration Complete | 1 + 4 (5) |
| 8 | Radio Synchronization | 1 | | |
| 9 | Average delay due to RACH scheduling period (1 ms periodicity) | 0.5 | | |
| 10 | RACH Preamble | 1 | | |
| 11 | Preamble detection and transmission of RA response (Time between the end RACH transmission and UE's reception of scheduling grant and timing adjustment) | 5 | | |
| 12 | Decoding of scheduling grant and timing alignment | 2 | | |
| 13 | RRC Connection Reconfiguration Complete | 1 + 4 (5) | | |
| Total | | 65.5 ms | | 51 ms |

FIG. 28 is a block diagram illustrating a wireless device in which methods as proposed in the present disclosure may be implemented.

Here, the wireless device may be a network entity, an eNB and a UE, and the like, and the eNB includes both of a macro eNB and a small eNB.

As shown in FIG. 28, the eNB 20 and the UE 10 include communication units (transmitting/receiving units, RF units, 2813 and 2823), processors 2811 and 2821, and memories 2812 and 2822.

The eNB and the UE may further input units and output units.

The communication units 2813 and 2823, the processors 2811 and 2821, the input units, the output units, and the memories 2812 and 2822 are operatively connected with each other in order to conduct the methods as proposed in the present disclosure.

The communication units (transmitting/receiving units or RF units, 2813 and 2823), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 2811 and 2821 implement functions, procedures, and/or methods as proposed in the present disclosure. The layers of radio interface protocols may be implemented by the processors.

The processors may be represented as control parts, controllers, control units, or computers.

The memories 2812 and 2822 are connected with the processors and store protocols or parameters for performing the method proposed in the present disclosure.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The methods proposed in the present disclosure, rather than limited to the configurations and methods according to the above-described embodiments, may be configured so that all or some of the embodiments may be selectively combined with each other to allow for various variations or modifications.

Meanwhile, the methods proposed in the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Further, the recording media readable by the processor may be distributed to computer systems connected with each other via a network, and processor readable codes may be stored and executed in a distributing manner.

INDUSTRIAL APPLICABILITY

The present disclosure is directed to use a method for transmitting and receiving data in a wireless communication system.

The invention claimed is:

1. A method for transmitting and receiving data in a wireless communication system, the method performed by a user equipment (UE) comprising:
   receiving, from a first base station (BS), a first message informing the UE that a radio link quality value of the first BS for a specific Mission Critical Service (MCS) has changed to a changed radio link quality value of the first BS,
   wherein the first message includes first radio link quality information indicating the changed radio link quality value;
   receiving, from at least one second BS, a second message including second radio link quality information associated with a radio link quality value of the at least one second BS,
   wherein the second radio link quality information includes at least one of a supportable radio link quality value for the MCS and a radio link quality value guaranteeing time indicating a time period when the supportable radio link quality value is guaranteed;
   comparing the changed radio link quality value with at least one of a minimum radio link quality value ($PER_{MCS\_Min}$) and a target radio link quality value ($PER_{MCS\_Target}$) for the MCS; and
   maintaining the first BS or switching to one of the at least one second BS based on a result of the comparison,
   wherein the specific MCS is simultaneously provided by both the first BS and the at least one second BS when the result of the comparison satisfies a specific condition related to radio link quality and the first BS is maintained.

2. The method of claim 1, further comprising:
   receiving, from the first BS, a third message including information associated with a candidate second BS available to replace the first BS.

3. The method of claim 1, wherein an alternative link in a Signaling Radio Bearer (SRB) inactive state is configured for the UE and the at least one second BS.

4. The method of claim 3, further comprising:
   sending an instruction to switch the state of the alternative link of the at least one second BS from the SRB inactive state to an SRB active state.

5. The method of claim 4, wherein the second message is received from the at least one second BS through the alternative link in the SRB active state.

6. The method of claim 1, wherein the first radio link quality information includes at least one of a current radio link quality value, a radio link quality value to be changed or information indicating a time period when the radio link quality value to be changed is applied.

7. The method of claim 1, further comprising:
   receiving, from the first BS, control information indicating a transmission time of the first radio link quality information.

8. The method of claim 7, wherein the second radio link quality information is received from the at least one second BS within a predetermined time from the transmission time.

9. The method of claim 1, wherein the first BS is switched to the second BS, when the changed radio link quality value is greater than the minimum radio link quality value for the specific MCS, or
   when the radio link quality value to be changed, of the first BS, is smaller than the minimum radio link quality value for the specific MCS, greater than the target radio link quality value for the specific MCS, and the radio link quality value of the second BS is smaller than the radio link quality value to be changed, of the first BS.

10. The method of claim 9, when the radio link quality value of the at least one second BS is smaller than the target radio link quality value for the specific MCS, the specific MCS is provided only by the one second BS.

11. The method of claim 1, wherein the first BS is maintained, when the changed radio link quality value is smaller than the minimum radio link quality value for the specific MCS.

12. The method of claim 11, wherein the specific condition is that the changed radio link quality value and the radio link quality value of the at least one second BS are greater than the target radio link quality value for the specific MCS.

13. The method of claim 1, further comprising:
configuring a Data Radio Bearer with one second BS among the at least one second BS.

14. The method of claim 13, wherein the one second BS is the second BS in which a product of the radio link quality value of the one second BS and the changed radio link quality value is a smallest and has a value smaller than the target radio link quality value for the specific MCS.

15. The method of claim 13, wherein the one second BS is the second BS in which a product of the radio link quality value of the one second BS and the changed radio link quality value is smaller than the target radio link quality value for the specific MCS, and has a largest value of the radio link quality value guaranteeing time.

16. The method of claim 1, wherein the radio link quality value is a Packet Error Rate (PER) or a number of resources allocated to the UE.

17. The method of claim 1, wherein the first BS is a serving BS, and the second BS is an alternative BS.

18. An user equipment (UE) for transmitting and receiving data in a wireless communication system, comprising:
a transmitter and a receiver; and
a processor functionally connected to the transmitter and the receiver, wherein the processor is configured to:
control the receiver to receive, from a first base station (BS), a first message informing the UE that a radio link quality value of the first BS for a specific Mission Critical Service (MCS) has changed to a changed radio link quality value of the first BS,
wherein the first message includes first radio link quality information indicating the changed radio link quality value;
control the receiver to receive, from at least one second BS, a second message including second radio link quality information associated with a radio link quality value of a second BS,
wherein the second radio link quality information includes at least one of a supportable radio link quality value for the MCS and a radio link quality value guaranteeing time indicating a time period when the supportable radio link quality value is guaranteed;
compare the changed radio link quality value with at least one of a minimum radio link quality value ($PER_{MCS\_Min}$) and a target radio link quality value ($PER_{MCS\_Target}$) for the MCS; and
maintain the first BS or switch to one of the at least one second BS based on a result of the comparison,
wherein the specific MCS is simultaneously provided by both the first BS and the at least one second BS when the result of the comparison satisfies a specific condition related to radio link quality and the first BS is maintained.

19. The UE of claim 18, wherein the first radio link quality information includes at least one of a current radio link quality value, a radio link quality value to be changed or timing information indicating a time period when the radio link quality value to be changed is applied.

* * * * *